(12) United States Patent
Siegenfeld

(10) Patent No.: US 7,788,674 B1
(45) Date of Patent: Aug. 31, 2010

(54) COMPUTER SOFTWARE FRAMEWORK FOR DEVELOPING SECURE, SCALABLE, AND DISTRIBUTED APPLICATIONS AND METHODS AND APPLICATIONS THEREOF

(75) Inventor: Michael Siegenfeld, 58 Sylvan Rd. North, Westport, CT (US) 06880

(73) Assignee: Michael Siegenfeld, Westport, CT (US)

( * ) Notice: Subject to any disclaimer, the term of this patent is extended or adjusted under 35 U.S.C. 154(b) by 1597 days.

(21) Appl. No.: 11/060,679

(22) Filed: Feb. 17, 2005

Related U.S. Application Data

(60) Provisional application No. 60/546,510, filed on Feb. 19, 2004.

(51) Int. Cl.
*G06F 13/00* (2006.01)
(52) U.S. Cl. .................. 719/313; 719/330; 718/100; 718/107; 709/201; 709/219
(58) Field of Classification Search .................. 719/330, 719/313; 718/100, 107; 709/201, 219
See application file for complete search history.

(56) References Cited

U.S. PATENT DOCUMENTS 6,430,607 B1 * 8/2002 Kavner ...................... 709/217
6,714,962 B1 * 3/2004 Helland et al. .............. 709/203
2004/0117793 A1 * 6/2004 Shaylor ...................... 718/100

* cited by examiner

*Primary Examiner*—Andy Ho

(57) ABSTRACT

A software framework for implementing distributed applications is provided. An implementer's client-specific code functions through the framework's client-side software. The implementer's server-specific code contains system-specific business logic and functions within the framework's server-side software. Communication is provided by the framework between each instance of implementer's client-specific code through an instance of client-side software to implementer's server-specific code through the server side software over at least one communication link. Multi-threaded communication is achievable over a single communications link, even where the implementer writes single-threaded code. The client-side software is able to process synchronous and asynchronous messages received from the server-side software while simultaneously sending additional messages to the server-side software, which can be processed concurrently by said server-side software. Security included in the framework includes encrypted, authenticated communications and digitally signed and verified content. Robust communication is provided, as lost links may be automatically restored.

121 Claims, 19 Drawing Sheets

Framework Components - High-Level Overview

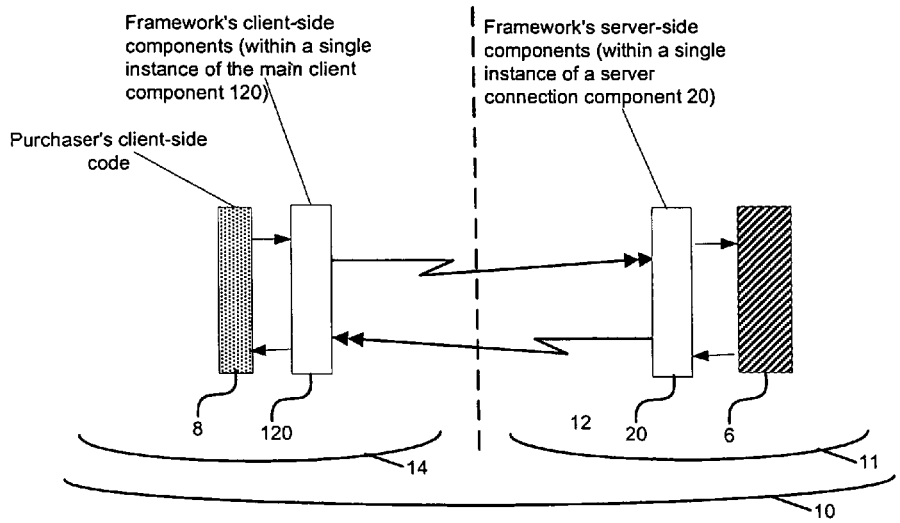
Figure 1A: Framework Components - High-Level Overview
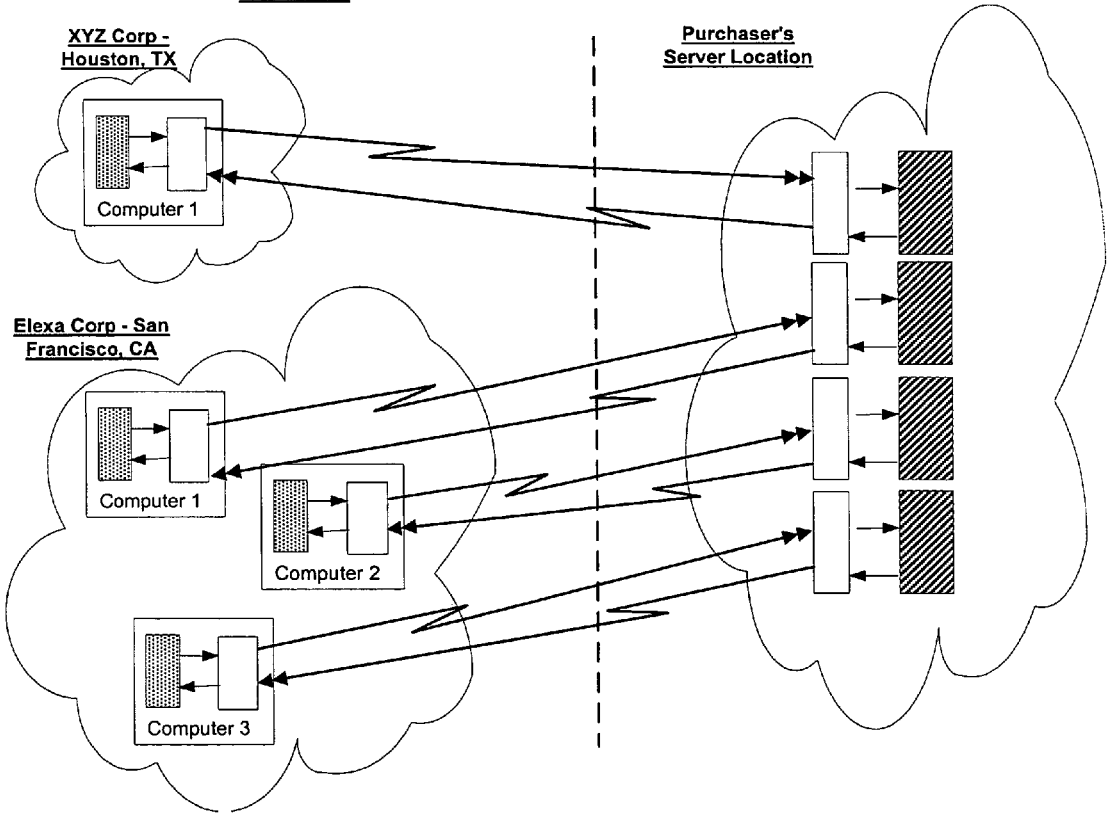
Figure 1B: Framework Components - High-Level Overview

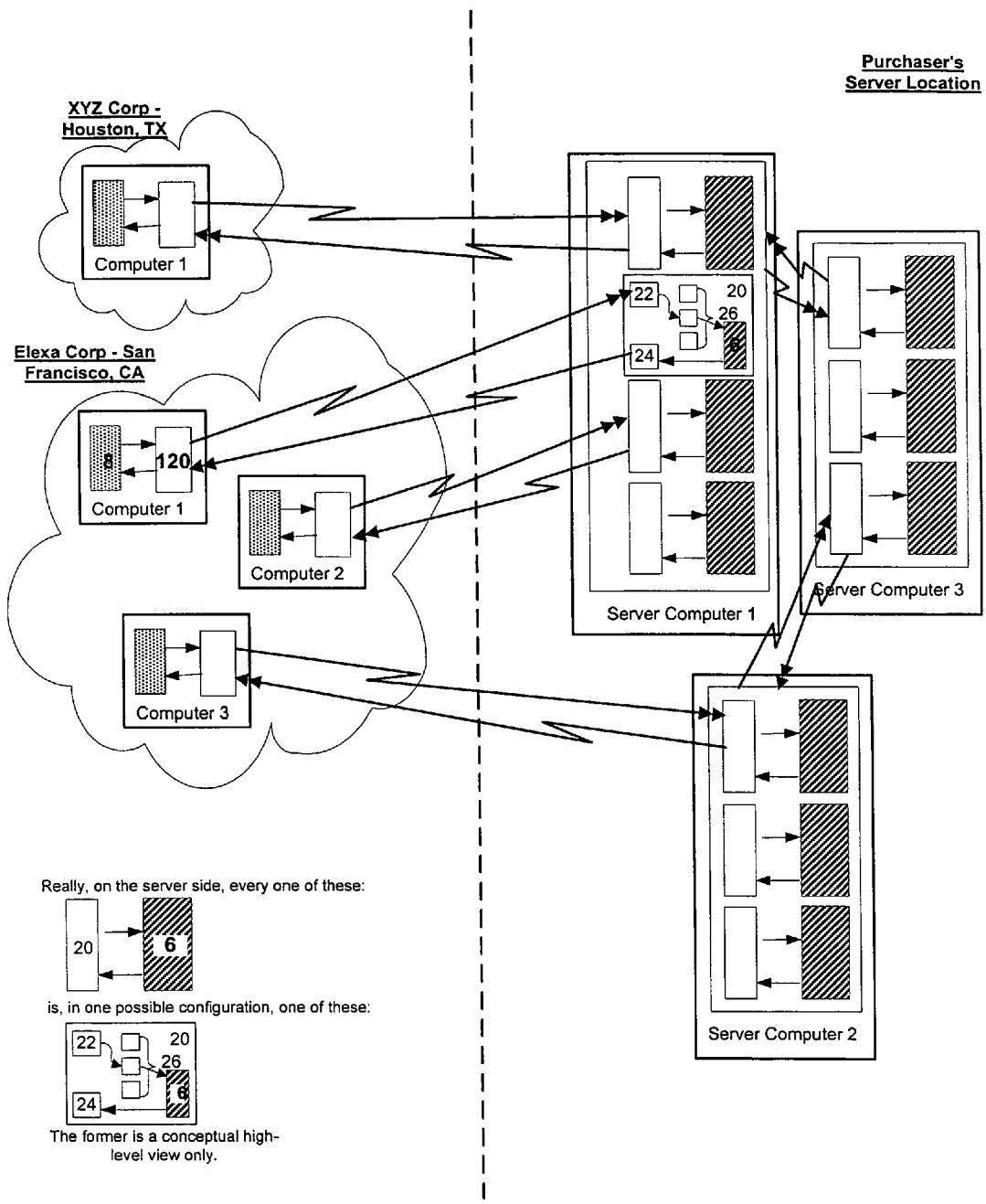

The client components, pictured as below in each of the four preceding diagrams, will now be shown, in more detail, sending and receiving a message.

Purchaser's client side code:

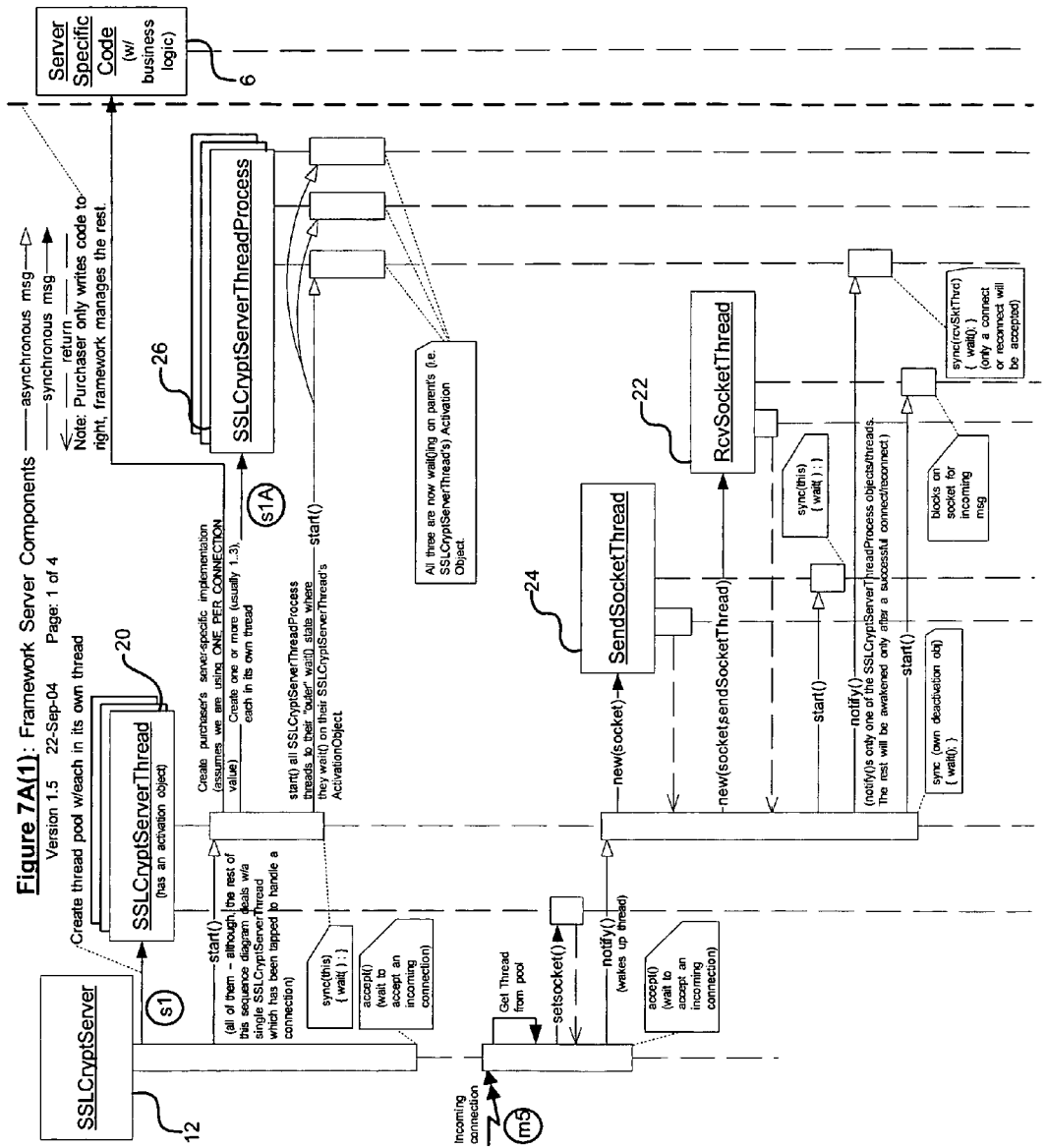

Figure 7A(2): Framework Server Components
Version 1.5    22-Sep-04    Page: 2 of 4

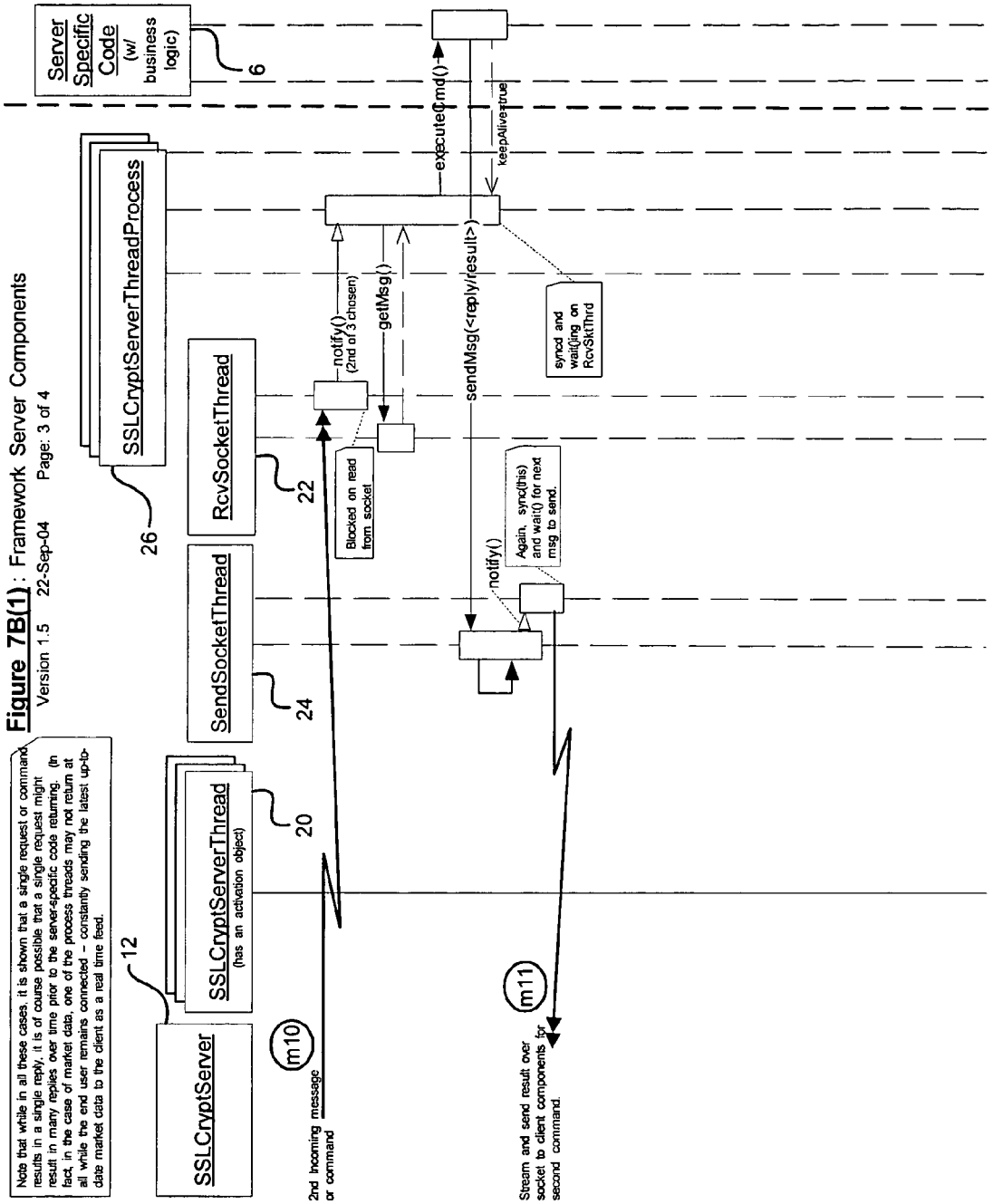

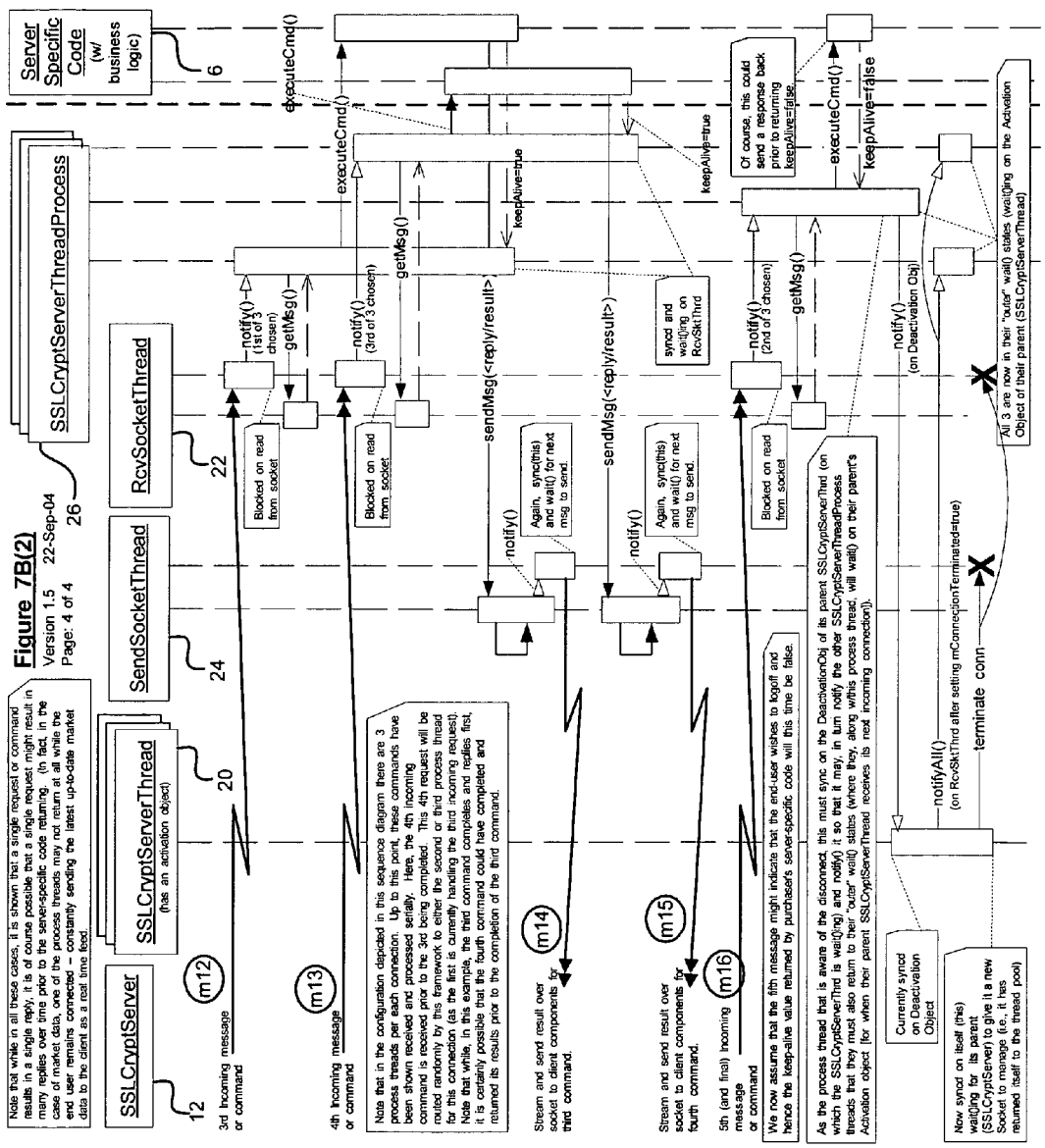

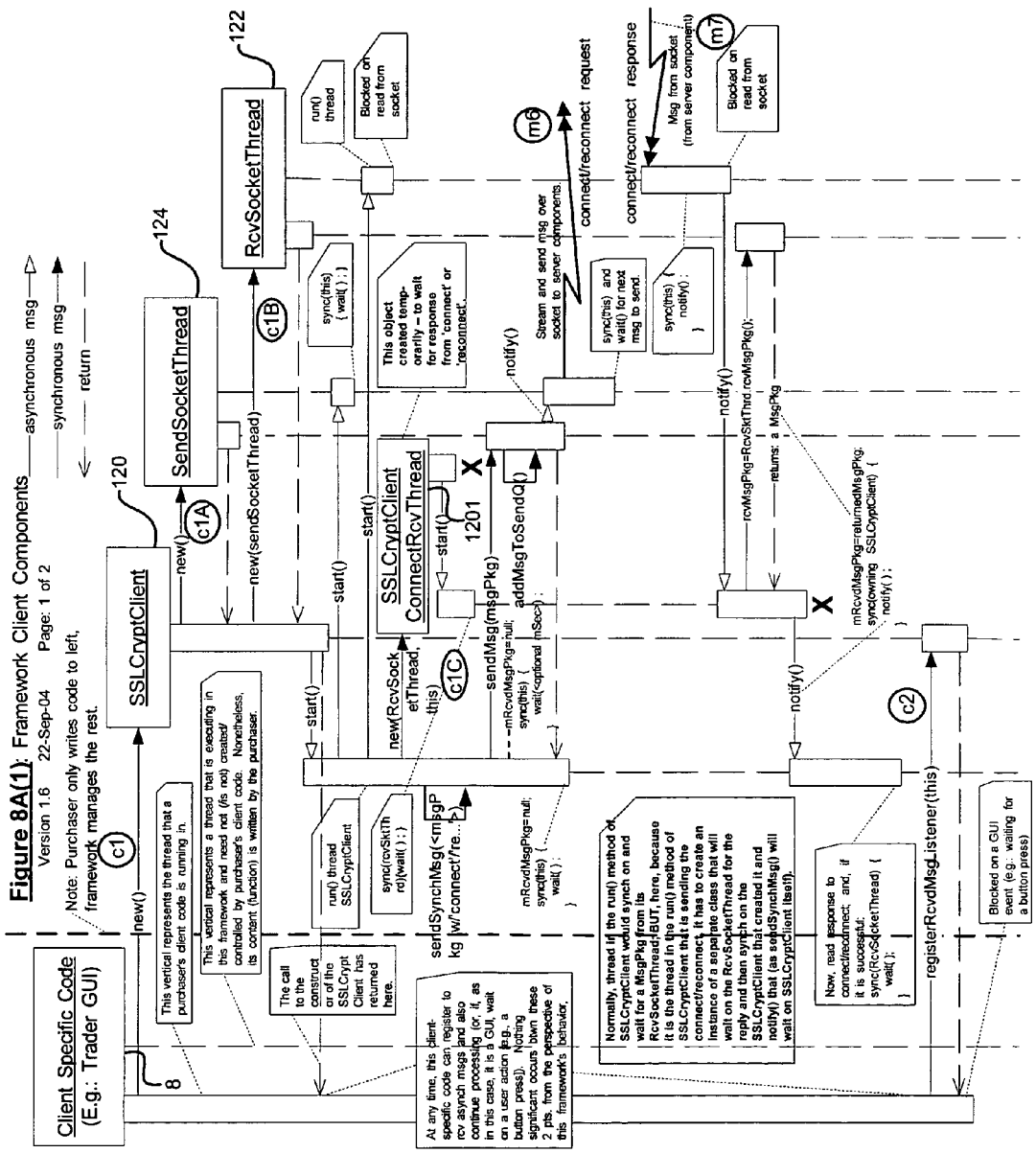

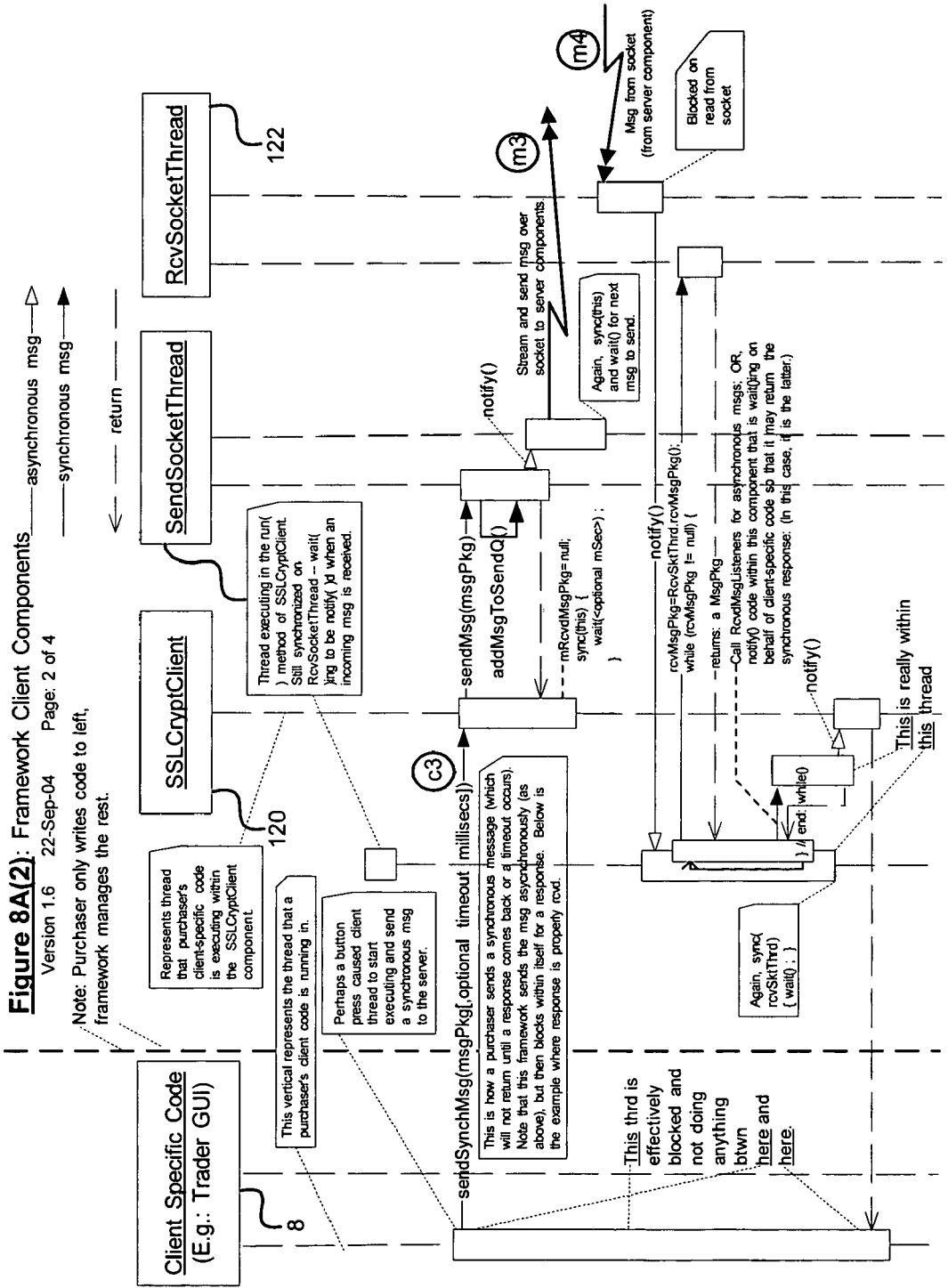

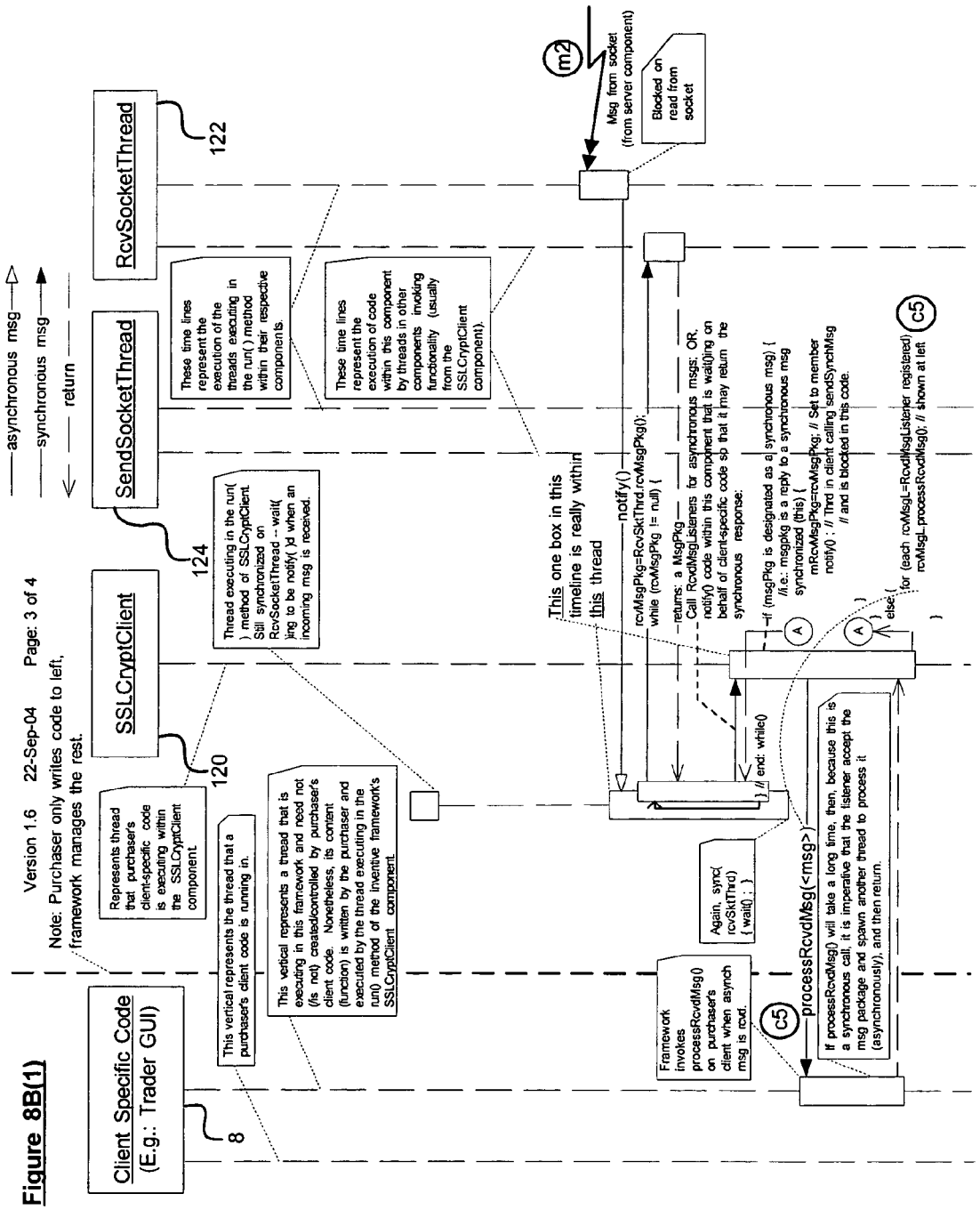

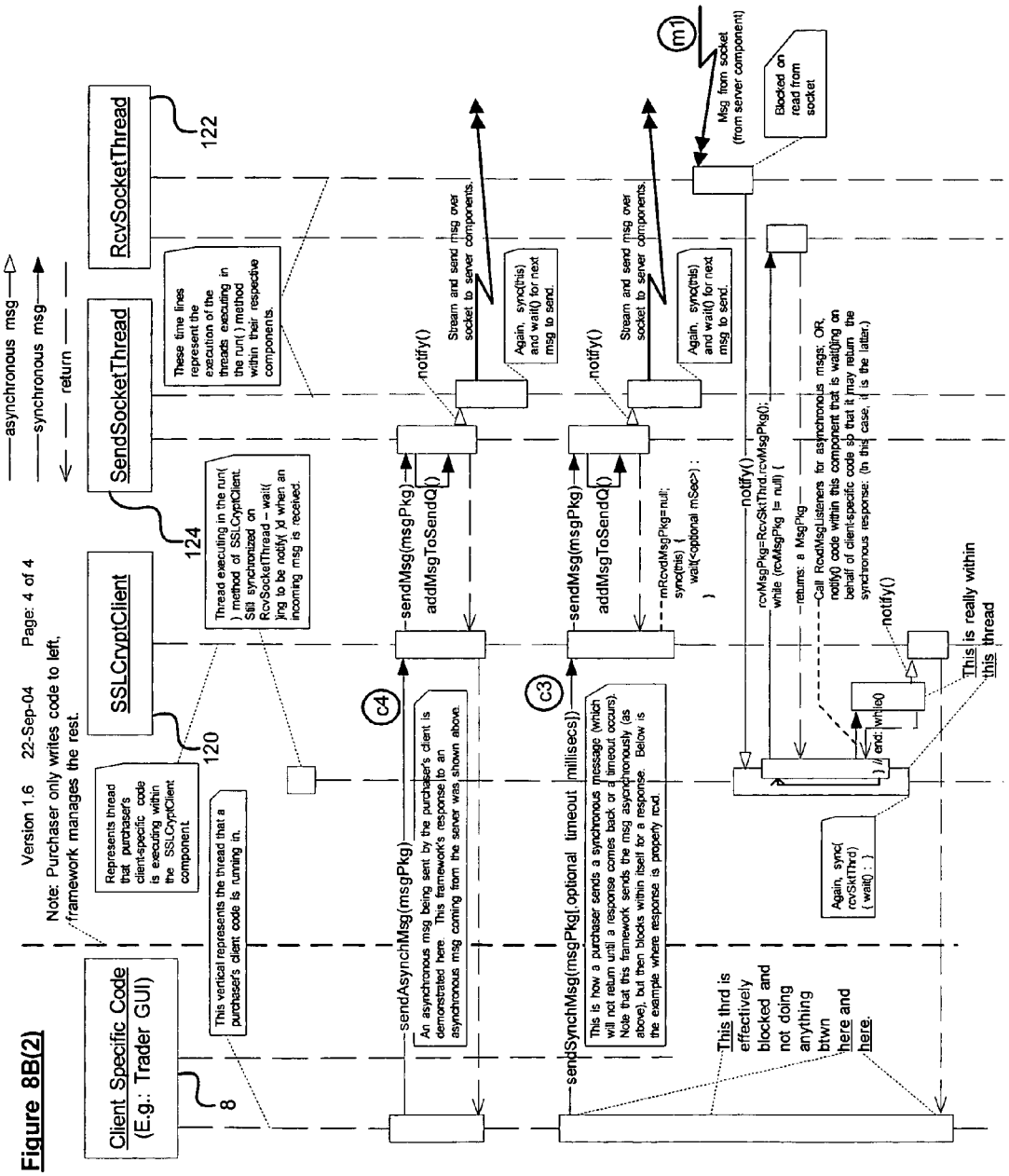
Figure 8B(2)

COMPUTER SOFTWARE FRAMEWORK FOR DEVELOPING SECURE, SCALABLE, AND DISTRIBUTED APPLICATIONS AND METHODS AND APPLICATIONS THEREOF

RELATED APPLICATIONS

Domestic priority is claimed from U.S. Provisional Patent Application No. 60/546,510 filed Feb. 19, 2004, the entirety of which is incorporated herein by reference.

REFERENCE TO COMPUTER PROGRAM LISTING APPENDIX

A compact disc (in duplicate) has been submitted containing a computer program listing; the contents of the compact disc are incorporated by reference herein. The following files are on the compact disc computer program listing:
CodeListing.txt, 578 KB, created Aug. 1, 2004; and
CodeListingTestProgramPkgs.txt, 102 KB, created Aug. 9, 2004.

These files are exact ASCII versions of identically-titled non-ASCII files created Jan. 25, 2004 and submitted with the initial provisional application referenced above.

COPYRIGHT NOTICE

A portion of the disclosure of this document contains material which is subject to copyright protection. The copyright owner has no objection to the facsimile reproduction by anyone of this document or the disclosure as they appear in the USPTO files or records, but otherwise reserves all copyright rights.

BACKGROUND OF THE INVENTION

1. Field of the Invention

The invention relates to computer software frameworks, and more specifically to generic software frameworks that are usable to allow a software developer to create secure, scalable, and widely distributed applications, applications that may be distributed over an internal network or even externally over the public internet without requiring a developer to create the pieces of the application that provide for any combination of these features from scratch. The invention also relates to methods for developing software frameworks as well as to applications created using such frameworks.

2. Description of the Related Art

The invention is directed to a software framework suitable for creating and maintaining secure, scalable, and distributed applications between a centralized server (or many server computers acting as a unit) and a plurality of clients or end-users. One example of an application that most people are familiar with and that could be implemented using this invention without even coming close to utilizing its full capabilities is a website application that enables people (end-users) to examine merchandise (e.g., books or CDs/DVDs) over the internet; then, place some of these books or CDs in their virtual "shopping cart"; and then, pay for them, all from within their internet browser. In this example, the end-users are the customers of the company (e.g., XYZ Book and Media, Inc.) that developed this website. The end-users are the people who, through their browsers, will examine XYZ's merchandise and possibly place items in their cart and execute purchases. The collection of screens, entry forms, etc. that will be presented to the end-users (or customers of XYZ) constitute the GUI (or Graphical User Interface) through which these end-users can interact with XYZ's application. Note that GUIs are not always run from inside web browsers, and much content that comes through a web browser would not be considered a "true" GUI (at least inasmuch as what is meant by a GUI for the purposes of this patent application). Much of the information that comes through web-browsers is in the form of raw web pages that have no operational logic and are simply displayed as received by the browser. Even the forms on web pages may not be dynamic in that they directly transmit to the server only exactly what the end-user types back (when the user presses a "Submit"-type of button). In fact, this shopping cart application, as described so far, could (and frequently is), on the client side, handled in just such a fashion, i.e.: without requiring XYZ to develop a "true" GUI for the client side.

A GUI (for the purposes of this patent application) shall mean a full-featured, window-based interface that is created and managed by a computer program. If XYZ had created a full featured GUI for this application, it would be able to send compact information back to the GUI in response to each request rather than an entire page to display. The GUI program executing on the client side (on the end-user's machine) would be able to take appropriate action—possibly just displaying, e.g., the 'total cost after shipping' in an area of its window (as opposed to having an entire new page sent back which had all the information on the original page, but additionally had the 'total cost after shipping' information). If XYZ developed a full-featured GUI on the client side, it would be able to offer the end-user far more advanced content and capability as well as a far more usable (user-friendly) interface. E.g., Suppose that XYZ did not just service retail clients, but serviced book and media stores all over the country, supplying them with inventory. In this case, when a hot new DVD or book comes out, XYZ might wish to display to its book and media store end-users (all of whom would probably be interested in ordering some quantity of these items), a real-time count of how many of each of the items XYZ has remaining in inventory. As XYZ's customers (end-users) place orders (using their GUIs), every other customer's GUI (where a customer is watching one of the items that is ordered) must be somewhat instantaneously updated with the new inventory information for that item.

Of course, with a simple web page on the client side it would be possible for the end-user to click a refresh-type button whenever he/she wanted to ascertain how many of a particular item remained; and, in so doing, said end-user would cause the entire page with the inventory count of the items he/she was watching to be rebuilt on the server and sent back with updated counts (as of the time it was built). Nonetheless, let us just suppose that having a real-time inventory count of items of interest was somehow important to XYZ's clients (i.e., to the end-users of XYZ's application) and that, therefore, developing such an application would provide XYZ with a competitive advantage.

Before we proceed, we should also mention that another way of accomplishing this (without writing the difficult-to-develop, full-featured, supporting GUI and server side code that this invention generically supplies) is to use javascript (no relationship to Java) or some other method of having a semi-automated web-page that might poll the server every n seconds to supply an updated web page (or piece of a web page) containing the updated inventory of all items that a particular end-user happened to be watching. Such a 'GUI' would not qualify as the type of full-featured interface that is meant when we refer to the full-featured GUI functionality that this invention facilitates. For one thing, polling is an inferior technique as it is inherently not scalable—imagine thousands of users calling on the server side code every few seconds and forcing it to reply whether or not the few of the thousands of items that a particular end-user happened to be watching had an inventory count change. By contrast, with the type of full-featured GUI functionality (and supporting server-side functionality) that the inventive framework generically supplies, it is possible to notify (and, for example, cause the display code to execute on) only those GUIs where a change to a watched inventory item occurred.

Somehow, XYZ's central application (i.e. the code it has written to run on the server side) must be able to notify all end-user (client side) GUIs that are "interested" whenever an item is ordered. As already mentioned, while a simple set of web pages on the client side could be used if we asked the end-users to press a button (thereby demanding a new page) every time they wanted to see updated inventory, only an application (program) on the client side would be capable of receiving and updating this information in real-time. A full-featured application (GUI in this example) on the client-side would be able to execute code upon receiving such "real-time" information—displaying only the changed information and perhaps taking other actions (like turning the entire background of the GUI red if an observed item dropped below the particular end-user's supplied threshold, or even placing an order for the remaining inventory in such a situation).

Some of the aforementioned handling of real-time information may simply read like the conventional "publish-subscribe" type of functionality already available in a number of commercial products like those from many vendors that implement Sun's JMS specification or IBM's MQ-Series product. But, while the inventive framework does, among many possible uses, enable implementers to seamlessly provide a publish-subscribe capability within their own code (and without writing multi-threaded code on the client or server side):

1—The inventive framework does not provide a publish-subscribe service; also

2—The mechanism within the inventive framework that renders providing a publish-subscribe service so trivial has nothing to do with these aforementioned technologies. I.e., the capability that the inventive framework provides to an implementer, which renders providing a publish-subscribe capability within their application trivial, is the same mechanism that renders providing all other features (including multi-threading within a single connection) trivial.

Finally, conventionally, only an application on the client side could perform complex field level actions whereby each field on the screen was "validated" after an end-user entered it, and, at times, programmatically complex actions taken. The end-user would not wait for the entire information on the GUI to be sent back to the server for the server to send another form back indicating which fields needed to be changed/supplied (as they would if a form were used rather than a full-featured GUI). A full-featured GUI might not enable a "submit"-type button until information was properly filled in. A full-featured GUI could take immediate action dependent on the information that an end-user entered into a particular field (as opposed to waiting for an entire form to be submitted). E.g.: If the user checked off certain categories for recently released DVDs, an on-screen scrolling list could be adjusted automatically to be filled with only the DVDs that met their criteria. This would be accomplished by the GUI application (program) running on the client side sending a command to the server every time a category was checked or unchecked.

Each time XYZ's program running on the server side (the program responsible for receiving, executing, and sending back results to all XYZ's clients that are running the client side GUI program) receives a command to re-form a new list of DVDs based on all of the categories checked. The server consults its inventory and re-forms the list to choose from and sends just that list back to the GUI (client side program) for re-display in the list presented to the end user. If and when the end user makes a selection, the server might be sent a different command (e.g.: "sendDetailOn:DVD:134502") to which it might respond with a full description to be displayed by the client side GUI program in the detail window on that GUI (screen).

By having a full-featured program controlling the interface on the client side, XYZ can obtain far greater functionality and usability than it could if the client side were dependent on only forms that the browser knew nothing about (but was capable of rendering and using them to collect information an entire form at a time).

To recap, a GUI, as we will use that term here, is an executing program that runs on the client side (on end-users' computers), that provides a windowed interface, and that enables the end-users of an application to interact (send commands to and receive responses and information from) XYZ's application running in a central location (i.e., on the server-side). The functionality that a GUI program can offer on the client-side is always a superset of what could be offered by web-pages. Alternatively stated, anything that can be accomplished using web pages as the end-user interface can be accomplished by providing a GUI either through or independently of a web-browser, but the reverse is not true. A GUI-based interface (that is an executing program) can provide greater functionality (and a better presentation/user experience even when considering functionality that could be provided by both).

The above description begins to discuss how a single end-user, i.e., client of XYZ, (using the client side GUI) would interact with the code that XYZ wrote on the server side. To be more complete, here are the required steps:

1—Client GUI must establish a connection or a secure connection over the network (or Internet) to the code developed by XYZ executing on XYZ's centralized servers. (Of course, this connection does not have to be secure, but as the vast majority of distributed application implementers would desire this, and since the inventive framework seamlessly provides for robust security, we will assume that, in fact, the connection must be secure.)

2—Client GUI will send commands to the server (like orders or requests to see certain inventory) when an end-user takes an action on the client GUI presented to him/her. The server code must interpret and execute these commands and then send a response back.

3—Client GUI may request to receive information from the server asynchronously (i.e., not as the result of the end-user taking an action, as in 2 above, but real-time information like the inventory level of certain items in our example). Server will send information to this (and other client GUIs) every time there is a change.

There are many examples of widely distributed, Internet-based applications that are well known, such as: the web sites of: Fresh Direct, a grocery shipment service; Amazon, the on-line book, music, electronics distribution company that operates a site that is a good example of such an application; and, of more relevance when considering some of the more advanced capabilities that this invention provides, the site of Island that, at that time, had a Java-based applet that received real-time stock price updates for those equities that a particular end-user might be watching. In some instances, such applications are created entirely from scratch, including all of the communications and security software implemented to allow end-users to contact the central server and place an order. In many cases (including the aforementioned), the established level of security would not meet the level required to carry out a large-scale financial transaction or to maintain patients' medical records over the Internet. It would be desirable if software developers could simply write server-side code and client-side code and not have to worry about how the two will communicate/communicate securely, thereby freeing up their attention solely to the look and feel of the client GUI and the functionality (i.e., the business logic specific to the application) of the server.

One existing open specification for a framework is Enterprise Java Beans or EJB developed by Sun Microsystems, Inc. EJB makes the design and implementation of a client-server application much easier than if one were starting from scratch since it provides for much of the connectivity structure of an application in building block fashion. EJB essentially allows a system designer to write client-side code and server-side code and not have to worry how the client-server communication is effected; the framework takes care of most of the nuts and bolts of connectivity.

However, EJB has many functional and design limitations:

EJB only enables single-threaded communications between client and server, and while it might be possible for the implementer to multi-thread their client themselves, this would still not provide often needed functionality as EJB also provides for only synchronous communications whereby a client thread sends a request to the server and must wait for a response, and there is no way for the client to receive information (like real-time market information or an alert from a patient's heart monitor) asynchronously.

EJB also does not allow purchaser's server-side code to be multi-threaded (which has the effect of preventing an implementer's server-side code from spawning a process that runs after the server-side code returns). In many types of applications, this is highly undesirable and severely limits the capabilities of a system utilizing EJB.

EJB requires multiple and unnecessarily complex development steps and compilation phases for a purchaser's server-specific code: In addition to developing the server-specific code (which is all that should be necessary), an implementer must develop a home class, a remote interface and a deployment descriptor; must package these up in a jar; must perform multiple steps to deploy the bean to the server; must have a JNDI (Java Naming and Directory Interface) service running and must register the home class with that, etc. The process of developing, maintaining and enhancing code is difficult, time-consuming and inefficient.

Also, EJB uses RMI (Remote Method Invocation) as its underlying transport mechanism (a CORBA-type of technology) which requires the marshaling and unmarshaling of objects. This is very expensive from a performance standpoint, especially if message traffic between client and server is heavy as might be the case if real-time data were being sent to a GUI; or, as might be the case if a system interface to enable access of the implementer's server-side code from another system was acting as the client (instead of a GUI being the client), and that system interface (through this invention) was sending or receiving large amounts of information. It is also expensive from a bandwidth standpoint, as it is only the data in the object being sent that is really needed, not an entire serialized object description, which is what is sent via RMI.

Stateful (server-side) code is code that maintains information after the command is executed (and after results have already been returned to the client) so that, when a client sends subsequent requests, the server-side code can build on (or make use of) information from commands/requests that executed before. With stateless server-side code, every command stands on its own. As an example, a "shopping cart" type application would require stateful server-side code if every time an end-user sent a command to add an item to his/her cart, the server-side code simply maintained the contents of the cart from previous requests. If stateless code were used for this purpose, the entire contents of the cart would either have to be maintained and transmitted by the client with each and every request, OR, the server side code might persist the contents of the cart (to memory or disk) after every request—returning some sort of session id to the client so that the client could transmit this session ID with each subsequent request, which server-side code could then use to retrieve the cart contents prior to executing the current command. While it may appear from the above example that one could always use the stateless server-side code; and that, indeed, it might even be desirable to use this simpler approach, there are many applications where a more complex, stateful approach would be required. Certainly, any type of trading application where each end-user is monitoring his/her position and watching prices of selected instruments would require a stateful approach and a persistent connection. In this case, server-side code written by the implementer would need to actively stay alive (even between satisfying end-user requests) as it would be too time-consuming to restore state, reestablish positions, establish what was being watched, and re-subscribe to real-time market information with every new request. Also, if real-time prices of market instruments were being continually sent back to the end-user's GUI, it would be impossible to accomplish this without a persistent connection.

While EJB supports both stateful and stateless server-side code, it is very inefficient with stateful code, and it is incapable of the type of asynchronous communication desired.

Because stateful EJB Beans can be "passivate( )d" (i.e., made dormant and swapped out to disk without the code's consent) by the EJB container, even if the EJB bean (i.e., the server-specific code developed for an EJB framework) were to attempt to circumvent the multi-threading restriction by sending a message to a multi-threaded server (that was not an EJB implementation) to process, and then returned, it would not necessarily be able to receive the result from the server that it passed the request to, because it (the EJB bean) might have been passivate( )d before the response was received back. Therefore, the server that was passed the request might have to wait until the stateful bean was reactivated by its client and retrieved the message back, such a system would be highly non-performant and undesirable.

While EJB Containers (i.e., the framework code in an EJB framework) MAY create a pool of server-specific code instances (i.e., EJB Beans) to handle stateless connections, stateful sessions typically require expensive newInstance( ) calls to reallocate and recreate the object when a session is restored. Not only do server-specific components developed by the implementer need to be reinstantiated and reinitialized, but many of the internal framework components (like the EJBObject that the EJB Container creates to act as a middleman for the communication between server and client must be recreated with each new connection, and with this EJB Object needlessly passing communication through the EJB Container at each step).

Additionally, security concerns are not addressed adequately by EJB, a critical flaw. In many systems, secure communication is vital to prevent theft of bank account numbers, corporate records, and other highly sensitive information. For many complex systems, especially those to be made available over the public internet and/or where high value transactions are executed or applications are designed to provide access to highly sensitive information, the importance of keeping data secure is even higher. Examples of systems where a higher level of security would be needed in order to transact over the public internet would include a system where financial institutions could trade government securities; a medical records system (where patients' records were accessible over the public internet), etc. While there exist other technologies that an implementer could perhaps tie in and use for security while using EJB solely on the server-side, an implementer using EJB in this manner would still have to expend the time and effort and experience the difficulties of dealing with complex security issues and code to address these issues, as well as undertake integrating several complex technologies.

Finally, from the standpoint of developers trying initially to approach this technology, books which teach EJB are typically many hundreds of pages thick and require days or weeks of review before a software designer could begin to make use of the EJB framework.

In short, while EJB has helped create an environment that serves to provide developers with some of the software infrastructure necessary to create distributed software applications, EJB has significant shortcomings.

SUMMARY OF THE INVENTION

A (software) framework is a set of software components that may be used as "building blocks" to create software applications. What distinguishes a framework from a simple software library (or set of libraries) that purchasers may also use in their application development is that libraries contain software components that may be used in unstructured and myriad ways within a software application whereas software frameworks prescribe a structure as to how code developed to use (or work within) them must be laid out. The framework provides capabilities to the developers' code not only by giving it access to certain components with certain capabilities (that developers' code must then control and use—as is the case with libraries), but by controlling (or prescribing) the interaction, order, and flow among its (the framework's) own components and the components built to execute within the framework by the purchaser (i.e., by the implementer). In a framework, while the developers' server-specific code (and client-specific code) may temporarily control the flow within a micro operation, the overall (macro) flow is controlled (or prescribed) by the framework.

While subjecting one's code to the control and structure of a framework may initially seem very constraining and unappealing, a well designed and flexible framework can provide much more complex and powerful capabilities than can a set of libraries—precisely because it can control the flow; and, if a framework is flexible and well thought through, not impose constraints that limit what the purchaser is able to achieve. A well designed and flexible framework can leverage the expertise of the framework writer as to how to accomplish key service-type tasks rather than simply providing components that enable the purchaser (assuming the purchaser had the requisite expertise) to do so. This is especially true when the tasks performed by a purchaser's code must be intertwined with the purchased code in a complex manner. Utilizing a framework enables implementers to focus their development efforts on their true areas of expertise.

The invention is a powerful application software framework and infrastructure that enables development teams/organizations to rapidly develop widely distributed applications and/or ASP services over their own local, regional, or global networks and/or the public internet. It provides communication capabilities, "massive" scalability and extremely high-level security without requiring development teams to write any code to avail themselves of these capabilities. By removing the complexities associated with security and network programming (especially with concurrent multi-threaded, network programming), this framework enables teams/organizations to focus on the business logic (on the server side) and user interface (GUI) (on the client side) that are truly specific to their business (and where there can truly be value added). Often the code on the client side is thought of as being some form of GUI through which the purchaser's end-users interact with its server-specific code, but this does not have to be the case. The client-specific code may simply be an interface that allows other systems or components developed by the purchaser to access its server-specific code through this framework. An excellent example of this is when this framework uses itself for its assist servers. In this case, the server components of this framework that execute the purchaser's server-specific code are a client to a session server, a signature server, and a server management server (all written using this framework). As another example, the server-specific code might be a pricer in a trading system where this framework could be used to seamlessly multi-thread this pricer so that multiple deals sent by one or more trading system components or even other systems (each of which would be clients to this server) could be priced in parallel.

It is an object of the invention to provide a software framework that provides multithreaded communication between each instance of an implementer's client-side code and its server-side code and the development of applications that can accomplish same.

It is another object of the invention to provide a software framework that automatically provides for multithreaded communication between the implementer's client and server-side code without implementers needing to start or implement separate threads within their client-side or their server-side code.

It is another object of the invention to provide a software framework that allows for and provides both synchronous and asynchronous communication both sequentially and concurrently between each instance of the implementer's client-side and server-side code.

It is another object of the invention to provide a software framework that automatically allows for and provides both synchronous and asynchronous communication both sequentially and concurrently between the implementer's client-side and server-side code by enabling the client-side and server-side code with this functionality without requiring the implementer (who is using this invention as an integral piece of their application) to write code to achieve these capabilities. (An implementer could in his/her client-side code, e.g., send an asynchronous message to the server and, without waiting for a response and while the implementer's server-side code was still processing that request/command, send an additional command to be processed concurrently either synchronously or asynchronously. Additionally, and even while everything described in this example was transpiring and even if the implementer's client-side code were in fact waiting for a response to a synchronous command it had previously sent, the implementer's client side code would, due to the functionality provided by this invention, still be able to process incoming asynchronous messages coming back from the server. Such processing would take place in a separate thread of execution within and provided by this framework, again, without requiring the implementer to write any code to achieve this save the two lines of code to register his/her code with this framework. This means, e.g., that a trading screen front end, built by an implementer, could receive live stock prices and post them for the end-user to see—even while in the middle of processing a trade and running a portfolio report for that end user. As another example of what can be accomplished with this type of automatically provided functionality, a medical system's front end client-side code written on top of this framework could receive information from a medical monitor attached to a patient and display it continuously in real-time at the same time that an end-user presumably a nurse or physician was using the same front end GUI to pull up the patient's records—once again without the implementer writing any special code to achieve this concurrency.)

It is another object of the invention to provide a software framework that allows for and provides both synchronous and asynchronous—and preferably bi-directional—communication both sequentially and concurrently between the implementer's client-side and server-side code over (i.e., within) a single connection (i.e., over a single socket). (A socket is an IP Internet Protocol address e.g.: 133.37.24.158 along with a port number e.g.: 1045. The IP address serves to uniquely identify a particular computer among all machines connected within a particular network or, if externally exposed, to uniquely identify a machine among all those connected to the entire public internet. The port number is a particular single channel within the machine identified over which a connection is established between code executing on a remote machine and code executing on the machine identified by aforesaid IP address. The open connection is a point-to-point, two-way communication channel between a program running on a server i.e. from a particular IP address and communicating through a particular port number {i.e., socket} on the server to a program executing at an IP address and communicating through the identified port number {i.e., socket} on the client machine.)

One preferred embodiment is that this aforesaid connection (over which the invention framework provides both synchronous and asynchronous communication both sequentially and concurrently between the implementer's client-side and server-side code) be a TCP/IP connection (i.e., a connection using the most common, standard internet protocol). It is another object of the invention to provide a software framework that provides automatically for Synchronous AND Asynchronous communication concurrently AND over the same single socket connection.

It is another object of the invention to provide a software framework that provides for seamless, asynchronous delivery of highly-dynamic, real-time, information to an implementer's client-side code over at least one of: a local area network; a wide area network; and, the public internet.

It is another object of the invention to provide a software framework that provides for seamless, asynchronous delivery of highly-dynamic, real-time, information to an implementer's client-side code that is automatically multi-threaded by this framework. Another preferred embodiment would be to use SSL (Secure Socket Layer) protocol, as this invention does, on top of TCP/IP. SSL is a widely used secure protocol that provides: integrity (guaranteeing messages received are unaltered), encryption (guaranteeing that intercepted messages can not be read by a third party); and, at least one-way authentication (guaranteeing end-users that they are communicating with the party they believe they are communicating with—in this case, the implementer's server-side code). SSL can also be configured to provide two-way authentication (guaranteeing that the server-side code can be sure that it is a particular end-user/end-user organization that is establishing contact with the server-side code by virtue of the presence of a digital certificate belonging to that organization on the machine establishing the contact).

It is an object of the invention to provide a software framework that provides an extremely high level of security automatically within the framework. 'Extremely high' shall be taken to mean that the invention framework provides automatically for any combination of the capabilities that accrue from: properly setting up a two-way authenticated (if desired), 128-bit encrypted SSL channel for all communication; providing capabilities to automatically digitally sign (on the sending side) and verify (on the receiving side) any/all messages; and, using a built in (or supplied) ACL (Access Control List) that ties the digital certificate sent by the client to one or more username-password pairs. A connection is only established if the optional two-way authentication succeeds (meaning that the digital certificate sent from the client-side was signed by a trusted CA (Certificate Authority—e.g., Verisign) (as was the one sent from the server-side to the client—as would be ensured with one-way authentication) AND the username and password sent match the certificate in the ACL. The sending of a 'connect' or 'reconnect' request with a username and password is automatically handled by the framework. The framework not only automatically sends the 'connect'/'reconnect' as the first command after a successful connection and exchange of certificates as would occur when the SSL session is established, but also enforces that it be the first command received on the server side. It is an object of the invention to provide any combination of the aforementioned security capabilities such that the implementer developing a distributed application that utilizes this framework need not concern themselves with the details of providing any of these capabilities—these are all handled automatically by this framework.

It is an object of this framework to automatically and seamlessly provide (i.e., without the implementer needing to comprehend and develop code to provide) the aforementioned capabilities of integrity, encryption, and authentication to the implementer's application.

It is an object of this invention to provide a framework that automatically and seamlessly provides the combined security of ACL authentication with the authentication capabilities that using SSL provides to the implementer's application. It should be noted that combining ACL validation with certificate validation/authentication in the manner described is more secure than using either individually AND more powerful than using both independently as well.

It is an object of this invention to provide these capabilities individually and in any combination to the implementer's code seamlessly (i.e., without the implementer needing to learn/comprehend the details of how to accomplish this or develop the code to provide it).

Note that SSL is simply a preferred embodiment or method for implementation. It is an object of this invention to provide these capabilities individually and in any combination to the implementer's code seamlessly—regardless of which technology/protocol is employed to accomplish such.

It is an object of this framework to provide the described high-level of security combining any combination of the security capabilities mentioned to the implementer's application.

It is another object of this invention to provide for non-repudiation of messages sent to the server-side code. Not only does the invention sign and verify messages; but, if the verification is on the server-side of the framework, the framework optionally will automatically store the verified messages along with the digital certificate used to verify them. In this way, it can be later proved that a particular message was sent by a particular party. Per legislation passed by Congress, digitally signed messages have the same weight as a signature on a physical document. The invention accomplishes this by providing a fully integrated signature server as an integral part of the framework. Just as verification is accomplished automatically (with implementer's server-specific code simply "opting-in"), the same holds for the automatic storing of messages as well.

It is another object of the invention to provide a software framework that enables the development of secure, scalable, and widely-distributed applications that are more robust, and can be developed in a significantly shorter period of time than is possible with conventional software tools and existing libraries and frameworks. As a framework, the invention is much more than simply a set of "building blocks". Rather than developers using the software components contained in this framework and invoking these components' capabilities from their code, it is predominantly the framework that uses the developers' components when needed—in essence, controlling the complex flow within the developers' application so that the developers need only write the instructions to handle their business logic on the server side, and their presentation logic (GUI or user screens) on the client side, while this framework handles "everything else". "Everything else" is quite substantial; in fact, it is the vast majority of work required to write a complex, secure, scalable, distributed application of any type. By using this framework as a base, developers/corporations (i.e., implementers) save themselves the considerable resources and additional time to market that would be necessary in order to provide the capabilities that this framework provides to their application. Development teams that use this framework also greatly cut down on the risk, as it can take a team of senior level developers many man-years worth of time to develop these capabilities for their application. Even then, the developed code will never be as thoroughly tested and error-free as what is offered by this framework (especially since this framework will be tested and tried in many different ways by many applications, whereas anything that a development team produces in-house for these purposes will be tested only narrowly). It will be likely that any in-house effort engaged to develop an underlying infrastructure will result in these capabilities either being tightly integrated into the application that the team is developing (or, at the very least, the capabilities developed will not likely meet the needs of all future application development as it is natural for an application group whose primary concern is delivery of their project to only develop enough capability in an underlying infrastructure to meet their needs). It is far more difficult and takes more time and expertise to develop a generic product that provides these complex capabilities, than one written for a particular application. It is another object of this framework to provide this functionality (scalability, security, capability for distributed multi-user access, etc.) in a generic, reusable, and package-able fashion.

It is another object of the invention to provide a software framework that provides scalability of an application created using the inventive framework. As with EJB-based frameworks, this framework automatically multi-threads an implementer's server-side code so that multiple connections (from many end-users at possibly distributed locations on the client-side) can be handled simultaneously, either within a single machine on the server-side, or across multiple machines on the server-side acting as a single unit. (It is an object of this framework to enable multiple machines on the server-side to function as a single unit. This is accomplished via use of an integrated, common session server which is a component of this framework.) (Of course, as previously mentioned, this framework goes even further and, uniquely, multi-threads the code not just to handle multiple connections, but, via a different mechanism within the design, within the connection as well.)

Importantly, it is another object of this framework to provide this scalability in a much more efficient and highly performant manner than is currently available from existing framework designs. The high performance of this framework in terms of:

the number of connections that will be supportable with equivalent hardware on the server-side;

the faster throughput for each individual request even when the server-side hardware is not being fully utilized; and, the decreased bandwidth requirements for messages (translating to increased network performance)

is the result of the unique design of this invention. High performance was a primary design goal when this invention was being designed.

It is another object of the invention to provide a software framework that provides the flexibility of selection from among several different server-side, scalability configurations depending upon the implementer's needs. Implementer may choose to have each connection to the server-side use its own instance of implementer's server-side code (the most common setting—as would be the case, e.g., if implementing a trading system where each connection represented a trader at a firm trading his own position; or, if implementing a medical system where physicians were each working with their own patient records); or, all connections may share the same instance of an implementer's server side code (with the invention accessing this one instance through multiple threads) (as might be desired if, e.g., server-side code was providing multi-threaded access to a common cache); or, implementer may even choose to have the framework use a different instance of implementer's server-side code for each thread of each connection (thus providing multiple instances of implementer's server side code per connection). (Note: Even when one instance per connection the most common usage is opted for, the invention framework still provides multiple threads per connection if configured by implementer's settings to do so. In this case, each of these threads within the connection are executed concurrently within and accessing the same instance of the implementer's server-side code. This aspect is also a unique element of this framework's design.)

The above and other objects are fulfilled by the invention, which in one aspect is a software framework for developing distributed, scalable, and secure applications. The framework includes client-side software and server-side software where each instance of implementer's client-side software communicates (utilizing the client-side software components of this invention) with one or more instances of implementer's server-side software (through this invention's server-side components) over a single communication link (to be defined below). More specifically, the framework includes client-side software, which functions with client-specific code created by an implementer, and server-side software, into which an implementer provides server-specific code. The server-side software of the framework is in communication with said client-side software over at least one communication link.

This invention automatically handles the establishment and maintenance of a communication link between each instance of the client-side code to the server-side code. A communication link is actually established between the framework's client-side components and the framework's server-side components for each end-user connection. Each instance of implementer's client-specific code communicates with its server-specific code using a communication link established by this framework. The inventive framework manages each communication link. One example of this management is the invention framework's configurable ability to seamlessly send and receive 'pings' to the other side of the connection every configurable number of milliseconds (or seconds) if nothing was sent over that link in a specified amount of time. This is essential as many firewalls will close a connection if there is a lack of activity. This sending of ping messages by either side of the framework (and the ignoring of ping messages by the receiving side) happens automatically (as far as the implementer is concerned) and is one example of how this framework manages the communication link established, seamlessly. Another example is this invention framework's configurable ability to seamlessly re-establish the connection (if desired) if the connection is lost—without the implementer's code being aware that this reestablishment occurred (if desired). It is an object of this framework to provide this level of robustness.

At least one of the invention's server-side software and the invention's client-side software is adapted to send multi-threaded communications via a single communication link (as noted above), and wherein the other of the server-side software and the client-side software is adapted to receive multi-threaded communications. The software developer need only write single-threaded code to be implemented by the framework, and the framework automatically (as desired) multi-threads communication between client and server and, indeed, automatically multi-threads either or both of the implementer's server-side and client-side code without implementer writing any code to achieve this.

In one aspect of the invention (see FIG. 3), the invention's top-level component on the server-side (the SSLCryptServer) pre-instantiates a plurality of framework objects (or components), each running within their own thread and each capable of managing a single connection with a client. As will be explained in more detail later, these components (i.e., the SSLCryptServerThread components), in turn, each pre-instantiate a pre-determined number of other framework components (i.e., the SSLCryptServerThreadProcess components), each running within their own thread and each able to execute an incoming command/request (received by the RcvSocketThread 22 and passed to one of the process components 26 that is not currently processing a command. As each of the SSLCryptServerThreadProcess components 26 is running within its own thread, waiting to be passed a command from reception component (i.e., theRcvSocketThread component 22) and then executing it (using its own thread) on, in this configuration, the same instance of the implementer's server side code 6 (that exists and was pre-instantiated once by the server connection component [i.e., by the SSLCryptServerThread component 20] when it first started up). So, in another aspect of this invention, multiple threads—one controlled by each of the SSLCryptServerThreadProcess components 26 of said server connection component 20—are each accessing and executing on the same 6, potentially concurrently.

In another aspect of the invention, the server-side software selectively instantiates instances of and interacts with the implementer's code in one of the following manners: i) once per thread; or, ii) once per server; or, iii) once per thread component. Preferably, the server-side software allows the user to select from among configurations i), ii), and iii).

In another aspect of the invention, the message is housed in a generic message package class that is the same class used for packaging up a message whether sent by the framework's client or from its server components on behalf of implementer's code on either side. In other words, all messages sent between the client-side software and the server-side software that emanate from the client-specific code or the server-specific code are preferably objects of a type provided by the framework. Messages of this object-type are preferably capable of signing themselves on the sending side, and verifying themselves on the receiving side if called on to do so by components of the framework and passed requisite key information. Preferably, the object-type is independent of the implementer's server-specific code.

In another aspect of the invention, any instance of the aforementioned message class is capable of signing itself and keeping the signature as part of the message (when passed the originator's private key) and verifying itself on the receiving side when passed the validator's public-key/certificate.

In another aspect of the invention, any single thread executing within a single instance of the client-specific code can communicate through a single instance of the client-side software over at least one the communication link in order to send multiple messages that may be processed substantially concurrently by the server-side software. The server-side software is able to receive multiple messages from the single instance of client-side software and process the multiple messages substantially concurrently by invoking functionality within the server-specific code.

In another aspect of the invention, multiple threads are able to execute concurrently in the server-side software with the capability of independently invoking functionality within implementer's server-specific code on behalf of messages sent through any single instance of the client-side software by a single instance of an implementer's client-specific code. Communication between multiple threads executing in the server-side software and a single instance of the client-side software is preferably enabled over each communication link. The server-side software is able to receive multiple messages over a single communication link from each instance of the client-side software and process these messages concurrently.

In another aspect of the invention, each instance of said client-side software is preferably able to process asynchronous messages received from the server-side software while simultaneously sending additional messages to the server-side software.

In another aspect of the invention, each instance of an implementer's client-specific code is capable of using a single instance of the client-side software to communicate with implementer's server-specific code through the server-side software; each instance of the client-side software starts at least one second thread that executes independently of a first thread executing within the instance of implementer's client specific-code that created the instance of client-side software.

In another aspect of the invention, each single instance of the client-specific code is capable of using its own instance of the client-side software to communicate with the server-specific code through the server-side software, and each such instance of client-side software establishes at least one communication link as a secure communication link with the server-side software.

In another aspect of the invention, any instance of the aforementioned message class built by the implementer's server-side code for sending (via this framework) to an instance of the implementer's client-side code "knows" (i.e. can flag) whether it is a response to a synchronous command or whether it is an asynchronous message/response.

In another aspect of this invention, the invention framework's client-side components use the flag mentioned in the previous paragraph, and:

If a response/message is synchronous, the framework's client component notifies the thread within itself that was waiting so that it can now retrieve the message and return it. (This is done because it is another aspect of this invention that all messages are sent asynchronously so that synchronous messages are handled by the framework automatically sending the message as an asynchronous message, but waiting for a response back before returning to implementer's client-side code.);

If a response/message is asynchronous, it is an aspect of this invention that this framework uses its own thread to call the registered implementer's code so that that code may be executed even while implementer's own (and possibly single) thread is doing something else.

What this framework provides is a number of essential services that make it far easier to develop extremely powerful client side applications (including the functionality invoked by GUIs) by eliminating the need to write all of the complex code required to provide communication, extensive security, and real-time receiving/processing of information. This leaves the purchaser (i.e., the implementer) of this framework (XYZ, in our example) free to develop only the "look and feel" on the client-side, and the "business logic" code on the server-side. For the GUI, this means that all the implementer must do is design and implement the screen layout and how it will operate, what commands it can send to the server-side code and what responses it will handle and how it will handle them. These elements of the GUI are, after all, specific to the application being developed and would have to be written from scratch for each new application anyway. On the server-side, all that need be developed is the business-logic—the code that determines what gets done when it receives a command or information and a command from a client. (E.g., perhaps a patient record gets stored, or a trade gets executed, or analysis specific to whatever application is being implemented gets executed with results returned to the client.) These elements of the server are, after all, specific to the application being developed and would have to be written from scratch for each new application anyway. Secure communications code, on the other hand, and the ability to handle real-time data asynchronously (coming in at any time) while at the same time being able to respond synchronously (waiting for a response after sending a request to the server) to a request made of the GUI by an end-user operating it are capabilities that would have to be developed repeatedly for every new complex application.

Conventionally, this development is largely repeated by each implementer; the invention is the first framework to provide these and many other capabilities. One aspect of the invention is the provision of these and other capabilities in a generic fashion within a framework, so that they can be reused without incurring the cost in money, time, and resources to write them over again for each application, and so that the capabilities are present in such a manner that the entity using the framework to provide these capabilities need not possess expertise in the areas addressed by these capabilities. On a slightly more specific basis, the invention includes the design by which this framework accomplishes these and other capabilities.

It is also true that the implementer's server-specific code need not concern itself with dealing with multiple requests from different connections concurrently as this is also handled by this framework. While this is not unique among frameworks (as EJB provides multi-threading in order to handle multiple connections as do servlet engines and web servers), the design of the way this framework handles these aspects is unique. (Of course, the ability to handle multiple requests within each single connection, is, as mentioned, claimed as unique to this framework.)

Although, in all of the above discussion, the implementer's client-side code (that uses the client side of the framework) has been a GUI (operated by implementer's employees or clients), it is very possible that the implementer's client-side code might simply be a system interface whereby the server that the implementer develops simply performs a service for some other of implementer's executing systems.

BRIEF DESCRIPTION OF THE DRAWINGS

FIG. 1A is a basic schematic of a software framework in accordance with a conceptual, very high-level view of the invention when examining what transpires over a single communications link.

FIG. 1B is a basic schematic of a software framework in accordance with a conceptual, very high-level view of the invention when examining what transpires over multiple communications links, some emanating from different locations.

FIG. 1C is a schematic of a software framework in accordance with a conceptual high-level view of the invention, while showing a somewhat more in-depth view depicting at a high-level how various framework server-side components are interconnected and interact for one of the communications links.

FIGS. 7A-B is a flow diagram of the instantiation and interaction of the inventive framework server components and depicts the basic flow and what happens when synchronous and asynchronous commands are sent and received.

FIG. 8 is a flow diagram of the instantiation and interaction of the inventive framework client components.

DETAILED DESCRIPTION OF THE PREFERRED EMBODIMENTS AND DRAWINGS

Figure 2:
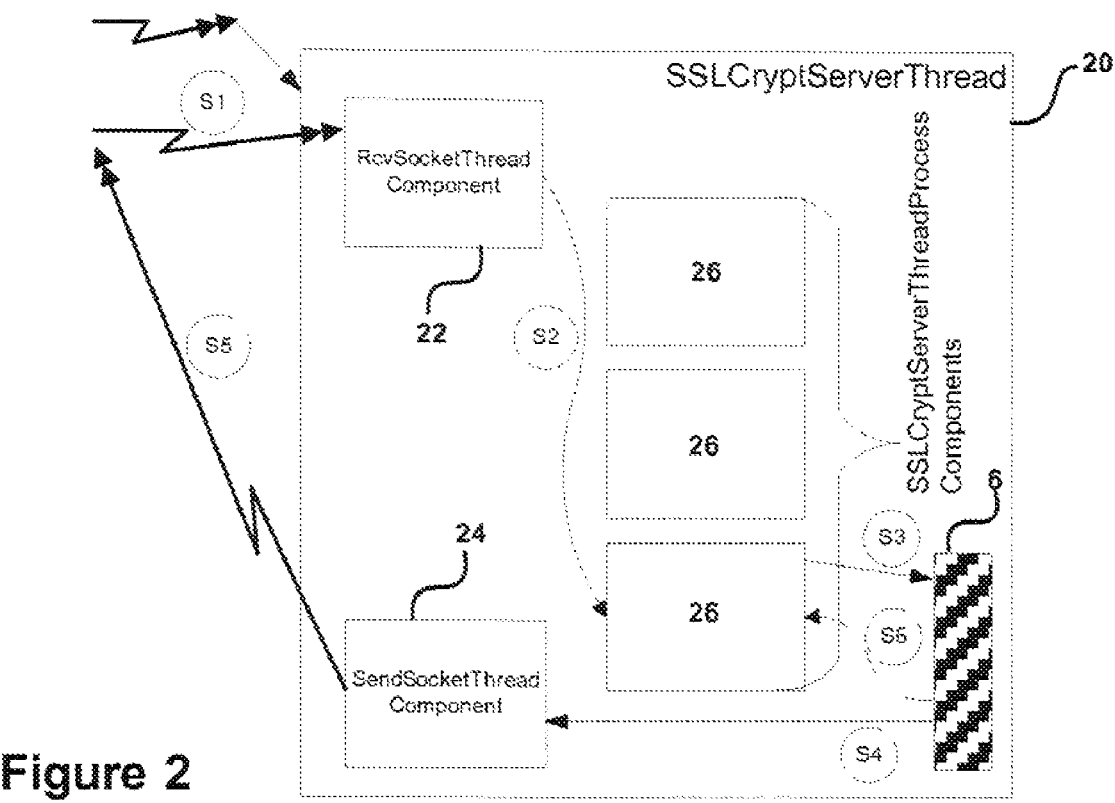
FIG. 2 is a schematic of a software framework server connection component in accordance with the invention.

There are some terms which will be defined here for the purposes of this document.

A communication link (or a communications link) is defined herein as a network connection through which a particular program executing on one computer can send messages/requests/responses to and receive messages/requests/responses from another program, usually executing on a different computer. A communications link is thus the aforesaid network connection between the two programs described, whereby a program on one endpoint of the link may be connected to the program on the other endpoint of the link over at least one of:

- a local area network (LAN);
- a wide area network (WAN);
- over an extranet (i.e., private network connecting multiple organizations);
- over the public internet;
- within a single computer (the uncommon and trivial case).

Purchaser: The party using this framework to develop and execute their product will be referred to as the framework "purchaser" or "implementer" interchangeably. Said party need only develop single-threaded server-specific code and single-threaded client-specific code, written to fit into this framework invention, in order to create a secure, scalable, and distributed application.

server-specific code: The purchaser will develop code to run on the server that needs to comply with a very simple interface in order to be run/managed by this framework. The code that the purchaser develops for this purpose contains the business logic that is specific to what the purchaser is trying to accomplish and is known as the "server-specific code".

client-specific code: The purchaser will also develop one or more programs on the client side to communicate with its server-specific code through this framework. This code may be a GUI interface for its clients (or end-users), or it may be an interface that enables another of its systems to communicate with its server-specific code for which the purchaser is relying on this framework to provide communications, security and scalability.

clients (or end-users): These are the clients of the purchaser. (The purchaser may be acquiring this framework to build a system that enables its clients to connect with its server-specific code over a communication link that purchaser is relying on this framework to provide.)

The invention is a powerful application software framework and infrastructure that enables development teams/organizations to rapidly develop widely distributed applications and/or ASP services over their own local, regional, or global networks and/or the public internet. It provides communication capabilities, massive scalability and extremely high-level security without requiring development teams to write any code to avail themselves of these capabilities. By removing the complexities associated with security and network programming (especially with concurrent multi-threaded, network programming), this framework enables teams/organizations to focus on the business logic (on the server side); and, either the GUI presentation logic OR the component interface code on the client side that are truly specific to their business (and where there can truly be value added).

The purchaser develops its server-specific code to fit into this framework by complying with a very simple interface (to be described later). The purchaser develops client-specific code which uses this framework to communicate with its server-specific code by simply having its client-specific code instantiate (i.e., create) a single class in the client component of this framework. The main client component (of this framework) provides for communication between the purchaser's (i.e., implementer's) client-specific code and the server-specific code of the purchaser (i.e., implementer) by:

automatically handling the establishment of the secure connection when the implementer's client-specific code creates it, and, immediately thereafter, sending the initial connect w/the username and password passed;

enabling the purchaser's client-specific code to register itself (via a simple function) for receiving asynchronous messages for when the main client component of this framework uses its own thread (as it does when it invokes purchaser's client-specific code), every time it receives an asynchronous message from the server;

providing one method to send a synchronous message to the server and another method to send an asynchronous message; and, finally, in order to handle synchronous messages sent (which are, like all messages in this design, sent asynchronously), automatically handling the waiting for the return of a response to such a synchronous message sent with provision to allow the purchaser's client-side code to specify a maximum time to wait before timing out.

In essence, the main client component of this framework provides for this communication by exposing a few simple functions (for creation, registering for asynchronous messages, and for sending) and then by handling everything else seamlessly and automatically. The interaction will be further described below.

Description of the invention will now be given with reference to the appended FIGS. 1-9. It should be noted that these drawings are of an exemplary nature and in no way serve to limit the scope of the invention.

FIG. 1A is a basic schematic overview of a core concept of the invention, framework 10. At the highest level, what transpires in a single connection between an implementer's client-side and server-side components can be thought of as depicted in FIG. 1A. The inventive framework 10 can roughly be divided into two portions, its server-side portion 11 and its client-side portion 14. On the server side 11, a top level server component 12 includes one server connection component 20 for each concurrent connection (communications link) that it will support. Each server connection component 20 communicates (through its sub-components—not shown in this figure) with an instance of an implementer's server-side code 6. Server connection component 20 and its sub-components are prewritten components, provided as part of the inventive framework to purchasers using the inventive framework to develop applications, where as server-side code 6 is the piece that is written by the purchaser to run within the server side of this framework. All of the communication, scalability and security capabilities that need to be provided on the server side in order to create a distributed application are already prewritten in top-level server component 12, server connection component 20, and the other components provided by this inventive framework for the server side that execute within each server connection component 20. All that an implementer need write is the application-specific purchaser's server-side code 6. Client side 14 represents a single end-user at a client site or a single case where an implementer's client-specific code 8, using the inventive framework's main client component 120, is looking to connect with and use the services provided by implementer's server-side code 6. (There may be many end-users at a single client site as well as many across many client-sites or user locations.) Unlike top level server component 12, client side 14 does not represent a component. On the client side 14, framework 10 includes the main client component 120, whereby it (and its sub-components—not shown in this figure) are prewritten and provided as part of the inventive framework in order to provide connectivity, security, and additional functionality to the application-specific purchaser's client-side code 8. As with the server side 11 of the framework 10, all the implementer need do to write the client side of a distributed application is write purchaser's client-side code 8, as the main client component 120 (and its sub-components) handle all of the communication, security, etc. on the client side.

As mentioned above, there may be many end-users at a single client site as well as many across many client-sites or user locations. This is depicted in FIGS. 1B and 1C. FIG. 1C further shows some of the inventive framework's components that function within the server connection component 20, such as: the reception component 22 that waits to receive messages and wakes up one of the connection process components 26 to process these messages when it does; the connection process components 26 that, in one configuration, execute said messages within an instance of purchaser's server-specific code 6 residing within the server connection component 20; and, the transmission component 24 used by purchaser's server-specific code 6 to send responses back over the communication link and through main client component 120 to implementer's client-specific code 8 (these will be explained in greater detail below).

FIG. 1C also shows the top-level server component as a client to other framework code executing within another server at purchaser's server location. The framework includes certain server-specific applications (e.g.: a signature server and/or a session server) that provide some of its capabilities and that run within the framework itself, such as Server Computer 3. Similarly, purchaser's server-specific code 6 is also executed by and within this framework on potentially multiple servers at purchaser's server location, such as on Server Computers 1 and 2.

The implementer's central location, i.e., server side 11 of framework 10, contains one or more pieces of server hardware (i.e., computers, shown in FIG. 1C), each of which typically run one top level server component 12 (called the SSLCryptServer in the preferred embodiment). Each top level server component 12 creates one server connection component 20 for each connection that they can potentially handle. Note that this framework enables multiple server machines to behave as a single unit; so, for the most part, we will discuss only one top level server component 12 and its ability to handle a pre-configured number of connections. Each server connection component 20, in turn, initially creates and controls one or more instances of purchaser's server-side code 6 for that connection (assuming the most common configuration of one instance of purchaser's server-specific code 6 per connection was selected).

Fundamentally, server connection component 20 and main client component 120 communicate over conventional communication pathways, e.g., the Internet or a private network, and act as the intermediaries between an implementer's server-specific code 6 and implementer's client-specific code 8. All communication between a single main client component 120 and server connection component 20 takes place over a single communications link, even though it may be the case that an instance of an implementer's client side code 8 maybe sending commands/requests while one or multiple threads from the components within server connection component 20 are supplying/returning information from threads started from previous asynchronous commands which emanated from same instance of said client side code 8. The server-side 11 of the inventive software framework 10 is run on one or more server computers, each running a top-level server component 12. The implementer's software developer(s) is(/are) only required to write a single-threaded server-specific component 6 and a corresponding single-threaded client-side piece of code 8.

The single threaded server-specific component 6 that an implementer/purchaser writes must implement (i.e., provide code for) the simple ServerThreadProcessInterface interface, which is shown in the code provided with this document. This simple interface defines only a handful of functions that an implementer must provide in order for his/her server-side code to be able to be plugged into this framework. Many of these functions may be implemented as empty (i.e., with no code); or, may be implemented to simply return 'true' or 'false' depending on the behavior that the implementer wishes of the inventive framework before and after it executes implementer's server-specific code. An important function of this interface (that an implementer must provide code for) is the executeCommand( ) method. This method is where the command or request coming from the client will be sent when one of the connection process components 26 (of a particular server connection component 20) executes code (via its own thread) on implementer's server-specific code 6. The executeCommand( ) method of an implementer's server-specific code 6 receives two arguments: the command or request in the form of a MsgPackage object; and, a reference to the transmission component 24 (i.e., the SendSocketThread component) so that it may send one or more responses back to the instance of an implementer's client-specific code 8 through the components of this inventive framework. An implementer's server-specific code 6 simply executes business logic that is specific to the application they are developing in order to take the appropriate action based on the command or request it receives. It may then choose to send one or more messages back to the instance of implementer's client-specific code 8 that sent the command or request. It may then: return 'true' to end its processing (i.e., to end the processing of the connection process component 26 so that the connection process component may pick up a subsequent command and execute that one when it is awakened to do so) and to tell the inventive framework to keep the connection alive; OR, return 'false', which also ends the processing of the connection process component 26 (that was executing the implementer's server-specific code 6), but this time instructs the inventive framework to terminate the connection (thus requiring implementer's client-specific code 8 to reestablish the connection if it wishes to send another command—although, the framework components on the client side of the inventive framework can be configured to automatically reestablish the connection prior to sending the next request); OR, implementer's server-specific code 6 may simply not return at all—e.g., if the command were to subscribe to a market data service, it would be desirable for this code simply to wait for messages from this service and pass the relevant ones back to the instance of implementer's client-specific code whenever they occur. While the last mentioned of these possibilities leaves a connection process component 26 tied up, this works fine because, uniquely, there is more than one connection process component 26 serving each communication link. Performing the appropriate business related task within its executeCommand( ) method is practically all an implementer has to code as the inventive framework takes care of the rest.

As alluded to above, the components of the framework, e.g., each instance of the client-side components, can be configured to automatically reestablish a lost connection with the server-side software. To this end, the server-side software can store state automatically when it detects the connection to be lost. During reestablishment of a lost communication link, the server-side software is able to restore state so that implementer's server-specific code and client-specific code operate as if the communication link were never lost.

Some of the other methods that implementer may wish to implement on the server-side (that are also part of the ServerThreadProcessInterface) are:

void init( )—enable implementer's code to initialize boolean preSaveState(boolean interruptedOrConnectionLost)—to tell the inventive framework whether to save state (with its integrated session server) so that information is accessible upon a reconnect; etc.

Full details of the simple interface that needs to be implemented by purchaser using this inventive framework is available in the accompanying code. The simplicity of this aspect of the design, which enables implementers to learn and to write code to execute within the inventive framework in a much shorter timeframe than competing technologies, is a unique advantage provided by this inventive framework.

The specifics of server connection component 20 are depicted schematically in FIG. 2. Server connection component 20, (i.e., the SSLCryptServerThread component), has associated with it or includes a separate reception component 22 whose function is to receive incoming messages and instructions (the RcvSocketThread Component). Similarly, each server connection component 20 includes or has associated with it a separate transmission component 24 whose function is to send outgoing messages and instructions (aka the SendSocketThread Component). Each server connection component 20 also has associated with it or includes one or more connection process components 26 (aka SSLCryptServerThreadProcess components), each of which handles one message or command at a time from a client. Thus, since in the example shown in FIG. 2, each server connection component 20 has three separate connection process components 26, each connection with a given client may have up to three messages or commands being processed simultaneously and asynchronously (i.e., not dependent on each other to wait for an answer).

A thread is a stream of instructions that runs through/within one or more components and that is executed by a computer independently from and simultaneously with other threads and processes. In the inventive system, the server component, 12 (named as 'SSLCryptServer' in the provided embodiment); server connection components, 20 (within the server component 12 and named as 'SSLCryptServerThread' in the provided embodiment); reception component, 22 (within each server connection component 20 and named as 'RcvSocketThread' in the provided embodiment); transmission component, 24 (within each server connection component 20 and named as 'SendSocketThread' in the provided embodiment); and, connection process components, 26 (within each server connection component 20 and named as 'SSLCryptServerThreadProcess' in the provided embodiment) all run within independent threads. The purchaser's(/implementer's) server-side code 6 (also known as purchaser's/implementer's server-specific code although its actual name in an implementation is whatever the purchaser/implementer chooses for it) is not run within its own thread, but rather it is executed within the threads of the connection process components 26 which invoke it. Since each reception component 22 runs in its own thread, the server connection component can continue to receive new requests even while previously received requests are being processed (by connection process components 26).

A thread 'blocks' itself by putting itself into a suspended state where it requires few or no CPU cycles (i.e., it does not waste valuable compute resources of the computer it is running on). Such a thread will remain in its suspended state until awakened by the operating system due to an external event (e.g., an incoming message on a socket connection); or, until awakened by another thread that it is waiting on (by virtue of that other thread being the one to wake it by synchronizing on the same object's monitor that blocked thread is suspended on, and causing the operating system to notify it). A typical handling of a request sent to the server is shown in FIG. 2. In step S1, after an incoming connection is assigned by the server 12 to one of its server connection components 20, the connect request and all subsequent requests are received by reception component 22. The reception component 22 runs its own thread where its own thread is suspended waiting for an incoming message. Every time it receives an incoming message, reception component 22 will store the incoming message in its internal queue and wake up the thread of one of the connection process components 26 in step S2 that are waiting to be utilized. It does not matter which 26 connection process component is woken up. As soon as reception component 22 sends the wake up call in step S2, reception component 22 puts itself back into suspend mode, again waiting for the next incoming message. Reception component 22 does not know which if any of the connection process components 26 were awakened, as it is irrelevant to the functioning of reception component 22.

Since each connection process component 26 runs in its own thread, independently of what is happening in reception component 22, reception component 22 can return to listening for the next incoming message before or during the time when the active connection process component 26 is working on the current message. The active connection process component 26 retrieves the message from reception component 22 by using its own thread to request the message from reception component 22 (after step S2). At step S3, active connection process component 26 invokes the purchaser's server-side code 6 and executes the request in its own thread. While a connection process component 26 is processing a given message, reception component 22 is waiting for its next message which may come at any time. If a new message were to arrive at this point, one of the other two inactive connection process components 26 would have its thread awakened (as in Step S2) so that it could retrieve and start processing the next request. The various connection process components 26 can each retrieve and process messages independently of each other and need not wait for each other.

As a result of the purchaser's server-side code 6 being executed by one or more connection process components 26, one or more messages may be sent back to the client at step S5 using transmission component 24 (i.e., "SendSocketThread Component"). More specifically, at step S4, the return message is sent to transmission component 24, and then transmission component 24 sends the message to the main client component 120 (which has its own reception component, as will be discussed below) at step S5. Transmission component 24 runs within its own thread so that the thread of the connection process component 26 that is running purchaser's server-side code 6 can continue to execute after passing the message to transmission component 24. Since multiple connection process components 26 can be executing in the same or different portions of purchaser's server-side code 6 at the same time, transmission component 24 can receive multiple messages from multiple streams of execution simultaneously.

After executing some code and perhaps sending some messages back to the client, purchaser's server-side code 6 may return control back to the connection process component 26 that invoked it, as shown in step S6. This enables the connection process component 26 to return to an idle state from which it can be awakened to process a new incoming message or request.

Figure 3:
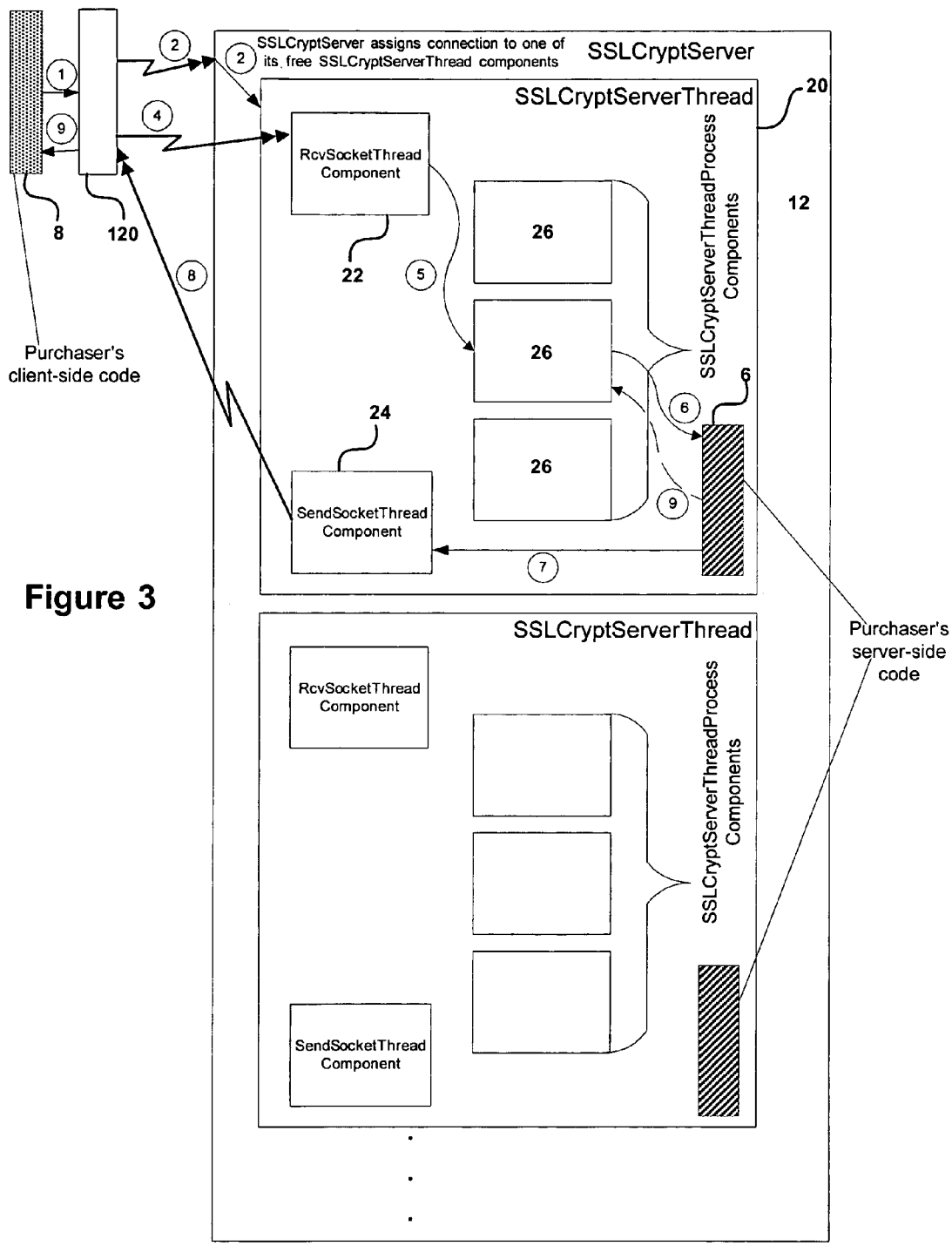
FIG. 3 is a schematic of multiple instances of the server connection component of FIG. 2 on a server in accordance with the invention.
Figure 4:
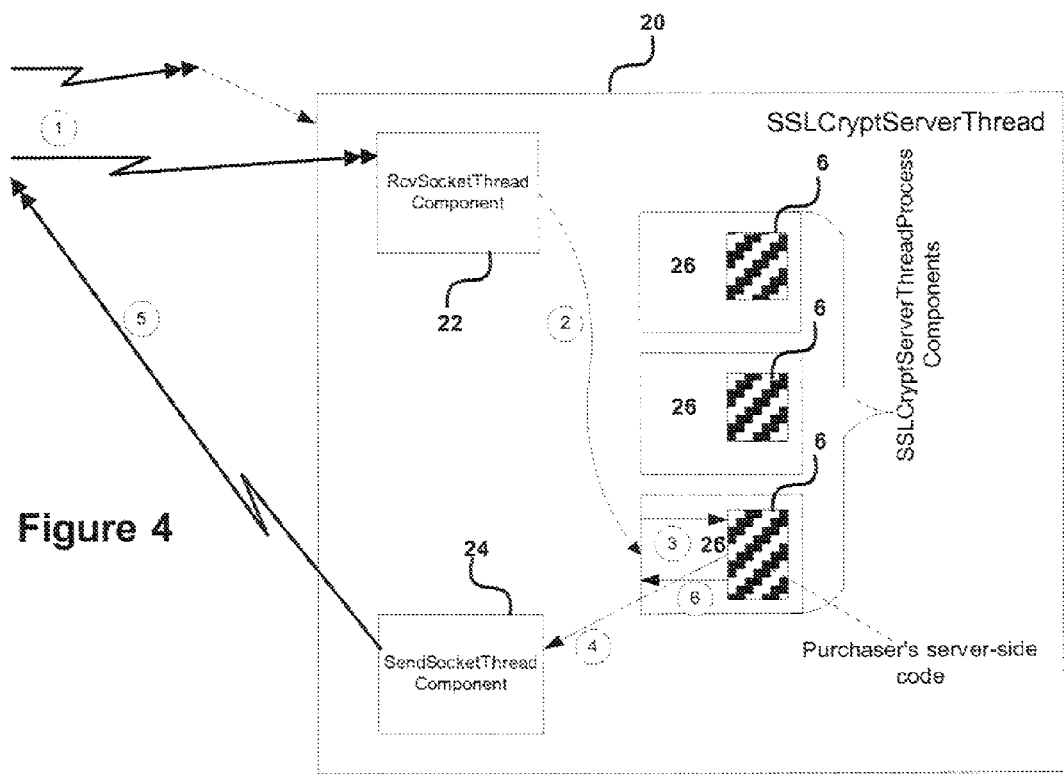
FIG. 4 is a schematic of a second configuration for instantiation and access of the implementer's server-side code in which each connection process component, has its own instance of the implementer's server-side code.

The inventive framework is adjustable among several different configurations. FIG. 3 depicts a configuration that corresponds to the server connection component 20 shown in FIG. 2: each server connection component 20 has a reception component 22, a transmission component 24, and connection process components 26, as well as its own instance of purchaser's server-side code 6. That is, each and every server connection component 20 has an instance of purchaser's server-side code 6 associated therewith. Each of the connection process components 26 must access a common instance of code 6. In FIG. 4, each connection process component 26 has its own instance of code 6, and in FIG. 5, there is only one instance of code 6 per server 12. Examples of systems that employ these configurations appear below.

Figure 9A:
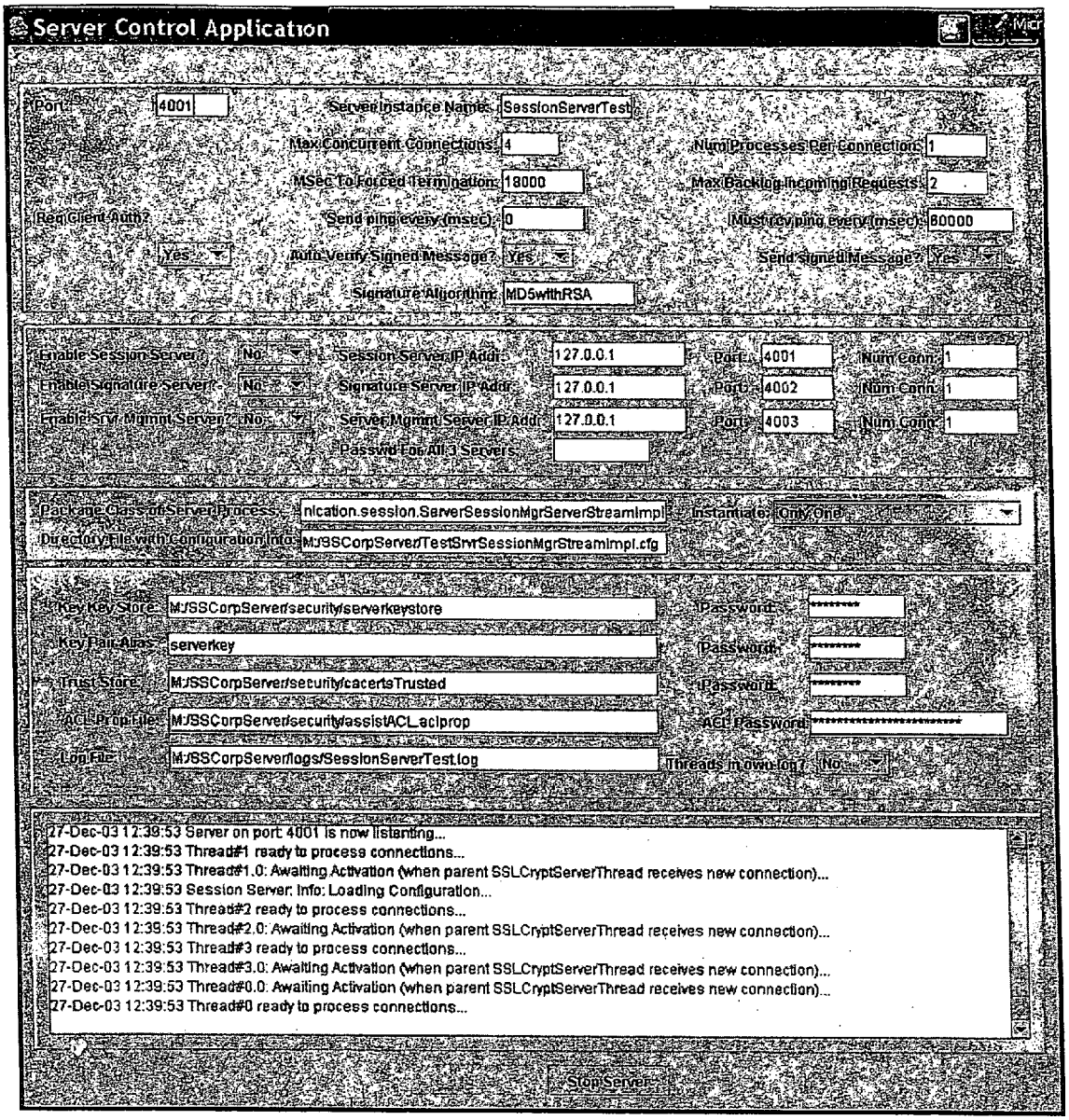
FIGS. 9A-D are sample screen shots of a set of generic server startup screens.
Figure 9B:
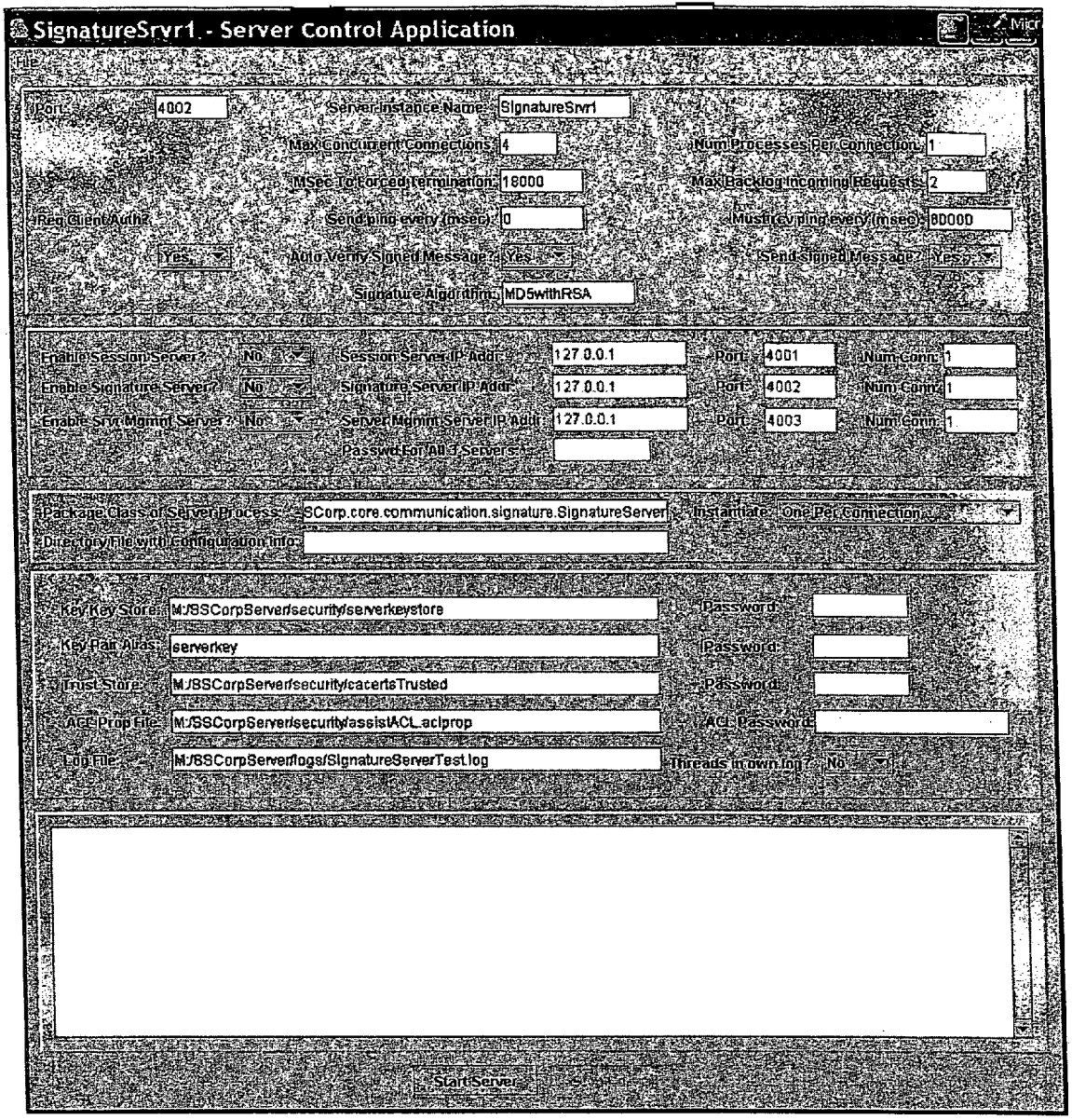
Figure 9C:
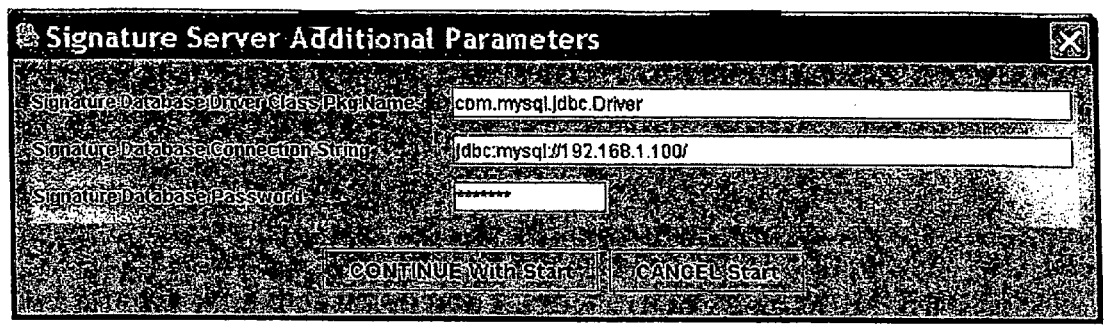
Figure 9D:
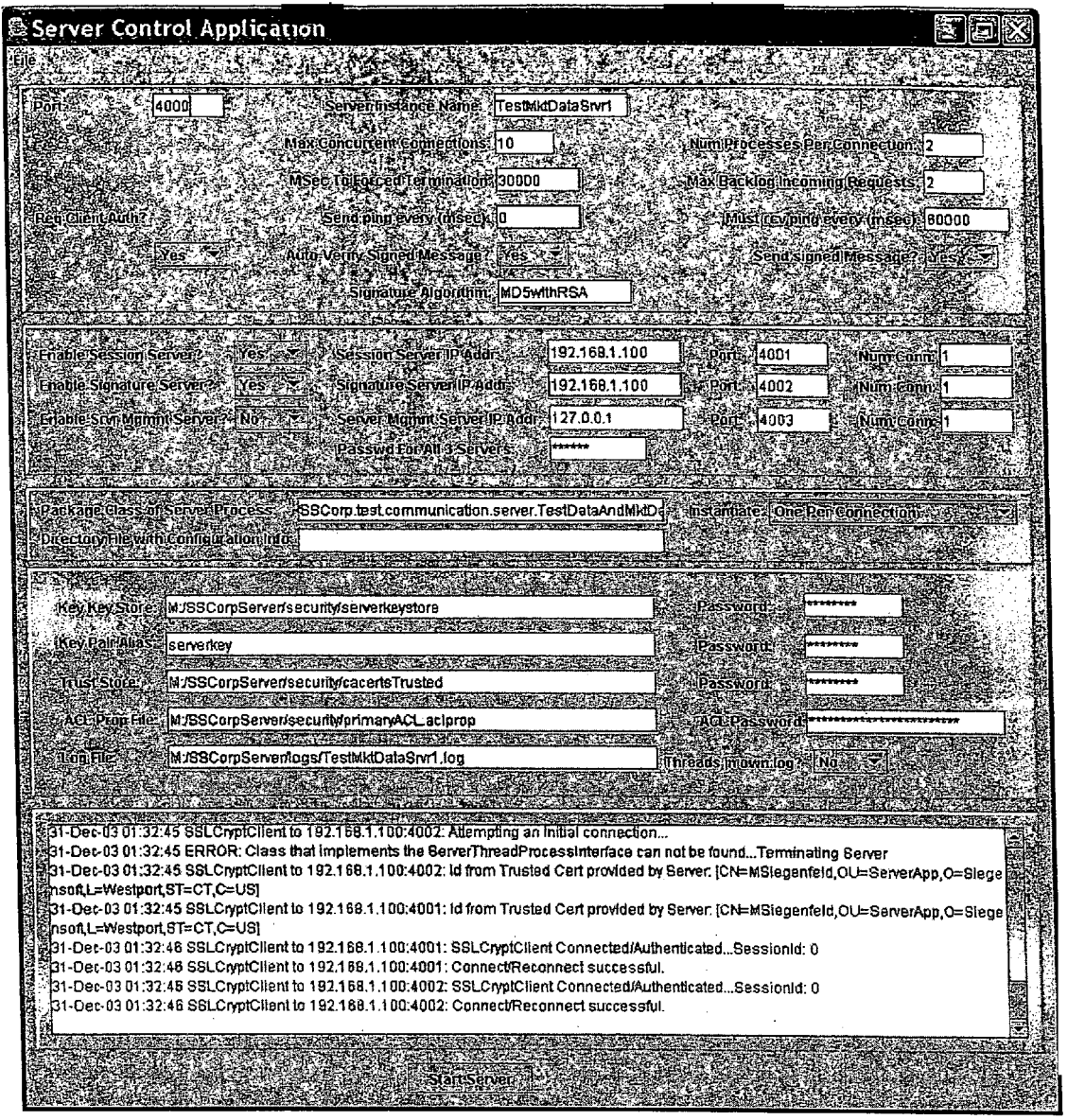

The inventive framework is not only capable of being configured in any one of these three configurations, it comes pre-configurable in all of these three configurations. The purchaser need only select from a menu at startup which of the three configurations he wishes to implement. Also, the purchaser can select how many connection process components each instance of each server connection component 20 has. Other types of configurable details include how many server connection components are initially created upon startup ("preinstantiated", to be discussed below), and what level of security to implement. FIGS. 9A and 9B show the startup screen that is included in the embodiment provided that demonstrates some of the easily configurable parameters that can be set to control how the server side of the this inventive framework operates and how it interacts with implementer's code.

Figure 6A:
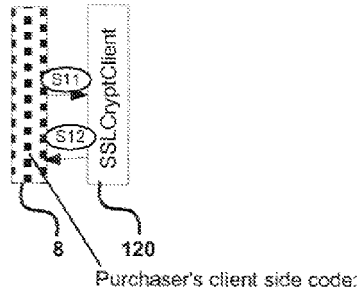
FIG. 6A is a schematic of purchaser's client-side code sending a request via the framework's client component and receiving a response back.
Figure 6B:
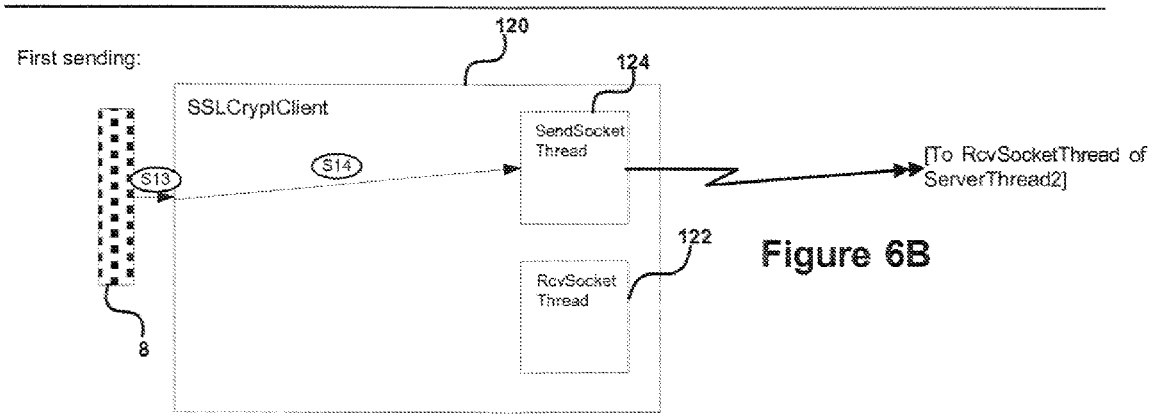
FIG. 6B is a more detailed schematic of FIG. 6A showing the framework's client-side components in more detail and depicting what transpires when sending of a command/request.
Figure 6C:
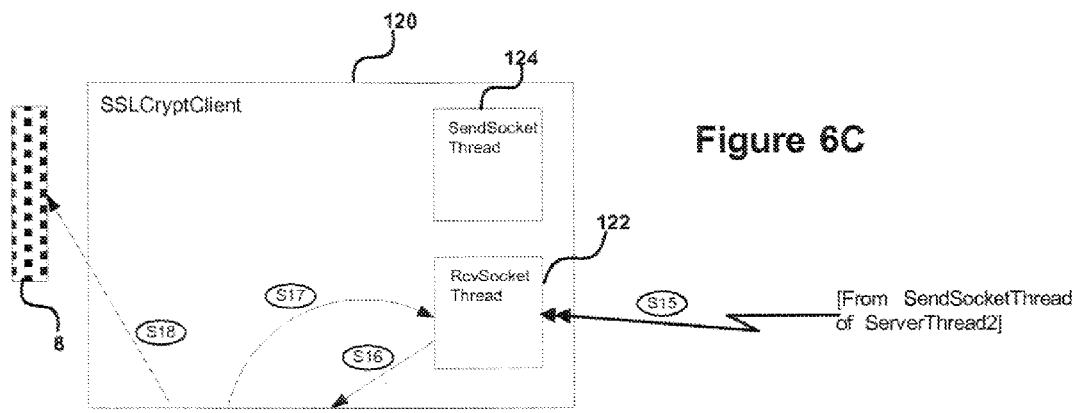
FIG. 6C is a schematic illustrating the reception of a message by the client component of FIGS. 6A-B.

Having described the details of server connection component 20 of the inventive framework, the description continues with an analysis of the main client component 120, as depicted in FIGS. 6A-C. As mentioned above, the client side of the framework includes purchaser's client-side code 8 and a main client component 120 (see FIGS. 1A-C). More specifically, unlike the server-side where it is the framework that initially pre-instantiates the purchaser's server-side components for its own use (prior to accepting its first connection), it is up to the purchaser's client-side code 8 to instantiate the main client component 120. When it does so (which it must do in order to be able to use the framework and establish communication via the framework to purchaser's server-side code), a secure connection is automatically established; and, also automatically, a 'connect' or 'reconnect' command is sent by 120 with the username and password that client code 8 passed to main client component 120 upon the initial creation of main client component 120. That is, main client component 120 requires a username and password as parameters during its instantiation.) (Note: 120 will automatically send this first command. As will be discussed further later, the server will validate the username and password against the digital certificate used to establish the secure session and will cut the connection if either the first command sent is not a 'connect' or 'reconnect' or username and password are not valid for that certificate.)

After client-side code 8 instantiates the framework client component 120, it should register with that component 120 to let it know that client-side code 8 wishes to receive any asynchronous messages sent via the framework to component 120. Note that when main client component 120 is instantiated and establishes a connection with the server-side framework components, it creates an instance of a reception component 124 (the same class as the server's reception component 24) and a transmission component 122 (the same class as the server's transmission component 22) to manage the connection. Reception component 122 and transmission component 124 function in substantially the same way as their counterparts in server connection component 20, i.e., reception component 22 and transmission component 24. Each of these are run within their own threads with reception component 122 waiting on an incoming message from the server on that socket. Client framework component 120 then starts its own thread, so that the thread that started this creation can then return and wait on user input from the end-user of this GUI (assuming the purchaser's client-specific code is a GUI, which it need not be).

Thus, on the client side, there are four threads because, unlike on the server side, purchaser's client-side code 8 runs within its own thread. This is the thread that is sitting there waiting for the user to take an action on his/her GUI (e.g., a mouse click on a button or a letter typed on a keyboard, etc.). If the user were to press a button calling on a request/command to be sent to the server, then that thread would send the command to the server (by calling its SSLCryptClient's (component 120's) sendSynchronousMsg(<msgToSend>) command) prior to waiting for the next user action on the GUI. If the command sent to the server were synchronous, that thread would be held up in the sendSynchronousMsg( ) method of client framework component 120. Client component 120 would send the command to the server asynchronously and would then wait for a response back prior to returning control to purchaser's server-specific code 8 that invoked the sendSynchronous( ) call, so that it could then continue with its work (or, in the case of a GUI, wait again on the next user action). During the time it was waiting on the response or performing work with the response it had received, the GUI would be "dead" (as its thread was in component 120's sendSynchronousMsg( ) method waiting for a response)—i.e., unresponsive to user input or mouse clicks. Of course, this time might be so short that it might not matter, or it might be desirable for no action to be allowed until the server processed and returned a result or status to that request. Nonetheless, during the time that the GUI is waiting, it would not be suitable if it could not receive and process asynchronous messages (e.g. stock prices) as soon as they were delivered. As asynchronous messages received are processed by component 120's own thread and not by the thread that was executing in purchaser's client-specific code 8, client code 8 can still be called by 120's thread to process a message (e.g., to display the stock price) even while 8's own thread is waiting for a return from its call to sendSynchronousMsg( ) method within component 120. If the message sent is to be sent asynchronously, purchaser's client-specific code 8 will simply send the request to the server side code by using the sendAsynchronousMsg(<msgToSend>) command of the main client component 120 that it has instantiated, and then control will be somewhat immediately returned to the thread in implementer's client side code 8 that invoked it.

Thus, on the client side, four threads are being employed simultaneously. The first thread began executing client-side code 8 and was returned to after instantiating main client component 120. This thread then waits for user input/action, e.g., on the GUI (assuming implementer's client-specific code is a GUI). The second thread executes in the transmission component 124, which is blocked until it needs to send a message. The third thread executes in the reception component 122, which is blocked until it receives a message from the connection—i.e., from the server—which will wake it up.

Finally, the fourth thread executes in main client component 120 itself; it waits to be notify( )d (i.e., awakened) by the reception component (i.e., by the code executing in the 3rd Thread—see above).

The process is shown in FIGS. 6B-C. In FIG. 6B, client-side code 8 sends a message or command to the main client component 120 at step S13. Main client component 120 passes this message to its transmission component 124, which sends the message across the communications link to be received by reception component 22 of server connection component 20. In FIG. 6C, when a message is returned from transmission component 24 of server connection component 20, it is received by reception component 122 of main client component 120. Reception component 122 then wakes up the thread in client component 120 in step S16, and this thread (executing within client component 120) retrieves the message from the queue of reception component 122 in step S17. It is important to note that the thread executing in client component 120 uses its own thread to perform step S17. Next, in step S18, if the message sent by the server is flagged as asynchronous, the thread executing in client component 120 invokes a method in the client-side code 8 (passing it the message it retrieved in step S17), and then goes back to waiting to be woken up by reception component 122 (when the next incoming message is received and the process just described begins again). (If the message sent back by the server is flagged as being a response to a synchronous command, then, in step S18, the thread executing in client component 120 places the message it has read from its reception component 122 in a place where it is accessible, and then wakes up the thread from client-specific code 8 that had been blocked in the sendSynchMsg( . . . ) method call that it had invoked. At this point, said thread [from client-specific code 8 that had called sendSynchMsg( . . . )] will access the message and return it where it can now continue its processing [or wait on another end-user request].)

If an asynchronous command needs to be sent (or a synchronous one for that matter), a method (either sendSynchMsg( ) or sendAsynchMsg) is called by the purchaser's client-specific code on the SSLCryptClient object (the name of 120 in the specific implementation of the invention) that it now "owns" (e.g.: mySSLCryptClient.sendAsynchMsg (<msgToSend>);).

The thread that sends this message (the thread executing within the implementer's client-specific code 8) then goes back to waiting (or performing whatever tasks implementer has programmed it to execute). Client component (SSLCryptClient) 120, as part of its execution within the first thread's calling its sendAsynchMsg( ) method, puts the message on the SendSocketThread's 124 queue and causes the thread that is "blocked" in the SendSocketThread 124 to wake up and send the message to the server—all the while, the thread running client code 8 has returned to the client side code to wait on user input. As an example, suppose the asynchronous command causes the thread executing in one of the connection process components 26 (on the server-side) to execute code within implementer's server-specific code 6 that subscribes to a market data service (e.g., stock prices), and sends back stock quotes (asynchronously) whenever they occur. In this example all is quiet again. Now, every time a stock price comes through as a message from the server, it wakes up client reception component 122 in the specific implementation of the invention, see S15 of FIG. 6C). That thread that is running in reception component 122 places the incoming message on a queue, sends a wakeup (notify( )) call to the main client component 120, and immediately goes back to waiting for the next message on the socket. However, even while reception component 122 is waiting for the next incoming message to put on the incoming queue, the main client component 120 (which has been awakened) takes the message from reception component 120's incoming queue and uses its thread to execute it on all registered listeners—in this case, a method in purchaser's client-side code 8 that may cause the stock price to be posted on the GUI.

The server components of this framework automatically multi-thread the server-specific code written by the purchaser and also automatically enable the server-specific code to be run across multiple machines. If the purchaser desires, its server-specific code may even be multi-threaded within a single connection. This last mentioned capability, which is unique to the inventive framework (and certainly not available w/EJB) would enable the server-specific code to generate and send an asynchronous stream to the client in one thread, e.g., while responding to synchronous traffic with another. It also would enable the server-specific code to execute and respond to multiple asynchronous commands from a single client concurrently.

The client components of this framework automatically multi-thread the client-specific code, enabling it to, e.g., receive asynchronous messages from the server-specific code while still allowing the end-user to simultaneously interact with the server by sending synchronous and/or asynchronous requests/commands. Alternatively, if the client-specific code is not an end-user GUI but some sort of system interface, this automatic multi-threading could enable the interface to pass back information from the server-specific code to the system it was interfacing from while simultaneously accepting commands from that from system and passing them to the server-specific code on the server side of the system implemented with this framework.

The purchaser (i.e., the implementer) does not need to write multi-threaded code in either their client-specific or server-specific code to accomplish this concurrence. Unlike EJB, the purchaser is not prevented/forbidden from starting their own threads from within their server-specific code; although, due to the capabilities and flexibility of this framework, except in rare and extremely specialized situations, there is unlikely to be a need to do so. The purchaser also need not write any code to specifically set up or handle communication between the client-specific code and the server-specific code.

Additionally, the purchaser need not write code on either side to handle security as this framework automatically sets up and manages a two-way authenticated and encrypted SSL channel between the client-specific and server-specific code that the purchaser develops. The validation process is further enforced by an ACL (Access Control List) that ties username-password pairs to particular digital certificates. This framework also automatically digitally signs all messages on the sending side (if desired) and verifies signed messages on the receiving side. This capability combined with the integrated signature server provides for legally enforceable non-repudiation capabilities enabling the purchaser to prove the ownership of requests and commands emanating from its client-specific code (or, although less commonly desired, from its server-specific code) even after the fact.

Because so much functionality is provided by this framework, and because the interface for both the client and server components was designed to be extremely easy and quick to implement, the learning curve for a team to use this interface is usually less than one day, and, the development of systems that use this framework require little time and code beyond what is required to write the business logic for the server side and the client-specific code (usually a GUI specific to the application or an interface to enable other systems/components to access the implementer's server-specific code) on the client side.

Finally, in addition to simplicity of use, this framework was designed with high performance as a primary objective. Preliminary performance analysis indicates that this objective was more than achieved.

The invention automatically and seamlessly provides the following capabilities:

1. Connectivity/Communications Capabilities

The framework enables the flow of information between client-specific code and server-specific code without requiring development teams to write code to provide for this capability. It also provides automatically for Synchronous AND Asynchronous communication concurrently AND over the same single socket connection. (Note that EJB cannot handle asynchronous communication at all.). If required, this could facilitate seamless (asynchronous) delivery of highly-dynamic, real-time, information to automatically multi-threaded client code (e.g. real-time price quotes in a trading system).

Concurrently (with the delivery of real-time information), end-users of the application would be able to execute commands that are sent to the server and immediately (as they are sent) receive the replies back to these synchronous requests.

Again, all of this is accomplished without any development work required by the organization using this framework.

2. Extremely High-Level Security

This framework takes advantage of state-of-the-art security technology providing a far greater degree of security than standard SSL-based web communication. These capabilities render this framework suitable for applications where highly sensitive information (e.g., medical records), or transactions of large monetary value or financial exposure (e.g. fixed-income, foreign exchange, or any types of institutional trades) are sent/modified/transacted over widely distributed, semi-secure local/regional/global networks, or even over totally insecure networks such as the public Internet. This framework provides for:

Encryption: 128-bit encryption as provided for in the SSL libraries being used.

Two-Way Authentication: A two-way authenticated SSL-channel using digital certificates on both sides. (This is provided for in the SSL libraries but not provided automatically in standard SSL connections.)

ACL Permissioning (the tying of certificates to username-password pairs): Additionally, this framework provides for and uses ACLs (Access Control Lists) which tie particular Username-Password pairs with particular certificates. In order to gain access, an entity must not only connect with a trusted and permissioned certificate (the "trusted" part handled by the "Two-Way Authentication" capability described above), but the certificate itself must be in the ACL and must be connected to the username-password pair that is sent in the first command immediately following the establishment of a connection. On the client side, this framework automatically/transparently sends a connect or reconnect command as its first command; on the server side, this framework will terminate the connection if the first message received is not that. Many systems that require two-way authentication will validate someone if they connect with any valid certificate and then enter a valid username-password pair. This system provides for stronger security by having the ACL (and associated capabilities) support the tying of the certificate with the username-password pairs that are allowed to connect under it.

Given the two aforementioned capabilities, if an entity logs in over the interne, the system developed with this framework can not only be sure that the entity logged in with a correct username-password, but that the login came from a machine where a digital certificate was installed that was provided by the organization using this framework (and, of course, that the username-password pair ties with this provided certificate).

Integrity: SSL guarantees that messages received have not been tampered with over the wire.

Non-repudiation: This framework automatically digitally signs and verifies messages in both directions (i.e., from client-specific code to server-specific code and vice-versa), logging and rejecting any messages that do not successfully verify. (Development teams may, for non-sensitive information e.g. market data, opt out of signing/verification on a message by message basis.) (If a message is signed, it is automatically verified upon receipt.) Signed messages may be stored. Since only the client of the purchaser with the private key corresponding to the digital certificate that properly verified the message could have been the one who signed the message, by storing all signed commands, the purchaser will be able to prove—in court if necessary—that the originator of any given command (e.g. a trade or bid/offer in the financial community; or, a request to alter a medical record; etc.) was in fact who the purchaser supposed them to be. This ensures that any commands reaching the server-specific code (or, the client-specific code if that is desired) may not be repudiated by the entity that sent them and that the purchaser will always be able to prove the ownership and content of commands/requests coming from their clients. This framework provides for these non-repudiation capabilities through the automatic digital signing, verifying (and logging/rejecting of unverified messages) as already mentioned, as well as by providing a signature server to store digitally signed messages (and their associated certificates). No part of these non-repudiation capabilities is provided for by SSL; and, although digital signing and verification is provided for in the Java libraries, it has never been provided for automatically as part of a framework (and certainly not with the supporting pieces—e.g. the signature server) that enables others building applications to achieve this non-repudiation capability without writing complex code to accomplish this themselves.

To summarize: Users of this framework can be certain (see "Integrity" above) that messages sent/received were not tampered with in transit and that the entity sending the message is who they say they are (see "Two-way authentication", "ACL Permissioning"), and can also be certain that each signed message was produced by the organization signing the message. These signed messages may be stored so that, not only in transit, but at any future time after the fact, the purchaser of this framework will be able to prove that the message sent came from the signer and was not tampered with. This framework provides a signature server as one of its three "assist" servers to store all of these signed messages. As Congress has recently passed a law that gives digital signatures the same legal weight as physical signatures, by providing the capability to prove that a client could, e.g., have been the only one to have produced a trade execution; or, e.g., could have been the only one that sent the command that altered a particular medical record, this framework provides stronger non-repudiation capabilities over the public internet than most trading systems in the financial community provide for their systems that run to their clients over private networks.

3. Scalability

This framework enables the server-specific code 6 (i.e., the code containing the business logic developed by the purchaser to build their product) to execute for any number of connections (communications links) on each single server (with each connection [communications link] handled by a server connection component 20 executing in its own thread) and, on any number of server computers (each running a single instance of the server component 12 [with its own server connection components 20]) without requiring the writing of any specialized code by the purchaser. Each of the n-connections per machine×m-machines will handle a concurrent client connection, so the purchaser will be able to handle n×m simultaneous connections, each with the ability to process up to a pre-determined number of concurrent requests (set by configuration parameters).

Writing multi-threaded server-side code is not a trivial matter, and writing code that not only seamlessly provides this capability, but provides it across multiple machines is even more difficult. A major strength of this framework is that, like top-tier EJB platforms, this framework handles all of this automatically. Development teams writing server-side code do not write code that multi-threads their business logic; nor do they write code that routes reconnect requests to particular threads (nor even to particular machines). Rather, even if a disconnect occurs and a reconnect is attempted, their clients may start off where they last connected (assuming they are re-authenticated and validated), regardless of which machine or thread (instance) each is connected into upon reconnection. This means that all threads handling client connections both within and among machines behave as a single entity. It means that purchasers using this framework will be able to scale the system they are building (i.e., the number of processes and hardware serving incoming requests) in accordance with whatever utilization/growth they encounter without writing code to accomplish this. Expanding scale simply requires changing configuration parameters that determine the number of server connection components 20 that will execute on any particular machine and/or adding hardware (i.e., machines), but requires no development effort. (As with major EJB platforms, this framework's components act as a container on each machine executing server-specific code. A session server is provided as an assist server to tie instances of the inventive framework together that are running instances of the server-specific code on different machines.) The handling of all of these simultaneous processes as a single entity as well as the ability to seamlessly scale are critical advantages gained by embracing this framework.

Although, as mentioned already, these capabilities are capabilities claimed to be provided by top-tier EJB products already on the market, the manner in which these aforementioned capabilities are provided, and the functionality and performance provided to server-side components are very different. It is the unique composition and design of the components of the inventive framework and the unique manner in which they interact with each other and with the implementer's server-specific code that provides this framework with its performance and simplicity-of-implementation advantages over EJB (even for those capabilities that both EJB-based frameworks and this invention framework claim to provide in common). It is also this unique design that enables this invention framework to provide capabilities beyond those provided by EJB-frameworks, such as the capability to multi-thread implementer's server-specific code, not only across multiple connections (communications links), but, within a single connection as well. Simply put, the invention framework provides a significant set of the capabilities that EJB-frameworks provide, but, in a superior manner—with significant advantages accruing to an implementer using the invention framework vs. basing their development on an EJB-based one; and, it also provides a set of critical capabilities that EJB-based frameworks don't provide and can't provide at all.

4. Rapid Application Development (RAD)

This framework was developed with ease of use and implementation as a high priority. Among many features that provide for this are:

Seamless/automatic provision for capabilities: The capabilities mentioned above (including Connectivity w/simultaneous synchronous/asynchronous msgs over a single socket; Security w/automatic SSL handshaking; two-way authentication; signing/verifying/storing of msgs for non-repudiation; ACL checking; automatic execution and enforcement of connection protocol; etc.; and, Scalability n connections per machine×m machines w/a session server facilitating the execution of the server-specific code across machines; etc. are all provided seamlessly and automatically without the purchaser developing any code in either their server-specific or client-specific components to make use of this functionality.

Tiny learning curve: Unlike EJB, which has thick instructional volumes written on how to develop a system and purchaser-specific code for use with EJB, this entire framework can usually be learned by development teams in less than one day.

Ease of development: No multi-staged compiles w/stubs and skeletons, and no deployment descriptors. All that is needed is to simply implement a few functions in the ServerThreadProcessInterface in the server-specific code, and to instantiate and use a provided class of the client component of this framework in the client-specific code. See the interface description in the provided code for the ServerThreadProcessInterface and the accompanying comments for a full description of what an implementer could provide in his/her server-side code.

5. Performance

Performance was of the highest priority when this framework was being designed; and, while not fully measured yet, preliminary results indicate that performance is nothing short of astounding and clearly far exceeds the capabilities of EJB. This is due to the unique way this framework has been designed:

Messaging Paradigm: This framework uses a messaging paradigm and sends all communication asynchronously, even when communication is synchronous. (For synchronous messages sent by the client-specific code, the client components of this framework block for the asynchronous return message thus providing the client-specific code with synchronous service. It should be noted, however, that even while this is occurring, asynchronous messages from the server are still delivered in a separate thread and without the purchaser having to write multi-threaded client-specific code.) The use of a messaging paradigm is far more efficient and is far superior to the RMI (CORBA-type) mechanism used by EJB, which requires the marshaling and un-marshaling of parameters/objects as well as messages which can be quite a bit larger than needed in order to preserve object structure/integrity. This framework also uses an extremely light protocol.

Pre-instantiation: Virtually all framework objects and instances are pre-instantiated when the server starts. E.g.: All server components, their processes and the objects that manage them are created when the server first starts and most are never destroyed. (The exceptions are only the very light-weight transmission component 24 and reception component 22 that are instantiated anew by server connection component 20 when it is assigned a new communication link in order to manage that link.) All instances of the purchaser's server-specific code that could possibly be needed are pre-instantiated and initialized, and, unlike with EJB, this also holds true for "stateful" interactions. All of these object instances are reused to serve multiple requests, sessions and connections. EJB container vendors typically only re-use objects in stateless interactions. In fact, the EJB specification requires that "stateful session beans" be destroyed and created new for each new connection—i.e., session. The approach of this framework is to call an init( ) function, which is one of the functions that may be implemented in the purchaser's server-specific code when that code is to begin executing for a new connection. This provides the server-specific code with the opportunity to reinitialize without requiring the expensive process of constantly reallocating and re-instantiating a server-specific instance with each new session. Re-instantiating framework components and/or server-specific code instances is a large drain on server performance.

Latched/synchronized handshaking with selective notification among framework components: The methodology designed ensures the fewest wasted CPU cycles and maximum efficiency and is probably the biggest reason for the efficiency of this framework. A very tightly designed set of interacting components on the server side of this framework provide just-in-time notification so that components are only "awakened" at the exact time they are needed to perform processing. (E.g., server connection component 20 objects each of which run in their own thread are awakened only when a connection is assigned; they immediately create and start a transmission component 24 to be used by the server-specific code to send responses back to the client and a reception component 22 to receive incoming requests each within its own thread and then the server connection component 20 wakes up each of the one or more connection process components 26 that exist within it and that are assigned to it to respond to incoming requests; if there is more than one connection process component 26, then the connection will simultaneously be able to handle multiple asynchronous requests from the client and/or send asynchronous traffic to the client while simultaneously receiving and responding to synchronous commands. Nonetheless, each connection process component 26 then transitions to an "inner" wait( ) state where only one is awakened (at random) by the reception component 22 of its owning server connection component 20 to an incoming message as already discussed. The point to note is the handling of incoming requests by the complex latching and interacting of multiple server component threads in the efficient manner embodied by the design of the implementation presented herein. (Note: Actually, upon initially being assigned a connection [i.e., communications link], server connection component 20 only awakens one of its connection process components 26 [at random] and sends only it to its inner wait state. This is done so that multiple commands can not be processed until a successful 'connect' or 'reconnect' is received. Upon a successful 'connect'/'reconnect', all connection process components 26 belonging to said connection component 20 are sent to their inner wait( ) states—so that they will all wait on their connection component's reception component 22 to awaken them when there is an incoming message to process.)

6. Functionality

This framework provides a number of important capabilities that are critical to designing highly-interactive, distributed applications and which are not addressed by EJB:

Automatically multi-threaded clients: This framework automatically multi-threads the purchaser's client-specific code enabling it to, e.g., seamlessly handle asynchronous traffic while simultaneously enabling the end-user to interact synchronously. This means that this framework provides the capability for the implementer to, e.g., develop a GUI as the client-specific code 8 operating in just its single main thread. Said GUI could simply create and register with the main client component 120 and then simply wait for and execute end-user requests. Real-time data would be sent by an instance of the server-specific code 6 (through the server components of this framework as asynchronous reply messages to a previously sent command that does not return control to the framework, but that might listen to, e.g., a market data source for changes—as already described). Asynchronous messages received by client component 120 (of, in our example, real-time information) would cause a thread managed by 120 to execute a designated method of implementer's client-specific code 8, enabling code 8 to interact with an end-user through its own thread while simultaneously having the invention framework—through, as mentioned, its own thread—execute client-specific code 8 to handle this real-time information.

Automatic multi-threading on the server-side: This framework enables the multi-threading of server-specific code, not just for providing multiple simultaneous connections (as is provided for by EJB), but also for enabling the execution of p processes per each connection. Therefore, if desired, the capability for a client to send requests to the server asynchronously and have the server-specific code process multiple requests from a single client simultaneously is automatically provided. Again, there is no work required from the standpoint of purchasers of this framework to accomplish this. (Not only is this not provided for automatically by EJB, it is prohibited, as EJB session beans are prohibited from starting their own threads). The practical implications of this capability are many. A few examples:

The client could send an asynchronous command to the server-specific code that would cause the server-specific code to start listening to (and transmitting real-time data back to the client) asynchronously (as in our example set forth in the previous paragraph). As each command received by a reception component 22 causes reception component 22 to notify, i.e., wakeup, one of its associated connection process components 26 to handle the message within its own thread, this separate thread managed by one process component 26 would be able to execute within the server-specific code 6 while another thread (from a different process component 26 of the same connection component 20) would be available to process a different message received from the client (perhaps sent due to an end-user's interaction with a GUI) on, perhaps, the same server-specific code, but using its own thread.

The server might be a calculation engine and it might be desirable to have a single connection from another system (in this case, this other system would be the client) to be able to call on the server to price many trades (or run multiple scenarios) simultaneously (especially if the server is executing on a multi-processor machine).

As with the first example, real-time data could be provided by one thread, and multiple other threads could execute simultaneous commands.

Specific description of the components and interactions among the components will now be given with reference to FIGS. 7 and 8.

FIGS. 7A and 7B together represent a single sequence diagram depicting a few of the thousands of potential use-cases involving the server components of the inventive framework and their interaction with each other and an implementer's server-specific code. Time flows from the top of the page of FIG. 7A to the bottom of the page of FIG. 7B. The object instances are repeated at the top of page 7B to maintain continuity.

FIGS. 8A and 8B together represent a few of the many use-cases of the client components of this framework in their interactions with each other and with an implementer's client-specific code. As with FIGS. 7A and 7B, time flows from the top of FIG. 8A to the bottom of FIG. 8B with the object instances being repeated at the top of FIG. 8B only to maintain continuity.

Design Of The Server Components: Like EJB, this framework enables the application designer to provide a server implementation that is run by its server-based infrastructure. As with EJB, this framework's server based infrastructure provides many capabilities automatically. Those capabilities that overlap with EJB: connectivity, scalability, etc. were designed to be far superior to their EJB counterparts and to exhibit a far higher level of performance. Additionally, the server components of this framework (in conjunction with the client components) provide capabilities that are not offered by EJB, including: security (two-way authentication; message integrity; digital signing and verifying of messages; ACL validation; etc.); multi-threading within a single connection/session (as mentioned extensively before and to be discussed further, later); etc. How this framework's components interact with each other; and, how they interact with the purchaser's server-specific implementation that the purchaser develops to implement its business logic is unique. Also unique are the specific capabilities that are conferred upon the purchaser as a direct consequence of this design.

The server components include in part:

One top level server component 12 to use per (possibly multiple-CPU) machine (embodied in SSLCryptServer 12 class);

A pool of server connection components 20 per server component (embodied in SSLCryptServerThread 20 class—each can handle a single connection so the number of these determines the number of simultaneous concurrent connections that will be accepted and processed on that machine; and, Uniquely, one or more connection process components 26 per connection (i.e., per server connection component 20 and as embodied in SSLCryptServerThreadProcess 26 class). This enables each connection with a client to process multiple asynchronous requests concurrently and also enables a client to start one or more processes on the server (asynchronously) that can feed it real-time data (e.g.: market data, bids/offers, continuous readings from a monitoring instrument, etc.) while one or more additional server processes for that same connection remain available to process additional synchronous or asynchronous messages. In essence, using this framework the purchaser can develop client and server side modules that are multi-threaded and communicate with each other over a single socket connection (including over the internet) without writing any code to achieve this capability. Furthermore, the GUI (on the client side—i.e., the client-specific code) is automatically capable of receiving real-time information while at the same time being able to accept commands from end-users (in the form of buttons pressed, etc.) and forward them to the server components (and receive server responses back) concurrently. This framework enables implementers to achieve this capability without devoting the time and without possessing the expertise. It addresses the problem in a general way, rather than accomplishing this specifically for one application. This means that data sent and processed asynchronously by the client software as the result of one non-terminating command sent to the server need not be real-time information at all—it may simply be, e.g., results from a compute-intensive process slowly being generated and executing on the server, while the framework stands ready to execute other requests from the same end-user over the same communications link.

While the design and interactions of all components of this framework are unique, the behavior of some systems designed around components that perform some functions similar to the SSLCryptServer component 12 and the SSLCryptServerThread component 20 alone (i.e., as if the SSLCryptServerThread component 20 did not have any connection process components 26 to independently process requests), would behave in a manner described in industry texts as "thread pooling". Presumably, vendors who implement EJB Containers to manage multiple server threads use this or a similar technique to provide for simultaneous multiple connections. It is the third element, the connection process component 26, in conjunction with some other assisting components and the unique interaction among all server components that create the advantages described above and which are unique to this design. These elements are shown in the interaction diagram in FIG. 7 in a typical small set of interactions. FIG. 7 represents some use-cases but is not meant to be exhaustive of everything that could possibly happen during the steps of this process. Keep in mind that each SSLCryptServer 12 (typically one per machine) has n SSLCryptServerThread 20 objects (each capable of handling a single client connection i.e., communication link over which messages may flow in both directions); and, each SSLCryptServerThread 20 has p SSLCryptServerThreadProcess 26 objects (each of which runs in a separate thread and each of which can handle a separate stream of execution over the single connection managed by its owning SSLCryptServerThread 20 object).

Initialization and Pre-Instantiation of Server-Side Framework Components (and of Instances of Implementer's) Server-Specific Code One of the keys to the performance of this inventive framework is that, unlike EJB, almost all server framework components are pre-instantiated when this inventive framework's server components first start up. This is true even in cases where an implementer's server-specific code 6 is stateful. As shown in FIG. 7A, when the top-level server component 12 (SSLCryptServer) is first created, (usually by the ServerGUI control application, as illustrated in the attached ServerGUI.java computer code as shown in a part of the file, CodeListing.txt, in the appendix), it immediately instantiates a number of specified server connection components 20 (SSLCryptServerThread components) as shown in its first interaction in FIG. 7A at step s1. As discussed, the number of server connection components 20 that are instantiated is user-configurable.

Other details of this and other steps and processes can be seen in the source code appended to this specification and/or known from what is described in this specification.

Every one of the server connection components 20 is each responsible for managing a single communications link. Thus, the maximum number of simultaneous connections that a single server (which generally has one top-level server component 12 executing on it) will handle simultaneously is pre-configured. This also means that the top-level server component 12 does not have to create one of these components when a new connection comes in. When a connection is dropped, or before a connection is assigned for it to manage, a server connection component 20 is part of a pool of available server connection components that are managed by the top-level server component 12. Each server connection component 20 in this pool is available to manage the next incoming connection.

As shown in FIG. 7A, as soon as the top-level server component 12 finishes instantiating all of its server connection components 20, it immediately starts the threads that are to execute in each one of them. Before going into a wait( ) (i.e., blocked) state—waiting to be awakened by the thread executing in the top-level server component 12 when it has a new communication link (i.e., connection) for it to handle—each of the threads executing within the run( ) method of their respective server connection component 20, creates potentially many connection process components 26 at step s1A. These connection process components 26 are created only once for each server connection component 20.

Each of these connection process components 26 execute within its own thread. In fact, for each server connection component 20, one connection process component 26 is created for each of the number of potential processes that a server connection component 20 is to be able to execute concurrently within a single connection. This means that for each single instance of the client-specific components 8 (i.e., for each client that is connected to the framework), several threads can be executing simultaneously and independently of each other. After each of the server connection components 20 create their connection process components 26, the server connection components 20 each start its respective connection process components' threads, which immediately block on their owning (i.e., creator's) Activation Object.

The Activation Object is an object created by each server connection component 20 with the purpose of providing an object for its respective connection process components 26 to have a common point to block on. The connection process components 26 belonging to a particular server connection component 20 do not block on their owning server connection component object because the thread executing in each server connection component 20 itself blocks on the said server connection component object. As already mentioned, this thread is waiting to be awakened by the top-level server component 12 after it assigns the server connection component 20 a communications link to process. Each server connection component's connection process components must therefore have a different object to block on. When a connection process component 26 is blocked on its owning server connection component's Activation Object, it is said to be in its outer wait state.

FIGS. 7A-B depict a configuration where each server connection component 20 has three connection process components associated with it; and, although it shows multiple server connection components being created by the top-level server component 12, the rest of the diagram depicts the interactions involving only one server connection component. For simplicity, as shown in FIG. 7, a single communication link is established and assigned to one of the top-level server component's server connection components 20 when an incoming connection request is received as in message m5. Next, the initial 'connect'/'reconnect' command (or message) m6 is successfully handled by one of the connection process components 26 along with the subsequent handling of multiple incoming requests or commands (some of them simultaneously) starting at message m8. Finally, the final command tells the implementer's server-specific code 6 that it is time to terminate the connection, causing it to return 'false' to the executeCommand( ) method call made by a server connection component 26. The inventive framework brings all of the connection process components 26 (of the server connection component 20 to which the connection was assigned) back to their outer wait states, as well as the server connection component itself, back to the state where it is waiting (i.e., blocked) on itself prior to returning itself to the pool of available server connection components 20 managed by the top-level server component 12.

However, at this point, we are at the place prior to the initial 'connect'/'reconnect' message m5 of FIG. 7A—where the server side of the inventive framework has been started and all of the following pre-instantiated and in the following states:

Top-level sever component 12 (SSLCryptServer) is created and has created its pool of server connection components 20 (SSLCryptServerThreads) at step s1.

The top-level server component 12 has started the independent threads executing in the run( ) method of each of its server connection components 20.

Each of the threads that are now executing in their respective server connection component 20s' run( ) methods have created the connection process components 26 (SSLCryptServerThreadProcess) and have started the independent threads within each of those. These threads that have just been started (that are executing in the run( ) methods of their respective connection process components) now move to their outer wait state at step s1A where they are waiting on the Activation Object created of the server connection component 20 that created them.

Each thread executing in the run( ) method of its respective server connection component 20, having created its connection process components 26 and having started the threads within each of those, now move into their wait (i.e., blocked) state, each waiting on itself (i.e., on the server connection component object in which each said thread is executing); each waiting to be awakened when the top-level server component 12 assigns a connection to it (as in step s5A and step s5B of FIG. 7A).

The instance(s) of the server-specific code 6 are also created during all of this pre-instantiation activity (i.e., during initial startup), but where this occurs, who is responsible for it, and how many instances are created depends on the initial configuration parameters under which the server components of this inventive framework are started. If the most common setting of 'one-per-connection' is chosen, it means that all threads executing on behalf of a single connection share the same instance of the implementer's server-specific code 6. This means that if one thread alters class-scope variables of the implementer's server-specific code, all threads executing on this instance of the server-specific code (i.e., the threads executing in the connection process components 26 of the given server connection component 20 managing the communication link with that client) will be able to make use of these results and effects. In this case, all connection process components 26 of a particular server connection component 20 are operating on the same instance of implementer's server-specific code 6. (This is the case that is presented in FIG. 7A/7B.) In this case, each server connection component 20 creates only one (its own) instance of the implementer's server-specific code 6 for all of its connection process components 26 to share. Note that when a server connection component 20 is finished processing commands for a particular session, it does not destroy the instance of the server-specific code that it created during initial start up of its thread. Rather, when assigned a new communications link, server connection component 20 calls the init( ) method on implementer's server-specific code 6 (to give server-specific code a chance to clear out information left over from the previous communication link/client that this server connection component 20 was managing), and then uses this already created instance for the next communications link. Not having to re-instantiate and re-allocate memory, and only having to clear variables with sensitive information is a performance advantage gained from this aspect of the design of the inventive framework. The other configuration settings also cause the needed instances of an implementer's server-specific code 6 to be pre-instantiated as well: In the case of the 'one-per-connection-process' setting, each server connection component 20 instantiates one instance of implementer's server-specific code 6 for each of the connection process components 26 that it creates and passes them into the constructor of each of these connection process components 26, rather than passing in the same one to each connection process component 26 when it is created. In the case of 'one-per-server', the top-level server component 12 creates the single instance of implementer's server-specific code 6 that is passed by all of the server connection components 20 created to all of its connection process components 26.

Assuming all proceeds without error/exception, the following is an anticipated initialization:

SSLCryptServer 12 instantiates a configurable number of SSLCryptServerThread 20 objects each running in their own thread and start( )s them. SSLCryptServer 12 then wait( )s to accept an incoming connection.

Each SSLCryptServerThread 20 first instantiates and start( )s a pre-configured number of SSLCryptServerThreadProcess 26 objects with each of these running in their own thread. The number of these may be as few as 1—if the server-specific code was simply designed to handle synchronous requests, execute some code, and return generated responses. The SSLCryptServerThread 20 instances each create their own Activation and Deactivation objects, internal objects which do not appear on the diagrams, which serve no function other than to provide the separate threads executing within each of their SSLCryptServerThreadProcess 26 instances something to wait( ) on. Each SSLCryptServerThreadProcess 26 instance has an inner and outer wait( ) state. The thread executing in each starts off in its outer wait( ) state, waiting on the monitor of its owner's i.e. their SSLCryptServerThread's 20's ActivationObject.

The independent thread executing within each SSLCryptServerThread 20 then wait( )s on its own monitor until it is assigned an incoming socket and awakened by its owning SSLCryptServer 12 (i.e., by the independent thread executing within 12). (The SSLCryptServer maintains its SSLCryptServerThread instances in a thread pool.)

The instances of the server-specific code (written by the purchaser) are "pre-instantiated" by this framework, meaning that they are not instantiated with each connection, but once by this server framework when it is started. This is unique and itself provides a part of the performance advantage mentioned. (EJB may pre-instantiate instances of stateless session beans, but never stateful ones.)

Whether the instantiation of instances of a purchaser's server-specific code is carried out by the SSLCryptServer 12, SSLCryptServerThread 20 or SSLCryptServerThreadProcess 26 components depends on the configuration option that the purchaser may choose through the startup screen. The ability to have the following variations is unique to this framework and offers flexibility that no other framework provides:

a) One instance of server-specific code per server: one instance of a purchaser's specific code that is accessed by every thread; OR, b) One instance of server-specific code per connection (i.e., per communication link): have a separate instance of the server-specific code for each connection (i.e., have a single pre-instantiated instance of the server-specific code for each SSLCryptServerThread where any threads executing in each of the SSLCryptServerThread's SSLCryptServerThreadProcess instances servicing that single connection call a common instance of the server-specific code, but SSLCryptServerThreadProcess instances servicing (belonging to) a different SSLCryptServerThread connection call its own separate instance of the purchaser's server-specific code; OR, c) One instance of server-specific code per connection process: a separate pre-instantiated instance of the purchaser's server specific code for every thread within every connection. The following is a typical interaction post validation:

Upon being selected by the SSLCryptServer (from its available thread pool), assigned a socket connection, and awakened, the awakened SSLCryptServerThread creates a SendSocketThread instance and a RcvSocketThread instance and runs each of these in their own threads. It is these two classes running in their own threads that are able to send and receive information independently from each other over the same socket.

The awakened SSLCryptServerThread then causes all its SSLCryptServerThreadProcess objects to move from their outer wait( ) state (where they were wait( )ing for this SSLCryptServerThread to be activated), to their inner wait( ) state where they wait on their owning SSLCryptServerThread's RcvSocketThread for an incoming message. (Actually, for the initial validation, only one is sent to its inner wait( ) state.)

When the RcvSocketThread receives an incoming piece of information, it (effectively, randomly) selects one of the objects wait( )ing on it (in this case, one of the threads executing within one of its SSLCryptServerThreadProcess instances), and awakens it from its inner wait( ) state so that it can ask the RcvSocketThread for the message and invoke the purchaser's server-specific code to process the message. Note that if there is more than one SSLCryptServerThreadProcess wait( )ing, then while one has invoked the server-specific code and the server-specific code is still in the middle of processing the request, another command received by the RcvSocketThread for that same connection SSLCryptServerThread will cause the RcvSocketThread to awaken another SSLCryptServerThreadProcess instance to process that request in its thread. This is how multiple asynchronous requests may be handled simultaneously over a single connection and a major important consequence of this design. Using this design, it is also possible for the server-specific code not/never to return from an asynchronous call made to it (prior to the connection being terminated by either another command from the client-specific code that the purchaser developed—e.g., an 'exit' command; a loss of connection; or a decision by purchaser's server-specific code to terminate the connection). This, i.e., the ability for the server-specific code not to terminate (i.e. not simply to do some work and return when finished, but, perhaps, e.g., to subscribe to a market data server or real-time data from a medical monitoring device and then enter a loop that waits for information and then publishes it back to the client in its own separate thread i.e., in real-time is possible because the thread, i.e. the SSLCryptServerThreadProcess, that called the purchaser's server-specific code is just one of at least two and possibly more than two that were configured to handle each connection. This is how, from the perspective of the server-specific code, real-time information can be passed to a client GUI, system, or other client-specific code, while at the same time the server-specific code remains able to receive and process other commands from the same client and over the same connection i.e., over the same communication link. Essentially, one of the connection's (20's) threads (executing within one of its 26 components) remains dedicated to receiving and passing back real-time information while the other thread(s) (managed by other 26s within the particular 20 managing the communication link) are available to process subsequent commands.

The SSLCryptServer 12 receives a socket (connection) and passes it to one of its SSLCryptServerThread instances 20 to manage. RcvSocketThread 22 and SendSocketThread 24 are created by the SSLCryptServerThread 20 assigned to handle the connection and are run in independent threads. RcvSocketThread 22 is responsible for waking any one of 20's SSLCryptServerThreadProcess instances 26 when it receives information. The SSLCryptServerThreadProcess instances 26 also run in their own threads and have an outer and inner wait( ) state, with the inner wait state only reachable when the owning SSLCryptServerThread 20 has a RcvSocketThread 22 to wait on. After creating SendSocketThread 24 and RcvSocketThread 22 and enabling its SSLCryptServerThreadProcess instances 26 to process multiple requests (if desired), the SSLCryptServerThread 20 then itself wait( )s on its own deactivation object (mentioned earlier) for any one of its SSLCryptServerThreadProcess instances 26 to tell it that the connection is/should be ended. SSLCryptServerThread 20, when told by one of its SSLCryptServerThreadProcess 26 instances that the connection should be ended (due possibly to the implementer's server-side code 6 returning false when being executed by a thread belonging to said one of SSLCryptServerThreadProcess 26 instances), then ensures that this and all its other SSLCryptServerThreadProcess instances 26 go back to their outer wait( ) states prior to said SSLCryptServerThread 20 returning itself to its SSLCryptServer's 12 available pool. Thus, it is the SSLCryptServer 12 that manages the thread pool; the SSLCryptServerThread instances 20 each manage its own connection (i.e., communication link) through the SendSocketThread 24 and RcvSocketThread 22 that each SSLCryptServerThread 20 creates whenever it is assigned a new connection. Each SSLCrypt-ServerThread 20 also manages its own SSLCryptServerThreadProcess 26 instances. Finally, the SSLCryptServerThreadProcess instances 26 each manage a thread of execution into a purchaser's server-specific code. These are among the unique features and interactions among this server's framework components that enable it to be extremely flexible, easy to use, and highly performant.

As mentioned above numerous times, the server-specific code 6 may, at the decision of the purchaser, be configured in any of the following ways. Code 6 may be shared among all SSLCryptServerThreadProcess instances 26 of each connection (i.e. one per connection—the most common setting), as in FIGS. 2 and 3. As a second alternative, code 6 may be not shared at all such that every thread of every connection has its own instance of the server-specific code (i.e. one per connection process, as in FIG. 4), so that if there are more than one SSLCryptServerThreadProcess that were configured to a connection, each would call its own instance of the server-specific code. as a third alternative, there may be a single instance of the server-specific code 6 shared across all connections and all connection processes as in FIG. 5. Here are some of the practical ramifications of this flexibility.

Figure 5:
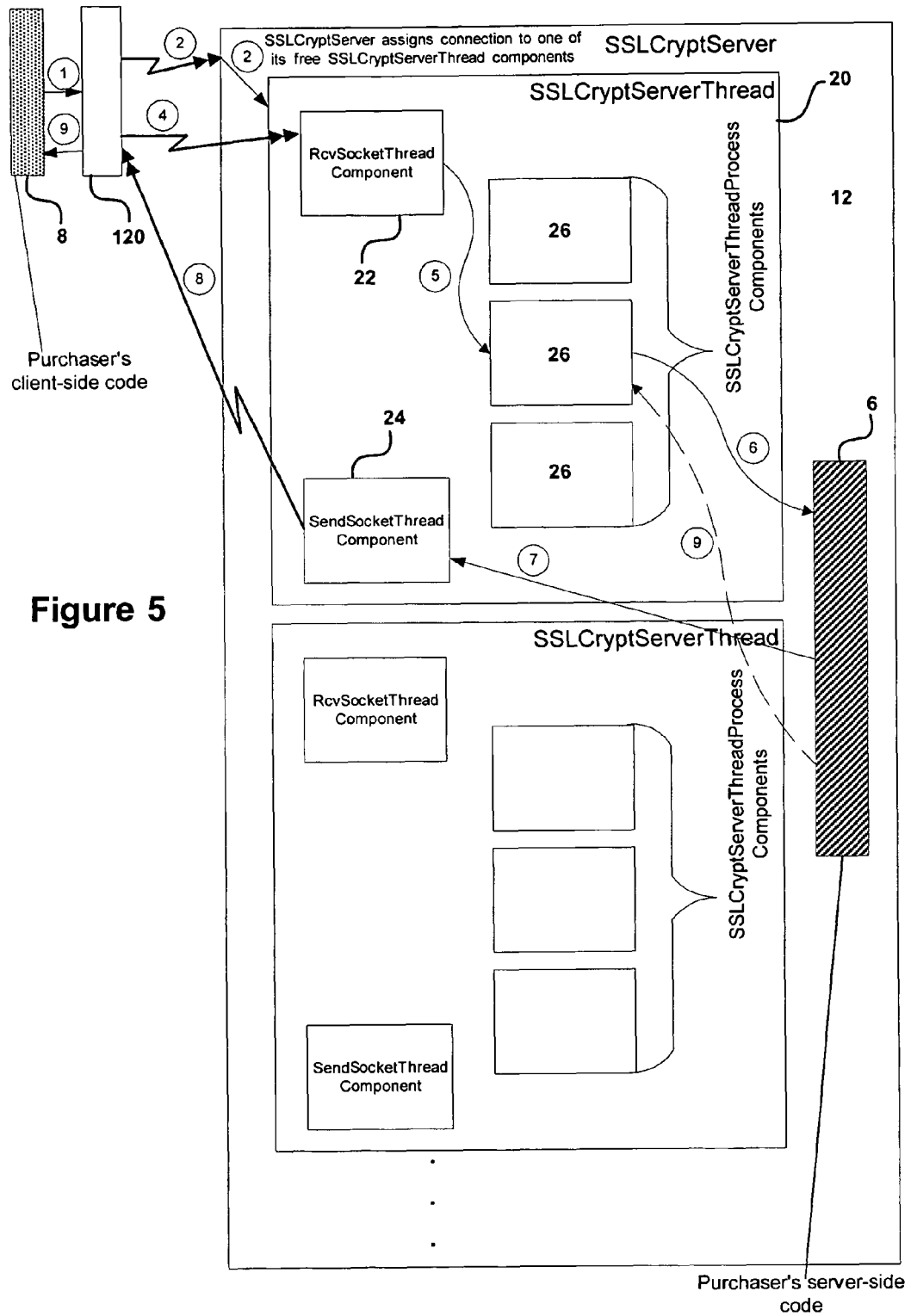
FIG. 5 is a schematic of a third configuration for instantiation and access of the implementer's server-side code in which the purchaser's server-side code appears once for the entire server.

"Preferred Embodiment" or "Best Use" of this feature1: If a purchaser's server-specific code implemented some sort of caching server, it might be desirable to have a single instance of server-specific code that was called by requests from separate connections. This especially holds if most of the operations are reads on the cache (as only the code that wrote to the cache would need to be synchronized). The single instance of the server-specific code (e.g., as shown in FIG. 5) would maintain the common shared cache of information, and implementing writes to this cache would be trivial. This would provide multi-threaded and rapid access to shared data.

"Preferred Embodiment" or "Best Use" of this feature2: If a purchaser's server-specific code implemented a trading system (such that the client-specific code might be a GUI front end), then you would want to have a separate instance of the purchaser's server-specific code per connection (with all processes executing on behalf of that connection accessing the same server-specific instance). In this way, the server-specific code can be aware of the client's state, yet have multiple requests operating on that state simultaneously. E.g., the client might want to see an analysis of the positions in his/her view; and while that analysis is running, the client will wish to receive notification of executed trades, cancel some of his/her bids/offers, etc. This one-per-connection setting (as shown in FIGS. 2 and 3) would also be used in a stateful implementation of the standard shopping cart case where there might be only one connection process component per connection anyway, but where each connection would need to remember what was in that client's cart.

"Preferred Embodiment" or "Best Use" of this feature3: If a purchaser's server-specific code 6 was designed to execute a computationally intensive report (e.g., a risk report for a large portfolio on a derivatives trading desk, or an analysis of millions of people in the census data), and the client-specific code 8, e.g., was a GUI designed to enable each end-user to start multiple reports (or, perhaps the same report on different data sets) simultaneously, it would be ideal to have one instance of an implementer's server-specific code 6 for each connection process component 26. In this case each connection could be to an end-user w/each connection process executing a separate report that was independent of any other the end-user might be executing. In such a case, the implementer/purchaser might want a separate instance of the server-specific code for each connection process as each process is independent of the others. If the purchaser were forced to write as if there were only one class instantiated per connection, the purchaser's code would be more complex as the single class written by the purchaser would have to maintain separate variables for each report that it was executing simultaneously. Additionally, the purchaser's code might have to have more than one complex structure to handle the information being generated from each of the reports being executed. In this case, having the option of one server-specific instance per connection process (as shown in FIG. 4) causes the writing of the server-specific code 6 to be rather trivial.

As demonstrated in the "Best Use" examples above, having the flexibility to determine how the purchaser-written server-specific code is configured in relation to the framework components is very powerful and unique to this framework. In each case, using any of the other settings would cause the server-specific code to be extremely difficult to write. EJB offers only case 2 (the most common case) but would not provide all of the necessary capabilities even within this case—e.g.: insufficient security; no ability to send real-time data or handle multiple tasks concurrently without the implementer writing the multi-threading themselves; and, no ability to have multi-threaded server code for a single communications link at all. An implementer could not accomplish embodiment 3 even if he/she wrote the more complex code required, because EJB does not allow its purchaser-written server-side code to be multi-threaded nor does it allow its server-side code to respond asynchronously to the client code communicating with it.

Reference will now be made to FIG. 8, which depicts the components and interactions among the components of the client-side of the inventive framework.

Design Of The Client Components of this Framework: This framework provides numerous capabilities to the client-specific code in purchasers' applications that other framework designs do not. Most common frameworks, such as EJB, will provide "stubs" or "proxies"—small pieces of code that enable purchasers to connect to and pass messages to their server-specific code and components as if the server-specific code is local rather than located across the network or across the internet.

The inventive framework uses an entirely different and unique approach: Firstly, it is based on a messaging paradigm and, importantly, rather than the messages from client to server (or the other way) going directly between client-side proxies and a specific instance of the code they developed for the server side (via the EJBObject), an implementer has his/her client-specific code instantiate (create) an instance of the client component of this framework and communicates with (sends requests to/receives responses from) it. The client component, in turn, does not communicate directly with an instance of the server-specific code (nor does it communicate with an object, like the EJBObject of EJB-type frameworks, that is directly tied to an instance of implementer's server-specific code); instead, it uses its SendSocketThread to send the request that the client-specific code sent to it, to the RcvSocketThread of the SSLCryptServerThread on the server side that it is connected with. As already explained, the RcvSocketThread on the server side wakes up one of its processes (SSLCryptServerThreadProcess instances), which in turn calls an instance of purchaser's server-specific code. When the server-specific code produces a response, it uses the SendSocketThread (which was passed to it) to send the response back to the RcvSocketThread owned by the SSLCryptClient component on the client side. The SSLCryptClient then returns this value to the purchaser's client-specific code (if it is a response to a synchronous call); or, invokes a function within the purchaser's client-specific code (if what is sent by the server is an asynchronous reply).

The following, then, represents the typical usage by the client-specific code and the steps carried out "behind the scenes" by this framework as evidenced in the interaction diagram of FIG. 8.

- The client-specific code developed by the purchaser will create an instance of the SSLCryptClient class passing it a username and password).
- The SSLCryptClient immediately initiates a connection with the server (where a two-way authenticated SSL channel is automatically established). (The interaction for the establishment of this connection is not shown in FIG. 8.)
- The SSLCryptClient then creates a SendSocketThread and RcvSocketThread (the very same classes that the server components use on the other side of the socket). Both the instance of SendSocketThread and RcvSocketThread execute in their own threads.
- Also, not shown in FIG. 8 is the other part of the interaction of establishing the connection that now transpires: Immediately after creating the SendSocketThread and the RcvSocketThread components, the SSLCryptClient (i.e., the main client component) uses its newly created SendSocketThread component to send the 'connect' or 'reconnect' command that the server components of this framework require as the first command it receives. Nor is it shown, in FIG. 8, the behavior of the main client component when it receives the response to the 'connect'/'reconnect' message. The behavior for this initial interaction was described previously.
- The SSLCryptClient component that has just been created not only creates and starts these two threads, but also starts a thread that executes within its own run( ) method and which wait( )s on its RcvSocketThread for an incoming message to be received prior to returning (from its constructor) to the client-specific code that instantiated it. Thus, instantiating the SSLCryptClient component of this framework results in three additional threads of execution (in addition to the thread that the client-specific code is executing in).
- Optional: The client-specific code registers itself as a listener for asynchronous traffic with the SSLCryptClient that it has just created (if, and only if, it is interested in receiving asynchronous traffic/responses from the server-specific code assuming the server-specific code sends asynchronous traffic). It does so by invoking a call similar to the following: "mySSLCryptClient.registerRcvdMsgListener(this)". The client-specific code will implement the ReceivedMessageListener interface (meaning that it will provide a method called: processRcvdMsg( ) that takes a message in the form of a MsgPackage as an argument)—Whenever/if ever the server-specific code sends an asynchronous message:
- The message will be received by the RcvSocketThread of the SSLCryptClient.
- The RcvSocketThread will notify( ) any one listener. (In this case, there is only one listener: the thread executing in the run( ) method of the SSLCryptClient component—one of the three additional threads discussed earlier.)
- The SSLCryptClient component will call the processRcvdMsg( ) function of the purchaser's client-specific code from its own thread. This is how this framework automatically multi-threads the purchaser's client-specific code. While purchaser's client-specific code processes this asynchronous traffic (e.g. market data, instrument measurements, etc.), it is still free within its own thread to continue executing—to accept and send additional commands from an end-user or from its own system, etc. I.e., the processRcvdMsg( ) method of the client-specific code is executed by a thread controlled by this framework. The client-specific code could be a client GUI, or another system that interfaced as a client to the purchaser's server-specific code/service.

Additionally (or solely), the purchaser's client-specific code may call its SSLCryptClient component's sendSynchMsg( ) and sendAsynchMsg( ) methods to pass messages/requests to its server-specific code. Both of these actually send the message asynchronously, but sendSynchMsg( ) blocks for a response from the server-specific code. This blocking happens within the run( ) thread of the SSLCryptClient component (which wait( )s to be notify( )d by its RcvSocketThread when a response has been received back). In the sendSynchMsg( ) case, if a response is received back from the server in the allotted time, it is returned to the client-specific code; if it times out a LostConnectionException is thrown, which may be caught by the client-specific code. If sendAsynchMsg( ) is used, the SSLCryptClient will return immediately enabling the client-specific code to send additional commands prior to the server-specific code completing the first request/sending a response back. (Of course, whether the server-specific code can handle executing more than one command for the same connection at the same time will depend on the configuration specifying greater than one process thread per connection when the server was first started. All of this was explained earlier.) Both of these send methods cause the SSLCryptClient to use its SendSocketThread to send the message over the socket.

To recap, and to highlight the benefits in simplicity realized from this unique design, from the standpoint of the client-specific code that the purchaser writes, all it needs to do is:

Create an instance of the SSLCryptClient class. (One line of code.)

Register itself as a listener of the SSLCryptClient component that it just created. (One line of code.)

Use the sendSynchMsg( ) or sendAsynchMsg( ) passing as an argument, the request or message to be sent to the server code.

If it is to receive asynchronous messages/real-time information back, it needs to create the implementation to the processRcvdMsg( ) function to do whatever it wishes with this data.

The benefits of a multi-threaded client that can process asynchronous information in real-time while at the same time enabling a user, system, or other client to interact with its server code (and, over a single socket), are all realized without the purchaser writing any code to accomplish any of this. This is the benefit of the unique design of the client components of this framework as described here and shown, for example, in FIG. 8.

Establishment of Initial Connection

When implementer's client-specific code 8 instantiates a new instance of the main client component 120 in step c1 of FIG. 8A, the main client component establishes a secure, two-way authenticated (if desired), SSL connection with the server components of this framework.

While FIG. 8A does not show the main client component performing the handshaking that establishes this secure, two-way authenticated connection, message m5 of FIG. 7A does show the initial connection attempt coming in to the server side to be handled by the inventive framework's top-level server component 12 (SSLCryptServer).

This incoming connection is immediately assigned by the top-level server component 12 to one of its server connection components 20 from the pool of server connection components 20 that it is managing. The assignment is a three-step process where the top-level server component 12 first gets an available server connection component 20 from its already pre-instantiated pool of connection components (assuming one is available). Then, the top-level server component 12 passes the socket object from the connection being attempted to said server connection component 20 by executing a call to said server connection component's setSocket( ) method as shown in FIG. 7A at step s5A. The third step at step s5B is now executed where top-level server component 12 notify( )s (i.e., wakes up) the thread that is executing and currently waiting in said server connection component 20's run( ) method causing it to start managing the said connection [i.e., communications link] that it was just assigned even while the top-level server component 12 goes back to waiting for the next incoming connection.

The next two sections, 'On the Server Side' and 'On the Client Side', occur independently of and concurrently with each other at their respective locations.

On the Server Side

As shown in FIG. 7A, having been awakened to process the now established authenticated SSL communications link, the thread executing in the run( ) method of the said server connection component 20 now creates a transmission component 24 to manage all outgoing traffic over said communications link, and a reception component 22 to manage all incoming traffic on said communications link. The transmission component 24 and reception component 22 each has its own executing threads that operate independently (and are capable of operating concurrently). So, it is possible for the transmission component 24 to be sending information back to the client component 120 of this framework (and ultimately to the client-specific code 8) on the other side of said communications link at the same time the reception component 22 is receiving information over the same said communications link.

The thread executing in the run( ) method of the server connection component 20 (that was awakened by top-level server component 12 to manage the communications link) then performs three tasks in immediate succession. First, it starts the execution of the thread executing in the transmission component 24, which immediately wait( )s to be awakened when the transmission component 24 is called on to send a message. Second, this thread notify( )s (i.e., awakens) one of its connection process components 26, causing said connection process component 26 to move from its outer wait state (where it was waiting on its server connection component's Activation object) to its inner wait state where it will wait on the newly created reception component 22 to be notified when there is an incoming message. Finally, this thread starts the execution of the thread executing in the run( ) method of the reception component 22 itself, which will immediately block on the communications link for an incoming message on the now established communications link.

Note that only one of the (possibly many) server connection component 20's connection process components 26 need be awakened to move from outer to inner wait state. While the inventive framework was designed to be able to process multiple requests simultaneously from a single client over a single communications link, the design goal during this part of the framework interaction is to not process any messages until a successful 'connect' or 'reconnect' command is processed by the inventive framework's server-side components. If more than one connection process component 26 were brought to its inner wait state at this point in the process, and the client-specific code 8 were to use the client components to send a message prior to the server components completing the processing of the 'connect'/'reconnect' that the client components of this framework send as its first command, then one of the other connection process components 26 would be awakened to process this second incoming message. This would not be desired. It is preferred that any messages sent are to be queued behind the 'connect'/'reconnect', until said 'connect'/'reconnect' message was successfully processed. The inventive framework ensures the desired case, because the server connection component 20 only brings one of its possibly multiple connection process components 26 to its inner wait state.

Now, the thread executing in the run( ) method of the server connection component 20 simply wait( )s on its own Deactivation Object—for one of its connection process components 26 to wake it up, which in effect tells it to drop the connection and return itself to the pool of server connection components 20 available to the top-level server component 12 to process another communications link. This will only happen under one of the following circumstances: a) the server-specific code 6 decides to terminate the connection by returning 'false' after processing a connection process component's invocation of its executeCommand( ) method; b) if the server components detect that the communications link has been interrupted or lost; c) if the 'connect'/'reconnect' command is "ruled" not valid by the server components of this inventive framework, in which case this framework decides to immediately terminate the connection without processing any additional commands from this communications link.

The thread executing in the run( ) method of the one awakened connection process component 26 now wait( )s on the reception component 22 belonging to its parent server connection component 20—wait( )ing to be awakened by the thread executing in the reception component 22 when it receives an incoming message.

On the Client Side

As shown in FIG. 8A, now that a secure SSL connection (i.e., communications link) has been established, the main client component on the client side of the framework then creates an instance of the transmission component 124 at step c1A and an instance of the reception component 122 at step c1B.

These two created components are instantiated from identical code as the transmission and reception components 24 and 22 on the server side of the framework. The transmission component 124 from a single set of instantiated components sends its messages to the reception component 22 of the server connection component 20 handling the said communication link on the server side. Likewise, the reception component 122 on the client side receives messages from the transmission component 24 of the server connection component 20 on the server side that is handling the said communications link.

The thread from the client-specific code 8 that is now executing within the main client component 120 now start( )s a new thread executing within the main client component 120's run( ) method, just prior to returning control to the client-specific code 8. At this point, client-specific code 8 may continue its own processing. In addition or in the alternative, client-specific code 8 may optionally register as a listener, i.e., receiver to receive asynchronous messages that come over the communications link to the inventive framework's client components with the newly created client component 120. In the case where the client-specific code 8 is a GUI (as it is in the use-case represented by FIG. 8A), client-specific code 8 may also wait on user input or action, e.g., a button press.

At this point, there are two threads executing on the client side location: the original thread that was (and still is) executing in the client-specific code 8 (and is now waiting on user input having registered as a listener with the main client component 120 that it had created); and, the thread now executing in the run( ) method of the main client component 120.

The latter now starts two additional threads—the thread that will execute in the run( ) method of the transmission component 124, and the thread that will execute in the run( ) method of the reception component 122. The thread in the transmission component 124 blocks until a process calls the transmission component's sendMsg( ) method. On the client side, the only component of the inventive framework that invokes this method is the main client component 120, usually when the implementer's client-specific code 8 calls the main client component's sendSynchMsg( ) or sendAsynchMsg( ) methods. The thread in the reception component 122 blocks on the socket and is awakened whenever there is data to receive on the communications link. There are now at least four threads executing or blocked on the client-side: (1) the thread executing in the implementer's client-specific code 8 (and additional threads, if any, that client-specific code may have started—although, when this framework is in use this should rarely be necessary); (2) the thread executing in the run( ) method of the main client component 120; (3) the thread executing in the run( ) method of the transmission component 124; and, (4) the thread executing in the run( ) method of the reception component 122. (Of course, each of these threads may temporarily execute in other components' methods from time to time, but when we say "executing in" or "executing from", we mean that that is where they originated.) These threads are designated as follows: 'thread 1', 'thread 2', 'thread 3', and 'thread 4', respectively, in the next few paragraphs.

At this point, thread 2 will instantiate a temporary component: the temporary client execution component 1201 (a.k.a. the SSLCryptClientConnectRcvThread component). The component exists solely to receive the response to the first command sent to the server side, namely, the 'connect' or 'reconnect' command that is automatically sent by the client components of this framework. The reception component 122 is passed to the temporary client execution component 1201 that this main client component 120 just created and start( )ed a thread in. Component 1201 then starts its own thread (a fifth thread) that immediately blocks on the RcvSocketThread component 122 that it was passed as shown at label c1C.

Normally, i.e., for any command other than a 'connect'/'reconnect', it would be thread 2 that would block on the reception component 122. This is because, in cases other than the case where one of these temporary client execution components 1201 is waiting on a response to the 'connect'/'reconnect' sent by the main client component 120, it is thread 1 that would use the main client component 120 to send a synchronous or asynchronous message to an instance of said implementer's server-specific code 6 via the components of this framework. But, in the case (of a 'connect' or 'reconnect'), thread 2 itself is sending the message and not the implementer's client-specific code 8. As a result, thread 2 does not itself wait on the reception component. Thread 2, in fact, becomes blocked in its own sendSynchMsg( ) call waiting to be awakened by the aforementioned fifth thread that is executing in the temporary client execution component 1201, which, in turn, is waiting to be awakened by the reception component 122. Here, in the 'connect'/'reconnect' case, thread 2 as the sender plays the role that thread 1 plays when it is the implementer's client-specific code 8 that is sending the message, and component 1201 exists simply to enable the thread executing in the main client component 120 (i.e., thread 2), to be able to be the originator of a 'connect' or 'reconnect' message. Said another way, the fifth thread behaves in much the same manner as thread 2 behaves on behalf of thread 1 when the client-specific code sends a message.

In alternative embodiments, other mechanisms could be employed to handle the send of a 'connect'/'reconnect' message by the inventive framework with regard to the manner in which it differs from the way the preferred embodiment of the inventive framework handles a message sent by an implementer's client-specific code. For example, the framework could utilize a single component called a reception component notifier which would be passed the object to synch and notify( ) on with the inventive framework passing a different object when it was sending a 'connect'/'reconnect', and passing the main client component (which thread 2 would be waiting on) when the message was being sent by the client-specific code. Such alternative embodiments would not be substantially different than the design/implementation presented in the preferred embodiment.

Thus far, there are several advantages identified of the inventive framework over conventional frameworks, including the following:

The client components of the inventive framework have active elements that execute within their own threads to manage the communication between each instance of an implementer's client-specific code and an instance of its server-specific code. Conventional frameworks only provide for "dumb" proxy components that rely on being invoked from one or more threads from implementer's client-specific code.

The inventive framework provides separate components on the client side that independently manage the sending and receiving of information over a single communications link.

The inventive framework's reception component executes in its own thread while waiting on an incoming message, and notifies other threads executing within the framework's component elements in order to process the incoming messages either within itself or within an implementer's client-specific code.

The inventive framework includes a performance enhancing feature (part of what is referred to herein as 'latched/synchronized handshaking with selective notification among framework components'), which is achieved by having the thread executing in the reception component not execute or process the message itself, but instead wake up another framework component to retrieve and execute the message with its thread while the thread in the reception component goes back to being blocked until another message arrives over the communications link. In a preferred embodiment, thread 2 in the main client component 120 is the thread that, in most cases, is waiting to be awakened by the thread executing in the reception component 122. In the case where it is thread 2 that is sending the message (rather than the implementer's own client-specific code 8), the aforesaid fifth thread executing in the temporary client execution component 1201 is the thread that is waiting to be awakened by the thread executing in the reception component. Nonetheless, it is the overall design idea within the framework that is, itself, unique, regardless of which framework component is waiting to be awakened.

The general manner in which the threads in this framework communicate with each other is novel, including: the manner in which a main client component creates and manages the other components on the client side of this framework; how it executes in its own thread and then blocks on the thread executing in its own reception component; how the main client component automatically establishes a secure, two-way authenticated (if desired) SSL connection; and then how it automatically sends a 'connect' or 'reconnect' as its first command (before the implementer's client-specific code is able to use the main client component to send commands).

The inventive framework includes a transmission component that operates in its own thread to enable reception of incoming messages to be independent of the sending of outgoing messages.

The transmission component does not directly send messages when it is invoked. Instead, when its sendMsg( ) method is invoked, the transmission component accepts outgoing messages from other components and stores them in a queue while the sendMsg( ) method then wakes up the thread executing within this transmission component. The newly awakened thread removes and sends any messages on the queue prior to going back to a blocked state. Although it is a method (sendMsg( )) of the transmission component that accepts the incoming message and places it on a queue, that method is called from a thread that is executing elsewhere. By having an independent thread that is responsible for actually sending the messages on the queue when it is awakened by this method, the transmission component and, indeed, the implementer's code that is executing are able to achieve a much higher throughput than would be possible if the sendMsg( ) method of the transmission component were to send the message directly over the communications link. The reason for this is that multiple threads can now use the same transmission component, possibly resulting in many messages being queued and not requiring a message that is currently being sent over a possibly wide-area, limited bandwidth network to limit the execution performance of either the thread that called the sendMsg( ) method of the transmission component to send the message, or other threads that need to use the same said transmission component. This is especially important when the transmission component is used within the server components of this inventive framework, as threads within multiple connection process components 26 (see FIGS. 7A, 7B) may be simultaneously executing the implementer's server-specific code 6, resulting in messages sent back to the client using the same transmission component from these multiple threads of execution.

The client components of this inventive framework automatically send a 'connect'/'reconnect' as a first command prior to implementer's client-specific code 8 sending commands. The client components of this inventive framework may be configured to seamlessly re-establish the connect (and resend a 'connect'/'reconnect') if the connection is lost, as documented in the attached computer code in the SSLCryptClient.java section of the appendix located in file CodeListing.txt. ('Seamlessly' here means that the implementer's client-specific code need not be aware that this has happened.) This level of robustness is unique to this framework as is even the ability of a framework to automatically establish and/or reestablish a connection.

As an alternative embodiment, the main client component 120 may create a separate component whose job it was to have its own thread that essentially did what the main client component does in waiting on the reception component 122 to "wake" its thread, rather than to "wake" a thread executing within the main client component itself. Indeed, any component on the client or server side of this inventive framework may create a separate component or components to wait on the reception component 122. Such a variation is simply an alternative embodiment of this design.

As an alternative embodiment, the server connection component 20 on the server side of the inventive framework may not instantiate a new transmission component 24 and reception component 22 each time it is assigned a new connection by top-level server component 12. Instead, it may reuse its existing ones. As instances of these two components are lightweight and inexpensive to create, this variation is simply an alternative embodiment of this design.

Incoming Messages/Requests from any Single Client Over the Established Communications Link:

In FIG. 7A, the incoming 'connect' message is identified as m6. Like any incoming message over the socket connection (i.e., over the established communication link), this incoming 'connect' message causes the thread in the reception component 22 to awaken and to notify( ) any one thread that happens to be blocked on it. If there happens to be more than one thread blocked on it, only one is awakened.) In this specific case, there is only one because, prior to a successful 'connect'/'reconnect' message being received and processed, only one of the connection process components 26 has been sent to its "inner" wait state to wait for said reception component 22 to "wake" (i.e., notify( )) it.

The connection process component 26 that was awakened would normally retrieve the message from the reception component and execute it on the implementer's server-specific code by invoking the executeCommand( ) method where implementers are required to write their business logic. This type of interaction can be seen in messages received subsequent to m6 (i.e., in m8, m10, m12, m13, and m16 of FIGS. 7A and 7B). But here, because the said connection process component 26 checks with its owning server connection component 20 first and determines that the client communicating over the established communication link is not fully authenticated, instead of executing it on implementer's server-specific code 6, the said connection process component 26 executes the message on code within this inventive framework, specifically, in the implementation provided, on its owning server connection component 20 using its connectAndAuthenticate( ) method. This method will disconnect (i.e., terminate the communication link) if the message is not a 'connect' or 'reconnect' command in the valid format, or if the username and password sent within that command do not tie with each other, or if both the username and password do not tie with the digital certificate used when the secure communication link was initially established. Note that we already have a secure, SSL, two-way authenticated (if desired) communications link over which the 'connect'/'reconnect' with a username and password is being sent. The authentication being performed here is further authentication beyond the two-way authenticated SSL connection that has been established. This inventive framework is the first to support this combined security seamlessly; the first to automatically ensure that the first message contains security-type information; the first to handle such a message within itself (automatically, without requiring implementer's server-specific code to do so or to handle the execution) while passing all subsequent messages automatically to implementer's server-specific code 6.

In the use-case(s) being presented in FIG. 7A, it is assumed that the user name and password are valid and do tie to the digital certificate used to establish the two-way authenticated SSL connection. Now that the connectAndAuthenticate( ) call has been made (and handled internally within this inventive framework), it returns a 'keepAlive' value of 'true' to the connection process component 26 that invoked it (indicating success). If it had returned 'false', the server connection component 26 would behave just as it would if, in a subsequent executeCommand( ) call that it might make on implementer's server-specific code 6, implementer's server-specific code returned 'false': ultimately causing the communication link to be terminated, itself to be returned to its outer wait state, and its owning server connection component 20 to be returned to the top-level server component's available pool of server connection components.

Since it does return 'true' in the example of FIG. 7A, said server connection component 26 now synchronizes on its parent server connection component's Activation Object and executes a notifyAll( ) on that object. If there are other connection process components 26 belonging to the same server connection component 20 (and in this case there are two others that are still in their outer wait state), the other server connection components 26 are likewise awakened from their outer wait state and sent to their inner wait state where they too (like the connection process component 26 that processed the 'connect' message) now wait to be notify( )d when there is an incoming message to process.

When the reception component 22 receives a new incoming request over the said communications link, it stores the message internally, synchronizes on itself, and executes a notify( ), waking up only one of the possibly many connection process components 26 that are in their inner wait( ) state waiting on it. Message m8 at the bottom of FIG. 7A shows just such an incoming message causing the thread executing in the reception component 22 to awaken, at random, one of the connection process components 26 to process this message. As in the processing of the 'connect' message m6, the thread executing in the awakened connection process component 26 now retrieves the message from the reception component 22 (using its getMsg( ) method). This time, however, rather than "executing" the message internally within the inventive framework (as was the case with m6), the thread executing in the connection process component 26 invokes the executeCommand( ) method of the implementer's server-specific code 6. This implementer-written business logic will be executed by said thread executing within the awakened connection process component 26. The server-specific code 6 may use the transmission component 24 which was passed to it in the executeCommand( ) invocation to send back one or more messages to the client components of this framework (and ultimately to the client-specific code 8) as in m9 at the bottom of FIG. 7A.

The connection process component 26's thread is engaged in execution until the server-specific code 6 that it has invoked returns. If the server-specific code being executed returns 'true' for its 'keepAlive' value after processing the message, then the thread executing within the connection process component 26 that invoked the executeCommand( ) will go back to being blocked in its inner wait state—waiting to be awakened with another message to process from this same communication link.

Message m10 of FIG. 7B shows another incoming message being processed in the same manner as m8, only this time it happens to be a different one of the three connection process components 26 that is awakened to process the connection. The processing of messages m12 and m13 (as shown in FIG. 7B) show what would happen if a fourth message m13 arrives while the inventive framework is still processing a previous third message m12 with a different connection process component 26. As can be seen, in this case, the connection process component that has been awakened to process m12 simply is not available to be awakened when m13 arrives. So, it is one of the other two connection process components 26 of the server connection component 20 handling this communication link that is awakened to simultaneously handle the fourth message m13 even while the message m12 is still being executed. This demonstrates how the inventive framework is able to have multiple threads within itself execute simultaneously (on behalf of multiple requests by a single instance of implementer's client-specific code 8 over a single communications link) within the same (or different) parts of a single instance (or multiple instances) of implementer's server-specific code 6.

Note that while FIGS. 7A and 7B show only a single message being sent back by the implementer's server-specific code to the client-specific code (via the framework components) in response to each message that is executed on said server-specific code, it is very possible that the server-specific code 6 could send multiple messages back using the transmission component 24 prior to returning. As another alternative, for a particular type of message, the execute Command( ) method invoked might not return at all—instead, e.g., subscribing to or waiting in a loop on something else for information (e.g.: a market data server; or, a signal from a medical monitor attached to a patient; or, weather monitoring instruments, etc.) where information would be passed back to the client every time it came in. While not returning would tie up one of the connection process components 26 for, perhaps, the duration of that connection, the other connection process components would continue to be available to process requests from the client.

When an implementer's server-specific code 6 sends a message back to the client (via the components of this framework), it must mark the message as a response to a synchronous command (if it is one) or it can leave it with its default marking—as an asynchronous message back to the client. Regardless of how marked, all messages are sent asynchronously and within a MsgPackage Object. The difference is that messages flagged as being responses to synchronous commands are handled differently by the client components of this framework than are MsgPackage instances that are not flagged as such. (See FIG. 8B and its handling of the incoming message m1 in a MsgPackage object that was flagged as a 'synchronous' response [prior to being sent by implementer's server-specific code 6] vs. the same client component's handling of incoming message m2 in a MsgPackage that was not flagged as being a 'synchronous' response.)

Message Handling

Messages (within MsgPackage instances) can be seen as being sent by server-specific code 6 to the client-specific code 8 via the components of this inventive framework in steps m7, m9, m11, m14, and m15 of FIGS. 7A and 7B. If one of these messages is flagged as synchronous, it would be handled as in m4 of FIG. 8A.

Suppose that in the bottom of FIG. 8A, where a synchronous message is being sent by the implementer's client-specific code 8 via the sendSynchMsg( ) method of the main client component 120, the outgoing message m3 in FIG. 8A is the incoming message m8 in FIG. 7A. If this is the case, then it is the thread executing in the client-specific code 8 that becomes blocked on the main client component 120 that it has called on to send the message.

The message m9 (i.e., the MsgPackage with the message m9) sent back in FIG. 7A and shown as message m4 in FIG. 8A would be flagged by the server-specific code 6 prior to it sending the MsgPackage as a response to a synchronous command. As with any message coming to the client components of this inventive framework, the reception component 122 will wake up the thread executing in the main client component 120 (which, in the case of the client components of this framework, is the only thread that is wait( )ing [i.e., blocked] on the reception component 122). Specifically because m4 is so flagged, the code executing in the main client component 120 will retrieve the message from the reception component 122 (as shown in the bottom of FIG. 8A), and then synchronize on and wake up a thread that is blocked on the main client component 120 itself. This thread (blocked on the main client component) is the thread from the implementer's client-specific code 8, which, now, having been awakened, will retrieve the message from the main client component 120 and return it, thus freeing implementer's client-specific code to continue executing.

If the message m9 of FIG. 7A was an asynchronous message (and happened to be the same as message m2 of FIG. 8B), the thread executing in the main client component 120 (which was blocked on its reception component 122) would similarly be awakened by said reception component as in the case above preceding paragraph. But this time, rather than the awakened thread within said main client component 120 synchronizing on itself to wake up threads blocked on it as would be the case for handling a response to a synchronous message, the thread executing in main client component 120 instead uses itself to execute all code that has registered itself with the main client component 120 as a RcvdMsgListener. Since, in this case, the inventive framework is using itself (i.e., its own thread) to execute code within the implementer's client-specific code, this code can be executing simultaneously with the thread executing within the client-specific code itself. Thus, this is the key to how this inventive framework is able to multi-thread the client-specific code without the implementer needing to write multi-threaded code to enable it to handle asynchronous messages.

When a Message is the Final Message for the Implementer's Server Specific Code to Execute and Calls for the Connection to be Terminated As already mentioned, the thread executing in the run( ) method of the server connection component 20 has been wait( )ing on its own deactivation object—for one of its connection process components 26 to wake it up [i.e., notify( ) it], which in effect tells it to drop the connection and return itself to the pool of server connection components available to the top-level server component 12 to process another communications link. When notify( )d (i.e., awakened), said server connection component 20 must first stop and cause to be destroyed the threads executing in its reception and transmission components—the two light-weight components that it had created specifically to manage this communication link that is being shut down. (It is possible that in a variation of this embodiment, where said transmission and reception components were to be reused and assigned the socket of the next connection that top-level server component 12 assigns to this said server connection component 20, this may not be necessary. This variation is simply an alternative embodiment of this design.) Server connection component 20 must also bring all of its other connection process components 26 still currently in their inner wait state back to their outer wait state where they again wait to be sent to their inner wait state when their server connection component 20 is assigned a new communications link. Thus, if the executeCommand( ) method within implementer's server-specific code 6 returns a "keep-alive" value of 'false' after being invoked by any of the connection process components 26, it will cause the connection process components 26 that invoked it to synchronize on its owning server connection component's Deactivation Object, and awaken server connection component 20. The server connection component 20 then sets a variable accessible to all of its connection process components to indicate that the connection has been terminated, and then awakens them from their inner wait states. But, since this aforementioned variable, accessible to all connection process components 26 of this server connection component 20, has been set, rather than attempting to retrieve a message to process from its owning server connection component's reception component 22, each thread executing in one of the said connection process components 26 will move from its inner to its outer wait state.

As noted, an inner and outer wait state are used in this design for the thread executing within the run( ) method of the connection process component 26 for the following reason: the reception component 22, which said thread synchronizes on while in its inner wait( ) state, is created anew each time the said connection process component's parent is given a new communication link to process. In an alternative embodiment, only one wait state is used for the connection process component 26, and the transmission component 24 and reception component 22 of each server connection component 20 is instantiated only once (along with all the other components in this inventive framework). In such a case, the reception and transmission components could simply have a newCommunicationsLink( ) type method enabling the parent to set the certificate and the new connection (socket) into these two aforesaid components. The connection process components could still synchronize on their parent's reception component but only have a single wait( ) state. Such an alternative embodiment would not represent a departure from this overall design.

Design of Security Features and Validation Capabilities

Purchasers who base their systems on this framework gain critical security and validation capabilities without having to themselves write the complex code that would normally be needed to imbue their application with these benefits. As mentioned before, the benefits include establishing a two-way authenticated SSL session with additional ACL validation, where the username and password is associated with the same digital certificate under which the SSL session is established.

Additionally, this framework provides for the automatic signing on the sending side, and automatic verification and storing on the receiving side of any/all messages that would warrant such treatment.

The code that utilizes the JSSE and JCA/JCE libraries is itself complex to write. E.g., pages of code are required to set up the preconditions necessary to establish an SSLContext from which a secure socket connection can be established. While developers with substantial expertise will, with effort, be able to provide these capabilities within an application, the need to develop this code increases the cost of entry into this space. This is one (of many) of the reasons why providing this capability seamlessly in a framework is valuable. (In C++, it is even more difficult.) The fact that this framework provides these capabilities to purchasers' code while requiring virtually no effort by purchasers to achieve this, greatly lessens the barrier to entry for purchasers developing systems that require this level of security.

Simply instantiating (creating) the SSLCryptClient component of this framework and passing it a username and password will cause this client component to establish a secure, two-way authenticated, SSL connection with the server components of this framework. The design of having the client side of this framework automatically carry out the multiple steps needed to establish this two-way authenticated SSL connection and session and of sending the initial connection command that provides the server components with the user name and password in a transparent manner, is a unique element of this design. Not only is purchaser not required to do anything (other than instantiate the SSLCryptClient component) to establish the SSL connection and session; but, also, the SSLCryptClient sends one of the following commands to the server as part of establishing the connection (immediately after it performs the necessary handshaking to establish the two-way authenticated SSL session):

connect:<username>:<password>
reconnect:<username>:<password>:<sessionId to restore if connection and validation is successful>

One of these commands is sent immediately after the two-way authenticated SSL connection is established in order to enable the SSLCryptServerThread component on the server side to validate the connection. The SSLCryptServerThread that was assigned to the connection (and which was responsible for executing its end of the handshaking in order to establish the SSL session to begin with) "activates" (i.e. sends to its inner wait( ) state as previously described) only one (of its possibly multiple) SSLCryptServerThreadProcess instances when the SSL session is established. That instance will NOT send any commands through to a purchaser's server-specific code unless a fully validated connection has already been established. That is, the SSLCryptServerThreadProcess will wait( ) on its SSLCryptServerThread's RcvSocketThread (as per normal), but will only accept a "connect" or "reconnect" message as its first command. Additionally, rather than pass (i.e., execute) that first (connect/reconnect) command on to the purchaser's server-specific code (as would normally be the case), it will instead call the connectAndAuthenticate( ) method of its parent SSLCryptServerThread. connectAndAuthenticate( ) will return 'true' only if the password is valid for a username that is tied in the ACL (Access Control List) to the digital certificate under which the two-way authenticated SSL connection was established. If 'false' is returned, the connection is dropped (just as if the purchaser returned 'false' as its keep-alive value to the executeCommand( ) function invoked by the framework on purchaser's own code). If 'true' is returned, the other (if there are more than one) SSLCryptServerThreadProcess objects (running in their own threads) are sent to their inner wait( ) states so that all may now wait( ) on requests/commands from the client components that, this time, will be passed straight through to the purchaser's server-specific code. One consequence of this design is that even when a purchaser's server-specific code always returns false (so that, from the purchaser's perspective each command initiates a new connection), at least two commands are sent from the client components to the server components when the SSL connection is established. The first is the connect or reconnect command mentioned, the second is what, from the implementer's perspective, seems like its first command. The automatic handling of sending this connect/reconnect message and the automatic handling of the receipt of this connect/reconnect command and subsequent validation against an ACL are unique design elements of this framework as is the manner in which, as described above, all this is accomplished. The way that this keeps all of this interaction away from and transparent to a purchaser's client and server-specific code is also unique to this design as is even the concept of having a framework handle this automatically.

Another element of the security design is the automatic digital signing (by the sending component) and verification (by the receiving component) of messages (if desired). If the receiving component is on the server side, the framework will (optionally) automatically store any signed messages (if the integrated signature server has been enabled). The MsgPackage class performs the signing and verification of messages. When constructing a message, the message will automatically be marked as 'critical' and 'to-be-signed'. The SendSocketThread (instantiated by either the server side or the client side of the framework) will automatically sign a message marked as 'to-be-signed' IF AND ONLY IF the client or server params value of sendSignedMsg is 'true'. If critical is false, the sendMsgPackage( ) method of SendSocketThread (sendMsgPackage( ) is its method that does the sending) will not wait( ) after it sends the message to ensure that the message was in fact sent (vs. rejected because of a full queue, etc.). (The fact that it is the MsgPackage class or its equivalent that accomplishes the signing and verification and the specifics of the 'critical' and 'to-be-signed' flags and their affects on the operation of the signing and verifying of messages is essential only to this specific embodiment and not to the overall framework design. The capabilities described and the fact that the signing, verifying, and storing of verified messages is kept transparent to implementer's server-specific and client-specific code as well as the other aspects of the design described enabling this functionality is unique to this inventive framework.)

It is assumed that only in transit can someone manipulate the message. Otherwise, if it could be tampered with after the receiving code receives it, it could be changed after it was verified, and no code will protect against that, so this is a safe assumption. In any case, no signed message (which is signed by the sender's private key, which only sender has) can be changed in such a way that the stored message would still indicate that the sender sent it. In other words, if the purchaser has stored (on his server side) a signed message from a client requesting an execution, and that message is stored along with the client's digital certificate, the purchaser can in fact guarantee (legally) that that client sent the message and no one else could have. The RcvSocketThread (on either the client or server side) will automatically verify the message if it is signed AND the mAutoVerifySignedMsgPkg params value (on the client or server side—i.e., the side that the RcvSocketThread is on) is 'true'. Note that if the message is not signed, it will not be verified regardless of the value of mAutoVerifySignedMsgPkg parameter.

Upon receipt, the purchaser's client-specific code or server-specific code (depending on which side was doing the receiving) may call the MsgPackage's getVerified( ) method. If the mAutoVerifySignedMsgPkg parameter of the client or server was set to 'true', then the fact that getVerified( ) returns 'true' means that purchaser may be sure that the RcvSocketThread verified the MsgPackage and that therefore, the MsgPackage is from the entity whose digital certificate was used initially to validate the two-way authenticated SSL connection. Note that the RcvSocketThread will ensure that the MsgPackage's verify flag is set to 'false' if the server or client mAutoVerifySignedMsgPkg is not 'true'. This ensures that the MsgPackage's getVerified( ) method will never return 'true' if the RcvSocketThread has not verified it. Also note that if the RcvSocketThread does attempt to verify it and the MsgPackage does not verify (either because it is not signed or because it was tampered with), the MsgPackage's verification code will also ensure that its verify flag is set to 'false'. If, in this aforementioned case (where message verification is attempted, but message does not verify), if the message is being received on the server side, the inventive framework will not process (i.e., will not execute) the command on the implementer's server-specific code 6 (thus eliminating the need for an implementer's server-specific code 6 even to call for verification of a message it has received). The bottom line is, if the MsgPackage's getVerified( ) function returns 'true', it is certain that the message came from the entity who initiated the connection with a valid digital certificate and a user name and password that ties with that certificate in this framework's ACL.

Besides having this signing and verification built into the framework in this unique manner—note how the SendSocketThread and RcvSocketThread classes work seamlessly with the MsgPackage class to accomplish this and the role of server and client parameters (so that a purchaser does not have to write these capabilities into their client and server code)—this framework provides an integrated signature server (and is the first framework to do so). The RcvSocketThread component on the server side of this framework will automatically store all received MsgPackages that are signed if and only if they were successfully verified and the signature server is enabled (via the startup parameters on the server side of this framework).

Modular Design To Interfaces/"Replaceability" of Components: This framework was designed so that all major components could be replaced with enhanced components (if needed) that satisfy the same interface. E.g.: The initial session server provided was designed to use byte streams within a directory structure in order to save state. (This should be suitable for all but the few cases where individual sessions are single commands and the number of users is extremely heavy.) The reasons for this were that it was desirable to develop this framework in a manner that did not require the use of other products in order to implement (e.g. an SQL database such as Oracle, Sybase, MySQL, etc.) Nonetheless, all that need be done to have the session server store its sessions in database tables would be to provide an implementation of this session server that relied on one of the aforementioned database's APIs in order persist and retrieve state. The ServerSessionMgrServer class is intentionally abstract. The few methods that must be implemented deal with the specifics of the calls needed to persist, retrieve, and delete ServerSession objects. Therefore, creating a session server that is database-based is only a few days (or less) of effort. (Note that the implementation provided for the Signature Server does use a database—MySQL in this case—thus illustrating this point.)

Note the bootstrap nature of the Session Server, the Signature Server, and the Session Management Server. All of these implement the ServerThreadProcessInterface and are, in fact, servers that themselves use this framework. This means that, in a sort of bootstrap manner, the server framework itself is a client to these three aforementioned servers that themselves are based on this framework. (Of course, the Session Server must be started without Session Management turned on, or we would have a circular situation.)

The invention is not limited to the above description. Various modifications to the above description that would be within the purview of one of ordinary skill in the art are intended to be within the scope of the invention. As but one example, the above description focuses chiefly on the inventive framework being written in the JAVA language. However, the invention is contemplated as being implementable in many programming languages or schemes.

What is claimed is:

1. A software framework for implementing distributed applications, comprising:
   client-side software, which functions with client-specific code created by an implementer executing together on one or more computers at one or more client sites;

server-side software executing on one or more computers at implementer's designated server site, into which the implementer provides server-specific code, said server-side software in communication with said client-side software over at least one communication link, wherein any single thread executing within a single instance of said client-specific code can communicate through a single instance of said client-side software over at least one said communication link in order to send multiple messages that may be processed substantially concurrently by said server-side software; and, wherein said server-side software is able to receive multiple messages from said single instance of client-side software and process said multiple messages substantially concurrently by invoking functionality with said server-specific code.

2. A software framework for implementing distributed applications according to claim 1, wherein multiple threads can execute concurrently within said server-side software on behalf of multiple messages sent to said server-side software by any said single instance of client-specific code through said client-side software.

3. A software framework for implementing distributed applications according to claim 2, wherein each said instance of client-specific code uses its own instance of said client-side software.

4. A software framework for implementing distributed applications according to claim 3, wherein the said capability provided to a single thread executing within a single instance of said client-specific code to communicate through a single instance of said client-side software over at least one said communication link in order to send multiple messages that may be processed substantially concurrently by said server-side software and where said server-side software is able to receive multiple messages from said single instance of client-side software and process said multiple messages substantially concurrently by invoking functionality within said server-specific code is provided to multiple instances of client-specific code that function concurrently.

5. A software framework for implementing distributed applications according to claim 4, wherein said multiple instances of client-specific code are capable of executing on distinct machines in different locations.

6. A software framework for implementing distributed applications according to claim 1, wherein all communication between each said single instance of client-side software and said server-side software takes place over a single communication link.

7. A software framework for implementing distributed applications according to claim 6, wherein each said instance of said client specific code uses a single instance of said client-side software to send multiple independent messages to be processed substantially concurrently over said single communications link.

8. A software framework for implementing distributed applications according to claim 6, wherein each said instance of client-side software is capable of sending multiple messages over said single communications link independently of said client-side software receiving and processing messages from at least one thread executing in said server-side software over same said communication link on its behalf.

9. A software framework for implementing distributed applications according to claim 8, wherein each of the said threads executing concurrently within said server-side software in order to process one of the said multiple messages from a single instance of said client-side software is able to independently send responses back to said instance of client-side software over the same said single communications link.

10. A software framework for implementing distributed applications according to claim 1, wherein said server-side software is able to accept multiple messages from any single instance of said client-side software asynchronously over a single communication link and concurrently process said multiple messages by providing separate execution threads that execute substantially within at least one of three configurations in which:

(i) a single instance of said server-specific code is dedicated to servicing all messages received over said communication link; or, (ii) a single instance of said server-specific code is used to service all communication links established from multiple instances of said client-side software to said server-side software; or, (iii) a single instance of said server-specific code is used to process each message being executed by a thread of said server-side software.

11. A software framework for implementing distributed applications according to claim 10, wherein the choice among said configurations is user-determinable at startup of said server-side software.

12. A software framework according to claim 1, wherein at least one additional thread executes within an instance of said client-side software that is distinct from any thread that was previously executing within the instance of an implementer's client-specific code that is using the same instance of said client-side software.

13. A software framework according to claim 12, wherein said additional thread is responsible for invoking functionality within said client-specific code in order to process asynchronous messages received from the said server-side software of said framework.

14. A software framework for implementing distributed applications according to claim 1, wherein said client-side software comprises:

a transmission component responsible for sending messages over a communication link, a reception component executing within a different thread than the transmission component and responsible for receiving messages over same said communication link, wherein said reception component blocks for incoming messages and can receive incoming messages independently of said transmission component being used to send messages over said communication link.

15. A software framework for implementing distributed applications according to claim 14, wherein said client-side software further comprises a main client component which, when said main client component establishes a communication link with said server-side software, said main client component uses an instance of said transmission component for managing messages being sent from said client-side software and an instance of said reception component for managing messages being received by said client-side software; and, wherein said reception component executes within a separate thread that waits to receive information over said communication link.

16. A software framework for implementing distributed applications according to claim 15, wherein said main client component executes in a first distinct thread; and, wherein said first distinct thread blocks and waits to be notified by a second distinct thread executing within said reception component; and, wherein said reception component carries out said notification when it receives an incoming message; and, wherein, upon being notified, said first distinct thread processes said received message.

17. A software framework for implementing distributed applications according to claim 14, wherein said client-side software further comprises a main client component which, when said main client component establishes a communication link with said server-side software, said main client component uses an instance of said transmission component for managing messages being sent from said client-side software and an instance of said reception component for managing messages being received by said client-side software; and, wherein said reception component executes within a separate thread that waits to receive information over said communication link.

18. A software framework for implementing distributed applications according to claim 17, wherein said main client component executes in a first distinct thread; and, wherein said first distinct thread blocks and waits to be notified by a second distinct thread executing within said reception component; and, wherein said reception component carries out said notification when it receives an incoming message; and, wherein, upon being notified, said first distinct thread processes said received message.

19. A software framework for implementing distributed applications according to claim 1, wherein each instance of an implementer's client-specific code selectively and alternatively sends requests synchronously and asynchronously using an instance of client-side software and performs other processing, while simultaneously receiving and processing messages asynchronously.

20. A software framework according to claim 19, wherein said client-specific code is single-threaded.

21. A software framework for implementing distributed applications, comprising:

client-side software, which functions with client-specific code created by an implementer executing together on one or more computers at one or more client sites;

server-side software executing on one or more computers at implementer's designated server site, into which the implementer provides server-specific code, said server-side software in communication with said client-side software over at least one communication link, wherein multiple threads are able to execute concurrently in said server side software with the capability of independently invoking functionality within implementer's server-specific code on behalf of messages sent through any single instance of said client-side software by a single instance of an implementer's client-specific code.

22. A software framework for implementing distributed applications according to claim 21, wherein said capability of server-side software to have multiple threads execute concurrently to invoke functionality within implementer's server-specific code on behalf of multiple messages sent through any single instance of said client-side software is provided concurrently to multiple instances of client-side software, each through its own communications link.

23. A software framework for implementing distributed applications according to claim 21, wherein all communication between each respective instance of said client-side software and said server-side software takes place over a single communication link.

24. A software framework for implementing distributed applications according to claim 23, wherein each instance of said client specific code uses a single instance of said client-side software to send multiple independent messages to be processed concurrently over said single communications link.

25. A software framework for implementing distributed applications according to claim 23, wherein each instance of client-side software sends multiple messages over said single communications link independently of said client-side software receiving and processing messages from at least one thread executing in said server-side software over same said communication link on its behalf.

26. A software framework for implementing distributed applications according to claim 25, wherein each of said threads executing concurrently within said server-side software in order to process one of said multiple messages from a single instance of said client-side software independently sends responses back to said instance of client-side software over said single communications link.

27. A software framework for implementing distributed applications according to claim 23, wherein additional messages may be sent through the said single communication link using said instance of client-side software, at the same time that one or more threads executing in the said server-side software are sending messages back through same said communications link.

28. A software framework for implementing distributed applications according to claim 21, wherein said server-side software is able to accept multiple messages from any single instance of said client-side software asynchronously over a single communication link and concurrently process said multiple messages by providing separate execution threads that execute substantially within at least one of three configurations in which:

(i) a single instance of said server-specific code is dedicated to servicing all messages received over said communication link; or, (ii) a single instance of said server-specific code is used to service all communication links established from multiple instances of said client-side software to said server-side software; or, (iii) a single instance of said server-specific code is used to process each message being executed by a thread of said server-side software.

29. A software framework for implementing distributed applications according to claim 28, wherein the choice among said configurations is user-determinable at startup of said server-side software.

30. A software framework according to claim 21, wherein at least one thread executes within an instance of said client-side software that is distinct from any thread that was previously executing within the instance of an implementer's client-specific code that is using the same instance of said client-side software.

31. A software framework according to claim 30, wherein said distinct thread executing within said client-side software is responsible for invoking functionality within said client-specific code in order to process asynchronous messages received from the said server-side software of said framework.

32. A software framework for implementing distributed applications according to claim 21,
wherein said client-side software comprises:
a transmission component responsible for sending messages over a communication link,
a reception component executing within a different thread than the transmission component and responsible for receiving messages over same said communication link,
wherein said reception component blocks for incoming messages and can receive incoming messages independently of said transmission component being used to send messages over said communication link.

33. A software framework for implementing distributed applications according to claim 32,
wherein said client-side software further comprises a main client component which, when said main client component establishes a communication link with said server-side software, said main client component uses an instance of said transmission component for managing messages being sent from said client-side software and an instance of said reception component for managing messages being received by said client-side software; and,
wherein said reception component executes within a separate thread that waits to receive information over said communication link.

34. A software framework for implementing distributed applications according to claim 33,
wherein said main client component executes in a first distinct thread; and,
wherein said first distinct thread blocks and waits to be notified by a second distinct thread executing within said reception component; and,
wherein said reception component carries out said notification when it receives an incoming message; and,
wherein, upon being notified, said first distinct thread processes said received message.

35. A software framework for implementing distributed applications according to claim 21,
wherein each instance of an implementer's client-specific code selectively and alternatively sends requests synchronously and asynchronously using an instance of client-side software and performs other processing, while simultaneously receiving and processing messages asynchronously.

36. A software framework according to claim 35, wherein said client-specific code is single-threaded.

37. A software framework according to claim 21,
wherein all messages sent between said client-side software and said server-side software that emanate from said client-specific code or said server-specific code are objects of a type provided by said framework; and,
wherein messages of said object-type are capable of signing themselves on the sending side, and verifying themselves on the receiving side if called on to do so by components of said framework and passed requisite key information.

38. A software framework according to claim 37,
wherein object-type of said message is independent of said server-specific code.

39. A software framework for implementing distributed applications, comprising:
client-side software, which functions with client-specific code created by an implementer executing together on one or more computers at one or more client sites;
server-side software executing on one or more computers at implementer's designated server site, into which the implementer provides server-specific code, said server-side software in communication with said client-side software over at least one communication link,
wherein communication between multiple threads executing in said server-side software and a single instance of said client-side software is enabled over each said communication link;
wherein said server-side software is able to receive multiple messages over a single communication link from each instance of said client-side software and process these messages concurrently;
wherein a single instance said client-specific code uses a single instance of said client-side software to communicate with said server-specific code through said server-side software; and,
wherein a single thread executing within a said single instance of said client-specific code can, using multiple calls to said single instance of client-side software, send multiple messages to be processed concurrently by said server-side software.

40. A software framework for developing and executing distributed applications according to claim 39,
wherein said server-side software sends messages generated from multiple processes executing concurrently on behalf of any single instance of said client-side software, to said instance of client-side software, asynchronously, and, over the single aforesaid communication link established between said server-side software and said instance of client-side software.

41. A software framework for implementing distributed applications according to claim 40,
wherein said software framework can provide multiple instances of said client-side software concurrently; and,
wherein each instance of said client-side software uses its own communication link.

42. A software framework according to claim 39,
wherein at least one of said client-side software or said server-side software is able to be configured to automatically send 'ping'-type messages to the other of said server-side software and said client-side software where the receiving software can automatically discard said 'ping'-type messages without passing them on to said respective server-specific code or client-specific code.

43. A software framework according to claim 42,
wherein at least one of said server-side software or said client-side software can be configured to terminate said communication link if it hasn't received a message within a specified time period.

44. A software framework for implementing distributed applications according to claim 39,
wherein said software framework can provide multiple instances of said client-side software concurrently; and,
wherein each instance of said client-side software uses its own distinct communication link.

45. A software framework for implementing distributed applications according to claim 39,
wherein said server-side software is able to accept multiple messages from any single instance of said client-side software asynchronously over a single communication link and concurrently process said multiple messages by providing separate execution threads that execute substantially within at least one of three configurations in which:

(i) a single instance of said server-specific code is dedicated to servicing all messages received over said communication link; or, (ii) a single instance of said server-specific code is used to service all communication links established from multiple instances of said client-side software to said server-side software; or, (iii) a single instance of said server-specific code is used to process each message being executed by a thread of said server-side software.

46. A software framework for implementing distributed applications according to claim 45, wherein the choice among said configurations is user-determinable at startup of said server-side software.

47. A software framework according to claim 39, wherein at least one thread executes within an instance of said client-side software that is distinct from any thread that was previously executing within the instance of an implementer's client-specific code that is using the same instance of said client-side software.

48. A software framework according to claim 47, wherein said distinct thread executing within said client-side software is responsible for invoking functionality within said client-specific code in order to process asynchronous messages received from the said server-side software of said framework.

49. A software framework according to claim 39, wherein said client-side software can reconnect automatically with said server-side software if said communication link is lost or dropped.

50. A software framework for implementing distributed applications according to claim 39, wherein said client-side software comprises:

a transmission component responsible for sending messages over a communication link, a reception component executing within a different thread than the transmission component and responsible for receiving messages over same said communication link, wherein said reception component blocks for incoming messages and can receive incoming messages independently of said transmission component being used to send messages over said communication link.

51. A software framework for implementing distributed applications according to claim 50, wherein said client-side software further comprises a main client component which, when said main client component establishes a communication link with said server-side software, said main client component uses an instance of said transmission component for managing messages being sent from said client-side software and an instance of said reception component for managing messages being received by said client-side software; and, wherein said reception component executes within a separate thread that waits to receive information over said communication link.

52. A software framework for implementing distributed applications according to claim 51, wherein said main client component executes in a first distinct thread; and, wherein said first distinct thread blocks and waits to be notified by a second distinct thread executing within said reception component; and, wherein said reception component carries out said notification when it receives an incoming message; and, wherein, upon being notified, said first distinct thread processes said received message.

53. A software framework for implementing distributed applications according to claim 39, wherein each instance of an implementer's client-specific code selectively and alternatively sends requests synchronously and asynchronously using an instance of client-side software and performs other processing, while simultaneously receiving and processing messages asynchronously.

54. A software framework according to claim 53, wherein said client-specific code is single-threaded.

55. A software framework for implementing distributed applications according to claim 39, wherein said server-side software further comprises a server component which creates and maintains at least one server connection component and assigns a newly established communication link to an idle one of its said server connection components, and wherein each said server connection component manages and processes messages from a communication link assigned thereto.

56. A software framework according to claim 55, wherein each said server connection component further comprises at least one server connection process component, and wherein each of said server connection process components executes in a distinct thread independent of other connection process components of said server connection component.

57. A software framework according to claim 56, wherein each of said server connection process components selectively executes code in either i) the same instance of said server-specific code or ii) a different instance of said server-specific code.

58. A software framework according to claim 56, wherein said server connection component further comprises a server reception component that executes in an independent thread to receive messages sent to server-side software over said communication link.

59. A software framework according to claim 58, wherein when said server reception component is awakened to process an incoming message, said server reception component wakes up one of said server connection process components and assigns the incoming message to said awakened server connection process component to process the incoming message.

60. A software framework according to claim 59, wherein each of said server connection process components uses a distinct thread to process an incoming message on an instance of said server-specific code.

61. A software framework according to claim 60, wherein said server reception component assigns a subsequent incoming message to an idle of said server connection process components.

62. A software framework according to claim 61, wherein each of said server connection process components can process a discrete incoming message while other of said server connection process components process other incoming messages.

63. A software framework according to claim 61, wherein said server reception component is able to wait for and receive an additional incoming message while a previous incoming message is being processed by one of said server connection process components.

64. A software framework according to claim 61, wherein a thread executing in said server reception component remains blocked until awakened due to an incoming message.

65. A software framework according to claim 64,
wherein each of said threads executing in said server connection process components remains blocked in a wait state until awakened by said server reception component to process said incoming message.

66. A software framework according to claim 65,
wherein said thread of said awakened server connection process component executes in an instance of said server-specific code.

67. A software framework according to claim 66,
wherein after said thread within said awakened server connection process component completes executing said incoming message, said thread within said awakened server connection process component returns to a wait state until awakened to process a subsequent incoming message.

68. A software framework according to claim 58,
wherein multiple instances of said server-specific code are pre-instantiated when the framework is first started.

69. A software framework according to claim 56, said server connection component further comprises a server transmission component that executes in an independent thread to manage messages sent from at least one of said server-specific code or other components of said server-side software.

70. A software framework according to claim 69,
wherein said server transmission component can accept messages asynchronously from multiple server connection process components of said server connection component.

71. A software framework according to claim 70,
wherein said transmission component is solely responsible for sending messages over said communications link.

72. A software framework according to claim 56,
wherein said server connection components and said server connection process components are pre-instantiated when said framework starts up.

73. A software framework according to claim 72,
wherein said server connection components and said server connection process components are reused to process subsequent new communication links once a previously established communication link is either lost or closed.

74. A software framework according to claim 56,
wherein the number of said server connection process components per each of said server connection component is configurable by the implementer at framework startup.

75. A software framework according to claim 55,
wherein multiple instances of said server-specific code are pre-instantiated when the framework is first started.

76. A software framework according to claim 55,
wherein the number of said server connection components is configurable by the implementer at framework startup.

77. A software framework according to claim 55,
wherein said server-side software executes code within each single-threaded instance of said server-specific code using multiple concurrent threads.

78. A software framework according to claim 55,
wherein all communication between each instance of said server-side software and each respective instance of said client-side software takes place over a single communication link; and,
wherein bi-directional synchronous and asynchronous communication is enabled over this said single communication link.

79. A software framework according to claim 39,
wherein said server-side software executes code within each single-threaded instance of said server-specific code using multiple concurrent threads.

80. A software framework according to claim 39,
wherein said server-side software can execute code within each single-threaded instance of said server-specific code using multiple concurrent threads to process multiple messages received over a single communication link.

81. A software framework according to claim 39,
wherein said client-side software automatically manages the establishment of a connection with said server-side software.

82. A software framework according to claim 39,
wherein each instance of said client-side software is capable of automatically reestablishing said communication link between said client-side software and said server-side software if the communication link is prematurely lost.

83. A software framework according to claim 82,
wherein, said server-side software is able to store state automatically when it detects the connection to be lost; and,
wherein, during reestablishment of a lost communication link, said server-side software is able to restore state so that implementer's server-specific code and client-specific code operate as if the communication link were never lost.

84. A software framework according to claim 39,
wherein all messages sent between said client-side software and said server-side software that emanate from said client-specific code or said server-specific code are objects of a type provided by said framework; and,
wherein messages of said object-type are capable of signing themselves on the sending side, and verifying themselves on the receiving side if called on to do so by components of said framework and passed requisite key information.

85. A software framework according to claim 84,
wherein object-type of said message is independent of said server-specific code.

86. A software framework for implementing distributed applications, comprising:
client-side software, which functions with client-specific code created by an implementer executing together on one or more computers at one or more client sites;
server-side software executing on one or more computers at implementer's designated server site, into which the implementer provides server-specific code, said server-side software in communication with said client-side software over at least one communication link,
wherein each instance of said client-side software is able to process asynchronous messages received from said server-side software while simultaneously sending additional messages to said server-side software;
wherein at least one additional thread executes within an instance of said client-side software that is distinct from any thread that was previously executing within the instance of an implementer's client-specific code that is using the same instance of said client-side software; and,
wherein said additional thread is responsible for invoking functionality within said client-specific code in order to process asynchronous messages received from the said server-side software of said framework.

87. A software framework for implementing distributed applications according to claim 86, wherein all communication between said server-side software and each instance of said client-side software takes place over a single respective communication link.

88. A software framework according to claim 87,
wherein bi-directional synchronous and asynchronous communication is enabled over said single communication link between each instance of said client-side software and each respective instance of said server-side software.

89. A software framework for implementing distributed applications according to claim 86,
wherein said client-side software comprises:
a transmission component responsible for sending messages over a communication link,
a reception component executing within a different thread than the transmission component and responsible for receiving messages over same said communication link,
wherein said reception component blocks for incoming messages and can receive incoming messages independently of said transmission component being used to send messages over said communication link.

90. A software framework for implementing distributed applications according to claim 86,
wherein each instance of an implementer's client-specific code selectively and alternatively sends requests synchronously and asynchronously using an instance of client-side software and performs other processing, while simultaneously receiving and processing messages asynchronously.

91. A software framework according to claim 90, wherein said client-specific code may be single-threaded.

92. A software framework for implementing distributed applications according to claim 86,
wherein said server-side software further comprises a server component which creates and maintains at least one server connection component and assigns a newly established communication link to an idle one of its said server connection components, and
wherein each said server connection component manages and processes messages from a communication link assigned thereto.

93. A software framework according to claim 92,
wherein each said server connection component further comprises at least one connection process component, and wherein each of said server connection process components executes in a distinct thread independent of other connection process components of said server connection component.

94. A software framework according to claim 93,
wherein each of said server connection process components selectively executes code in either i) the same instance of said server-specific code or ii) a different instance of said server-specific code.

95. A software framework according to claim 93,
wherein said server connection component further comprises a server reception component that executes in an independent thread to receive messages sent to server-side software over said communication link.

96. A software framework according to claim 95,
wherein when said server reception component is awakened to process an incoming message, said server reception component wakes up one of said server connection process components and assigns the incoming message to said awakened server connection process component to process the incoming message.

97. A software framework according to claim 96,
wherein each of said server connection process components uses a distinct thread to process an incoming message on an instance of said server-specific code.

98. A software framework according to claim 97,
wherein said server reception component assigns a subsequent incoming message to an idle other of said connection process components.

99. A software framework according to claim 98,
wherein each of said server connection process components can process a discrete incoming message while other of said server connection process components process other incoming messages.

100. A software framework according to claim 98,
wherein said server reception component is able to wait for and receive an additional incoming message while a previous incoming message is being processed by one of said server connection process components.

101. A software framework according to claim 98,
wherein a thread executing in said server reception component remains blocked until awakened due to an incoming message.

102. A software framework according to claim 101,
wherein each of said threads executing in said server connection process components remains blocked in a wait state until awakened by said server reception component to process said incoming message.

103. A software framework according to claim 102,
wherein said thread of said awakened server connection process component executes in an instance of said server-specific code.

104. A software framework according to claim 103,
wherein after said thread within said awakened server connection process component completes executing said incoming message, said thread within said awakened server connection process component returns to a wait state until awakened to process a subsequent incoming message.

105. A software framework according to claim 95,
wherein multiple instances of said server-specific code are pre-instantiated when the framework is first started.

106. A software framework according to claim 93, said server connection component further comprises a server transmission component that executes in an independent thread to manage messages sent from at least one of said server-specific code or other components of said server-side software.

107. A software framework according to claim 106,
wherein said server transmission component can accept messages asynchronously from multiple server connection process components of said server connection component.

108. A software framework according to claim 107,
wherein said transmission component is solely responsible for sending messages over said communications link.

109. A software framework according to claim 93,
wherein said server connection components and said server connection process components are pre-instantiated when said framework starts up, and
wherein said server connection components and said server connection process components are reused to process subsequent new communication links once a previously established communication link is either lost or closed.

110. A software framework according to claim 93, wherein the number of said server connection process components per each of said server connection component is configurable by the implementer at framework startup.

111. A software framework according to claim 92, wherein multiple instances of said server-specific code are pre-instantiated when the framework is first started.

112. A software framework according to claim 92, wherein the number of said server connection components is configurable by the implementer at framework startup.

113. A software framework according to claim 86, wherein said server-side software executes code within each single-threaded instance of said server-specific code using multiple concurrent threads.

114. A software framework according to claim 86, wherein said server-side software can execute code within each single-threaded instance of said server-specific code using multiple concurrent threads to process multiple messages received over a single communication link.

115. A software framework according to claim 86, wherein said client-side software automatically manages the establishment of a connection with said server-side software.

116. A software framework according to claim 86, wherein each instance of said client-side software can automatically reestablish said communication link between said client-side software and said server-side software if the communication link is prematurely lost.

117. A software framework according to claim 116, wherein, said server-side software can store state automatically when it detects the connection to be lost; and, wherein, during reestablishment of a lost communication link, said server-side software is able to restore state so that implementer's server-specific code and client-specific code operate as if the communication link were never lost.

118. A software framework according to claim 86, wherein all messages sent between said client-side software and said server-side software that emanate from said client-specific code or said server-specific code are objects of a type provided by said framework; and, wherein messages of said object-type are capable of signing themselves on the sending side, and verifying themselves on the receiving side if called on to do so by components of said framework and passed requisite key information.

119. A software framework according to claim 118, wherein object-type of said message is independent of said server-specific code.

120. A software framework for implementing distributed applications, comprising:
  client-side software, which functions with client-specific code created by an implementer executing together on one or more computers at one or more client sites;
  server-side software executing on one or more computers at implementer's designated server site, into which the implementer provides server-specific code, said server-side software in communication with said client-side software over at least one communication link,
  wherein each instance of an implementer's client-specific code is capable of using a single instance of said client-side software to communicate with implementer's server-specific code through said server-side software; and,
  wherein each said instance of said client-side software starts at least one first thread that executes independently of a second thread executing within the said instance of implementer's client-specific code that created said instance of client-side software.

121. A software framework for implementing distributed applications according to claim 120, wherein said first thread executes within said client-side software and selectively executes functionality within said instance of implementer's client-specific code.

* * * * *